(12) United States Patent
Hunt et al.

(10) Patent No.: US 7,890,543 B2
(45) Date of Patent: Feb. 15, 2011

(54) ARCHITECTURE FOR DISTRIBUTED COMPUTING SYSTEM AND AUTOMATED DESIGN, DEPLOYMENT, AND MANAGEMENT OF DISTRIBUTED APPLICATIONS

(75) Inventors: Galen C. Hunt, Bellevue, WA (US); Bassam Tabbara, Seattle, WA (US); Kevin Grealish, Seattle, WA (US); Geoffrey Outhred, Seattle, WA (US); Rob Mensching, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1219 days.

(21) Appl. No.: 10/693,004

(22) Filed: Oct. 24, 2003

(65) Prior Publication Data
US 2004/0199572 A1    Oct. 7, 2004

Related U.S. Application Data

(60) Provisional application No. 60/452,736, filed on Mar. 6, 2003.

(51) Int. Cl.
G06F 17/00 (2006.01)
(52) U.S. Cl. .................................. 707/803; 707/999.1
(58) Field of Classification Search ................ 707/100, 707/999.1, 803
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,424,414 A | 1/1984 | Hellman et al. | |
| 4,506,338 A | 3/1985 | Alpem et al. | |
| 5,031,089 A | 7/1991 | Liu et al. | |
| 5,220,621 A | 6/1993 | Saitoh | |
| 5,430,810 A | 7/1995 | Saeki | |
| 5,490,276 A | 2/1996 | Doli, Jr. et al. | |
| 5,495,610 A | 2/1996 | Shing et al. | |
| 5,499,357 A * | 3/1996 | Sonty et al. .................. | 710/104 |
| 5,504,921 A | 4/1996 | Dev et al. | |
| 5,557,774 A | 9/1996 | Shimabukuro et al. | |
| 5,579,482 A | 11/1996 | Einkauf et al. | |
| 5,668,995 A * | 9/1997 | Bhat .......................... | 718/104 |
| 5,686,940 A | 11/1997 | Kuga | |
| 5,724,508 A | 3/1998 | Harple, Jr. et al. | |
| 5,748,958 A | 5/1998 | Badovinatz et al. | |

(Continued)

FOREIGN PATENT DOCUMENTS

CN    1368694 A    9/2002

(Continued)

OTHER PUBLICATIONS

Araki, "Linux Security Diary, Use VLAN in Linux", Linux Japan, Itsutsubashi Research Co.,ltd., vol. 3, No. 11, Nov. 1, 2008, pp. 110-113 (CSDB: National Academy Paper 200300158009.

(Continued)

*Primary Examiner*—John R. Cottingham
*Assistant Examiner*—Nirav K Khakhar
(74) *Attorney, Agent, or Firm*—Lee & Hayes, PLLC

(57) ABSTRACT

An architecture and methodology for designing, deploying, and managing a distributed application onto a distributed computing system is described.

36 Claims, 24 Drawing Sheets

U.S. PATENT DOCUMENTS

| | | | |
|---|---|---|---|
| 5,758,351 A | 5/1998 | Gibson et al. | |
| 5,768,271 A | 6/1998 | Seid et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,801,970 A | 9/1998 | Rowland et al. | |
| 5,818,937 A | 10/1998 | Watson et al. | |
| 5,822,531 A | 10/1998 | Gorczyca et al. | |
| 5,826,015 A | 10/1998 | Schmidt | |
| 5,845,124 A | 12/1998 | Berman | |
| 5,845,277 A | 12/1998 | Pfeil et al. | |
| 5,867,706 A | 2/1999 | Martin et al. | |
| 5,872,928 A | 2/1999 | Lewis et al. | |
| 5,878,220 A | 3/1999 | Olkin et al. | |
| 5,895,499 A | 4/1999 | Chu | |
| 5,905,728 A | 5/1999 | Han et al. | |
| 5,917,730 A | 6/1999 | Rittie et al. | |
| 5,930,798 A | 7/1999 | Lawler et al. | |
| 5,958,009 A | 9/1999 | Friedrich et al. | |
| 5,968,126 A | 10/1999 | Ekstrom et al. | |
| 6,035,405 A | 3/2000 | Gage et al. | |
| 6,041,054 A | 3/2000 | Westberg | |
| 6,047,323 A | 4/2000 | Krause | |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,075,776 A | 6/2000 | Tanimoto et al. | |
| 6,076,108 A | 6/2000 | Courts et al. | |
| 6,081,826 A | 6/2000 | Masuoka et al. | |
| 6,085,238 A | 7/2000 | Yuasa et al. | |
| 6,086,618 A | 7/2000 | Al-Hilali et al. | |
| 6,108,702 A | 8/2000 | Wood | |
| 6,112,243 A | 8/2000 | Downs et al. | |
| 6,115,393 A | 9/2000 | Engel et al. | |
| 6,118,785 A | 9/2000 | Araujo et al. | |
| 6,125,442 A | 9/2000 | Maves et al. | |
| 6,125,447 A | 9/2000 | Gong | |
| 6,134,594 A | 10/2000 | Helland et al. | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,167,515 A | 12/2000 | Lin | |
| 6,178,529 B1 | 1/2001 | Short et al. | |
| 6,182,275 B1 | 1/2001 | Beelitz et al. | |
| 6,185,308 B1 | 2/2001 | Ando et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,226,788 B1 | 5/2001 | Schoening et al. | |
| 6,230,312 B1 | 5/2001 | Hunt | |
| 6,233,610 B1 | 5/2001 | Hayball et al. | |
| 6,236,365 B1 | 5/2001 | LeBlanc et al. | |
| 6,236,901 B1 | 5/2001 | Goss | |
| 6,237,020 B1 | 5/2001 | Leymann et al. | |
| 6,253,230 B1 | 6/2001 | Couland et al. | |
| 6,256,773 B1 | 7/2001 | Bowman-Amuah | |
| 6,259,448 B1 | 7/2001 | McNally et al. | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,304,972 B1 | 10/2001 | Shavit | |
| 6,305,015 B1 | 10/2001 | Akriche et al. | |
| 6,311,144 B1 | 10/2001 | Abu El Ata | |
| 6,311,270 B1 | 10/2001 | Challener et al. | |
| 6,330,605 B1 | 12/2001 | Christensen et al. | |
| 6,336,138 B1 * | 1/2002 | Caswell et al. | 709/223 |
| 6,336,171 B1 | 1/2002 | Coskrey, IV | |
| 6,338,112 B1 | 1/2002 | Wipfel et al. | |
| 6,351,685 B1 | 2/2002 | Dimitri et al. | |
| 6,353,861 B1 | 3/2002 | Dolin, Jr. et al. | |
| 6,353,898 B1 | 3/2002 | Wipfel et al. | |
| 6,360,265 B1 | 3/2002 | Falck et al. | |
| 6,366,578 B1 | 4/2002 | Johnson | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 * | 5/2002 | Zager et al. | 703/25 |
| 6,393,456 B1 | 5/2002 | Ambler et al. | |
| 6,393,474 B1 | 5/2002 | Eichert et al. | |
| 6,393,485 B1 | 5/2002 | Chao et al. | |
| 6,408,390 B1 | 6/2002 | Saito | |
| 6,424,718 B1 | 7/2002 | Holloway | |
| 6,424,992 B2 | 7/2002 | Devarakonda et al. | |
| 6,427,163 B1 | 7/2002 | Arendt et al. | |
| 6,427,171 B1 | 7/2002 | Craft et al. | |
| 6,434,598 B1 | 8/2002 | Gish | |
| 6,438,100 B1 | 8/2002 | Halpern et al. | |
| 6,442,557 B1 | 8/2002 | Buteau et al. | |
| 6,442,713 B1 | 8/2002 | Block et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,466,985 B1 | 10/2002 | Goyal et al. | |
| 6,470,025 B1 | 10/2002 | Wilson et al. | |
| 6,470,464 B2 * | 10/2002 | Bertram et al. | 714/37 |
| 6,473,791 B1 | 10/2002 | Al-Ghosein et al. | |
| 6,480,955 B1 | 11/2002 | DeKoning et al. | |
| 6,484,261 B1 | 11/2002 | Wiegel | |
| 6,502,131 B1 | 12/2002 | Vaid et al. | |
| 6,505,244 B1 | 1/2003 | Natarajan et al. | |
| 6,519,615 B1 | 2/2003 | Wollrath et al. | |
| 6,529,953 B1 | 3/2003 | Van Renesse | |
| 6,539,494 B1 | 3/2003 | Abramson et al. | |
| 6,546,423 B1 | 4/2003 | Dutta et al. | |
| 6,546,553 B1 | 4/2003 | Hunt | |
| 6,549,934 B1 | 4/2003 | Peterson et al. | |
| 6,564,261 B1 | 5/2003 | Gudjonsson et al. | |
| 6,570,847 B1 | 5/2003 | Hosein | |
| 6,570,875 B1 | 5/2003 | Hegde | |
| 6,574,195 B2 | 6/2003 | Roberts | |
| 6,584,499 B1 | 6/2003 | Jantz et al. | |
| 6,587,876 B1 | 7/2003 | Mahon et al. | |
| 6,597,956 B1 | 7/2003 | Aziz et al. | |
| 6,598,077 B2 | 7/2003 | Primak et al. | |
| 6,598,173 B1 | 7/2003 | Sheikh et al. | |
| 6,598,223 B1 | 7/2003 | Vrhel, Jr. et al. | |
| 6,601,101 B1 | 7/2003 | Lee et al. | |
| 6,601,233 B1 | 7/2003 | Underwood | |
| 6,606,708 B1 | 8/2003 | Devine et al. | |
| 6,609,148 B1 | 8/2003 | Salo et al. | |
| 6,609,213 B1 | 8/2003 | Nguyen et al. | |
| 6,611,522 B1 | 8/2003 | Zheng et al. | |
| 6,628,671 B1 | 9/2003 | Dynarski et al. | |
| 6,631,141 B1 | 10/2003 | Kumar et al. | |
| 6,640,303 B1 | 10/2003 | Vu | |
| 6,651,101 B1 | 11/2003 | Gai et al. | |
| 6,651,240 B1 | 11/2003 | Yamamoto et al. | |
| 6,654,782 B1 | 11/2003 | O'Brien et al. | |
| 6,654,796 B1 | 11/2003 | Slater et al. | |
| 6,665,714 B1 | 12/2003 | Blumenau et al. | |
| 6,671,699 B1 | 12/2003 | Black et al. | |
| 6,675,308 B1 | 1/2004 | Thomsen | |
| 6,678,821 B1 | 1/2004 | Waugh et al. | |
| 6,678,835 B1 | 1/2004 | Shah et al. | |
| 6,681,262 B1 | 1/2004 | Rimmer | |

| | | | | | | |
|---|---|---|---|---|---|---|
| 6,691,148 | B1 | 2/2004 | Zinky et al. | 6,976,079 | B1 | 12/2005 | Ferguson et al. |
| 6,691,165 | B1 | 2/2004 | Bruck et al. | 6,976,269 | B1 | 12/2005 | Avery, IV et al. |
| 6,691,168 | B1 | 2/2004 | Bal et al. | 6,978,379 | B1 | 12/2005 | Goh et al. |
| 6,694,436 | B1 | 2/2004 | Audebert | 6,983,317 | B1 | 1/2006 | Bishop et al. |
| 6,701,363 | B1 * | 3/2004 | Chiu et al. ............... 709/224 | 6,985,956 | B2 | 1/2006 | Luke et al. |
| 6,717,949 | B1 | 4/2004 | Boden et al. | 6,986,133 | B2 | 1/2006 | O'Brien et al. |
| 6,718,361 | B1 | 4/2004 | Basani et al. | 6,986,135 | B2 | 1/2006 | Leathers et al. |
| 6,718,379 | B1 | 4/2004 | Krishna et al. | 6,990,666 | B2 | 1/2006 | Hirschfeld et al. |
| 6,725,253 | B1 | 4/2004 | Okano et al. | 7,003,562 | B2 | 2/2006 | Mayer |
| 6,728,885 | B1 | 4/2004 | Taylor et al. | 7,003,574 | B1 | 2/2006 | Bahl |
| 6,735,596 | B2 | 5/2004 | Corynen | 7,012,919 | B1 | 3/2006 | So et al. |
| 6,738,736 | B1 | 5/2004 | Bond | 7,013,462 | B2 | 3/2006 | Zara et al. |
| 6,741,266 | B1 | 5/2004 | Kamiwada et al. | 7,016,950 | B2 | 3/2006 | Tabbara et al. |
| 6,742,020 | B1 | 5/2004 | Dimitroff et al. | 7,024,451 | B2 | 4/2006 | Jorgenson |
| 6,748,447 | B1 | 6/2004 | Basani et al. | 7,027,412 | B2 | 4/2006 | Miyamoto et al. |
| 6,754,716 | B1 | 6/2004 | Sharma et al. | 7,028,228 | B1 | 4/2006 | Lovy et al. |
| 6,754,816 | B1 | 6/2004 | Layton et al. | 7,035,786 | B1 | 4/2006 | Abu El Ata et al. |
| 6,757,744 | B1 | 6/2004 | Narisi et al. | 7,035,930 | B2 | 4/2006 | Graupner et al. |
| 6,760,765 | B1 | 7/2004 | Asai et al. | 7,043,407 | B2 | 5/2006 | Lynch et al. |
| 6,760,775 | B1 | 7/2004 | Anerousis et al. | 7,043,545 | B2 | 5/2006 | Tabbara et al. |
| 6,769,008 | B1 | 7/2004 | Kumar et al. | 7,046,680 | B1 | 5/2006 | McDysan et al. |
| 6,769,060 | B1 | 7/2004 | Dent et al. | 7,050,961 | B1 | 5/2006 | Lee et al. |
| 6,772,333 | B1 | 8/2004 | Brendel | 7,054,943 | B1 | 5/2006 | Goldszmidt et al. |
| 6,779,016 | B1 | 8/2004 | Aziz et al. | 7,058,704 | B1 | 6/2006 | Mangipudi et al. |
| 6,782,408 | B1 | 8/2004 | Chandra et al. | 7,058,826 | B2 | 6/2006 | Fung |
| 6,789,090 | B1 | 9/2004 | Miyake et al. | 7,058,858 | B2 | 6/2006 | Wong et al. |
| 6,801,528 | B2 | 10/2004 | Nassar | 7,062,718 | B2 | 6/2006 | Kodosky et al. |
| 6,801,937 | B1 | 10/2004 | Novaes et al. | 7,069,204 | B1 | 6/2006 | Solden et al. |
| 6,801,949 | B1 | 10/2004 | Bruck et al. | 7,069,480 | B1 | 6/2006 | Lovy et al. |
| 6,804,783 | B1 | 10/2004 | Wesinger et al. | 7,069,553 | B2 | 6/2006 | Narayanaswamy et al. |
| 6,813,778 | B1 | 11/2004 | Poli et al. | 7,072,807 | B2 | 7/2006 | Brown et al. |
| 6,816,897 | B2 | 11/2004 | McGuire | 7,072,822 | B2 | 7/2006 | Humenansky et al. |
| 6,820,042 | B1 | 11/2004 | Cohen et al. | 7,076,633 | B2 | 7/2006 | Tormasov et al. |
| 6,820,121 | B1 | 11/2004 | Callis et al. | 7,080,143 | B2 | 7/2006 | Hunt et al. |
| 6,823,299 | B1 | 11/2004 | Contreras et al. | 7,082,464 | B2 | 7/2006 | Hasan et al. |
| 6,823,373 | B1 | 11/2004 | Pancha et al. | 7,089,281 | B1 | 8/2006 | Kazemi et al. |
| 6,823,382 | B2 | 11/2004 | Stone | 7,089,293 | B2 | 8/2006 | Grosner et al. |
| 6,829,639 | B1 | 12/2004 | Lawson et al. | 7,089,530 | B1 | 8/2006 | Dardinski et al. |
| 6,829,770 | B1 | 12/2004 | Hinson et al. | 7,093,005 | B2 | 8/2006 | Patterson |
| 6,836,750 | B2 | 12/2004 | Wong et al. | 7,093,288 | B1 | 8/2006 | Hydrie et al. |
| 6,845,160 | B1 | 1/2005 | Aoki | 7,096,258 | B2 | 8/2006 | Hunt et al. |
| 6,853,841 | B1 | 2/2005 | St. Pierre | 7,099,936 | B2 | 8/2006 | Chase et al. |
| 6,854,069 | B2 | 2/2005 | Kampe et al. | 7,103,185 | B1 | 9/2006 | Srivastava et al. |
| 6,856,591 | B1 | 2/2005 | Ma et al. | 7,103,874 | B2 | 9/2006 | McCollum et al. |
| 6,862,613 | B1 | 3/2005 | Kumar et al. | 7,113,900 | B1 | 9/2006 | Hunt et al. |
| 6,868,062 | B1 | 3/2005 | Yadav et al. | 7,117,158 | B2 | 10/2006 | Weldon et al. |
| 6,868,454 | B1 * | 3/2005 | Kubota et al. ............... 709/237 | 7,117,261 | B2 | 10/2006 | Kryskow, Jr. et al. |
| 6,879,926 | B2 | 4/2005 | Schmit et al. | 7,120,154 | B2 | 10/2006 | Bavant et al. |
| 6,880,002 | B2 | 4/2005 | Hirschfeld et al. | 7,124,289 | B1 | 10/2006 | Suorsa |
| 6,886,038 | B1 | 4/2005 | Tabbara et al. | 7,127,625 | B2 | 10/2006 | Farkas et al. |
| 6,888,807 | B2 | 5/2005 | Heller et al. | 7,130,881 | B2 | 10/2006 | Volkov et al. |
| 6,895,534 | B2 | 5/2005 | Wong et al. | 7,131,123 | B2 | 10/2006 | Suorsa et al. |
| 6,898,791 | B1 | 5/2005 | Chandy et al. | 7,134,011 | B2 | 11/2006 | Fung |
| 6,904,458 | B1 | 6/2005 | Bishop et al. | 7,134,122 | B1 | 11/2006 | Sero et al. |
| 6,907,395 | B1 | 6/2005 | Hunt et al. | 7,139,930 | B2 | 11/2006 | Mashayekhi et al. |
| 6,912,568 | B1 | 6/2005 | Nishiki et al. | 7,139,999 | B2 | 11/2006 | Bowman-Amuah |
| 6,915,338 | B1 | 7/2005 | Hunt et al. | 7,143,420 | B2 | 11/2006 | Radhakrishnan |
| 6,922,791 | B2 | 7/2005 | Mashayekhi et al. | 7,146,353 | B2 | 12/2006 | Garg et al. |
| 6,928,482 | B1 | 8/2005 | Ben Nun et al. | 7,150,015 | B2 | 12/2006 | Pace et al. |
| 6,944,183 | B1 | 9/2005 | Iyer et al. | 7,152,109 | B2 | 12/2006 | Suorsa et al. |
| 6,944,759 | B1 | 9/2005 | Crisan | 7,152,157 | B2 | 12/2006 | Murphy et al. |
| 6,947,987 | B2 | 9/2005 | Boland | 7,155,380 | B2 | 12/2006 | Hunt et al. |
| 6,954,930 | B2 | 10/2005 | Drake et al. | 7,155,490 | B1 | 12/2006 | Malmer et al. |
| 6,957,186 | B1 | 10/2005 | Guheen et al. | 7,162,427 | B1 | 1/2007 | Myrick et al. |
| 6,963,981 | B1 | 11/2005 | Bailey et al. | 7,162,509 | B2 | 1/2007 | Brown et al. |
| 6,968,291 | B1 | 11/2005 | Desai | 7,174,379 | B2 | 2/2007 | Agarwal et al. |
| 6,968,535 | B2 | 11/2005 | Stelting et al. | 7,181,731 | B2 | 2/2007 | Pace et al. |
| 6,968,550 | B2 | 11/2005 | Branson et al. | 7,188,335 | B1 | 3/2007 | Darr et al. |
| 6,968,551 | B2 | 11/2005 | Hediger et al. | 7,191,344 | B2 | 3/2007 | Lin et al. |
| 6,971,063 | B1 | 11/2005 | Rappaport et al. | 7,191,429 | B2 | 3/2007 | Brassard et al. |
| 6,971,072 | B1 | 11/2005 | Stein | 7,194,439 | B2 | 3/2007 | Kassan et al. |
| 6,973,620 | B2 | 12/2005 | Gusler et al. | 7,194,616 | B2 | 3/2007 | Axnix et al. |
| 6,973,622 | B1 | 12/2005 | Rappaport et al. | 7,197,418 | B2 | 3/2007 | Fuller, III et al. |

| | | | | | | |
|---|---|---|---|---|---|---|
| 7,200,530 B2 | 4/2007 | Brown et al. | | 2002/0198995 A1 | 12/2002 | Liu et al. |
| 7,200,655 B2 | 4/2007 | Hunt et al. | | 2003/0008712 A1 | 1/2003 | Poulin |
| 7,203,911 B2 | 4/2007 | Williams | | 2003/0009559 A1 | 1/2003 | Ikeda |
| 7,210,143 B2 | 4/2007 | Or et al. | | 2003/0014644 A1 | 1/2003 | Burns et al. |
| 7,213,231 B1 | 5/2007 | Bandhole et al. | | 2003/0028642 A1 | 2/2003 | Agarwal et al. |
| 7,222,147 B1 | 5/2007 | Black et al. | | 2003/0028770 A1 | 2/2003 | Litwin, Jr. et al. |
| 7,225,441 B2 | 5/2007 | Kozuch et al. | | 2003/0041142 A1 | 2/2003 | Zhang et al. |
| 7,231,410 B1 | 6/2007 | Walsh et al. | | 2003/0041159 A1 | 2/2003 | Tinsley et al. |
| 7,246,351 B2 | 7/2007 | Bloch et al. | | 2003/0046615 A1 | 3/2003 | Stone |
| 7,254,634 B1 | 8/2007 | Davis et al. | | 2003/0051049 A1 | 3/2003 | Noy et al. |
| 7,257,584 B2 | 8/2007 | Hirschfeld et al. | | 2003/0056063 A1 | 3/2003 | Hochmuth et al. |
| 7,275,156 B2 | 9/2007 | Balfanz et al. | | 2003/0065743 A1 | 4/2003 | Jenny et al. |
| 7,278,273 B1 | 10/2007 | Whitted et al. | | 2003/0069369 A1 | 4/2003 | Belenkaya et al. |
| 7,281,154 B2 | 10/2007 | Mashayekhi et al. | | 2003/0074395 A1 | 4/2003 | Eshghi et al. |
| 7,302,608 B1 | 11/2007 | Acharya et al. | | 2003/0101284 A1 | 5/2003 | Cabrera et al. |
| 7,305,549 B2 | 12/2007 | Hunt et al. | | 2003/0105963 A1 | 6/2003 | Slick et al. |
| 7,305,561 B2 | 12/2007 | Hunt et al. | | 2003/0120763 A1 | 6/2003 | Voilpano |
| 7,313,573 B2 | 12/2007 | Leung et al. | | 2003/0126464 A1 | 7/2003 | McDaniel et al. |
| 7,315,801 B1 | 1/2008 | Dowd et al. | | 2003/0130833 A1 | 7/2003 | Brownell et al. |
| 7,333,000 B2 | 2/2008 | Vassallo | | 2003/0138105 A1 | 7/2003 | Challener et al. |
| 7,349,891 B2 | 3/2008 | Charron et al. | | 2003/0165140 A1 | 9/2003 | Tang et al. |
| 7,350,068 B2 | 3/2008 | Anderson et al. | | 2003/0200293 A1 | 10/2003 | Fearn et al. |
| 7,350,186 B2 | 3/2008 | Coleman et al. | | 2003/0204734 A1 | 10/2003 | Wheeler |
| 7,366,755 B1 | 4/2008 | Cuomo et al. | | 2003/0214908 A1 | 11/2003 | Kumar et al. |
| 7,367,028 B2 | 4/2008 | Kodosky et al. | | 2003/0217263 A1 | 11/2003 | Sakai |
| 7,370,103 B2 | 5/2008 | Hunt et al. | | 2003/0225563 A1 | 12/2003 | Gonos |
| 7,376,125 B1 | 5/2008 | Hussain et al. | | 2004/0002878 A1 | 1/2004 | Maria Hinton |
| 7,379,982 B2 | 5/2008 | Tabbara | | 2004/0049365 A1 | 3/2004 | Keller et al. |
| 7,386,721 B1 | 6/2008 | Vilhuber et al. | | 2004/0049509 A1 | 3/2004 | Keller et al. |
| 7,395,320 B2 | 7/2008 | Hunt et al. | | 2004/0059812 A1 | 3/2004 | Assa |
| 7,403,901 B1 | 7/2008 | Carley et al. | | 2004/0068631 A1 | 4/2004 | Ukeda et al. |
| 7,404,175 B2 | 7/2008 | Lee et al. | | 2004/0073443 A1 | 4/2004 | Gabrick et al. |
| 7,406,517 B2 | 7/2008 | Hunt et al. | | 2004/0073795 A1 | 4/2004 | Jablon |
| 7,406,692 B2 | 7/2008 | Halpern et al. | | 2004/0078787 A1 | 4/2004 | Borek et al. |
| 7,409,420 B2 | 8/2008 | Pullara et al. | | 2004/0111315 A1 | 6/2004 | Sharma et al. |
| 7,461,249 B1 | 12/2008 | Pearson et al. | | 2004/0117438 A1 | 6/2004 | Considine et al. |
| 7,464,147 B1 | 12/2008 | Fakhouri et al. | | 2004/0117476 A1 | 6/2004 | Steele et al. |
| 7,587,453 B2 | 9/2009 | Bhrara et al. | | 2004/0160386 A1 | 8/2004 | Michelitsch et al. |
| 7,624,086 B2 | 11/2009 | Keith, Jr. | | 2004/0161111 A1 | 8/2004 | Sherman |
| 7,653,903 B2 | 1/2010 | Purkeypile et al. | | 2004/0193388 A1 | 9/2004 | Outhred et al. |
| 7,743,373 B2 | 6/2010 | Avram et al. | | 2004/0199572 A1 | 10/2004 | Hunt et al. |
| 7,765,540 B2 | 7/2010 | McCollum et al. | | 2004/0205179 A1 | 10/2004 | Hunt et al. |
| 2001/0014158 A1 | 8/2001 | Baltzley | | 2004/0208292 A1 | 10/2004 | Winterbottom |
| 2001/0016909 A1 | 8/2001 | Gehrmann | | 2004/0226010 A1 | 11/2004 | Suorsa |
| 2001/0020228 A1 | 9/2001 | Cantu et al. | | 2004/0261079 A1 | 12/2004 | Sen |
| 2001/0039586 A1 | 11/2001 | Primak et al. | | 2004/0264481 A1 | 12/2004 | Darling et al. |
| 2001/0047400 A1 | 11/2001 | Coates et al. | | 2004/0267920 A1 | 12/2004 | Hydrie et al. |
| 2001/0051937 A1 | 12/2001 | Ross et al. | | 2004/0268357 A1 | 12/2004 | Joy et al. |
| 2002/0009079 A1 | 1/2002 | Jungck et al. | | 2004/0268358 A1 | 12/2004 | Darling et al. |
| 2002/0010771 A1* | 1/2002 | Mandato ............... 709/223 | | 2005/0008001 A1 | 1/2005 | Williams et al. |
| 2002/0022952 A1* | 2/2002 | Zager et al. .............. 703/22 | | 2005/0021742 A1 | 1/2005 | Yemini et al. |
| 2002/0038421 A1 | 3/2002 | Hamada | | 2005/0055435 A1 | 3/2005 | Gbadegesin et al. |
| 2002/0040402 A1 | 4/2002 | Levy-Abegnoli et al. | | 2005/0080811 A1 | 4/2005 | Speeter et al. |
| 2002/0049573 A1 | 4/2002 | El Ata | | 2005/0086502 A1 | 4/2005 | Rayes et al. |
| 2002/0057684 A1 | 5/2002 | Miyamoto et al. | | 2005/0091078 A1 | 4/2005 | Hunt et al. |
| 2002/0069267 A1* | 6/2002 | Thiele ................. 709/219 | | 2005/0091227 A1* | 4/2005 | McCollum et al. ......... 707/100 |
| 2002/0069369 A1 | 6/2002 | Tremain | | 2005/0097097 A1 | 5/2005 | Hunt et al. |
| 2002/0075844 A1 | 6/2002 | Hagen | | 2005/0097146 A1 | 5/2005 | Konstantinou et al. |
| 2002/0082820 A1 | 6/2002 | Ferguson et al. | | 2005/0102388 A1 | 5/2005 | Tabbara et al. |
| 2002/0087264 A1 | 7/2002 | Hills et al. | | 2005/0102513 A1 | 5/2005 | Alve |
| 2002/0090089 A1 | 7/2002 | Branigan et al. | | 2005/0125212 A1 | 6/2005 | Hunt et al. |
| 2002/0120761 A1 | 8/2002 | Berg | | 2005/0138416 A1 | 6/2005 | Qian et al. |
| 2002/0131601 A1 | 9/2002 | Ninomiya et al. | | 2005/0152270 A1 | 7/2005 | Paredes et al. |
| 2002/0138551 A1 | 9/2002 | Erickson | | 2005/0192971 A1 | 9/2005 | Tabbara et al. |
| 2002/0152086 A1 | 10/2002 | Smith et al. | | 2005/0193103 A1 | 9/2005 | Drabik |
| 2002/0156900 A1 | 10/2002 | Marquette et al. | | 2005/0246529 A1 | 11/2005 | Hunt et al. |
| 2002/0161839 A1 | 10/2002 | Colasurdo et al. | | 2005/0246771 A1 | 11/2005 | Hunt et al. |
| 2002/0171690 A1 | 11/2002 | Fox et al. | | 2005/0251783 A1 | 11/2005 | Torone et al. |
| 2002/0184327 A1 | 12/2002 | Major et al. | | 2005/0257244 A1 | 11/2005 | Joly et al. |
| 2002/0188941 A1 | 12/2002 | Cicciarelli et al. | | 2005/0268325 A1 | 12/2005 | Kuno et al. |
| 2002/0194342 A1 | 12/2002 | Lu et al. | | 2006/0025984 A1 | 2/2006 | Papaefstathiou et al. |
| 2002/0194345 A1 | 12/2002 | Lu et al. | | 2006/0025985 A1 | 2/2006 | Vinberg et al. |
| 2002/0194369 A1 | 12/2002 | Rawlings et al. | | 2006/0031248 A1 | 2/2006 | Vinberg et al. |

| | | | |
|---|---|---|---|
| 2006/0034263 A1 | 2/2006 | Outhred et al. | |
| 2006/0037002 A1 | 2/2006 | Vinberg et al. | |
| 2006/0048017 A1 | 3/2006 | Anerousis et al. | |
| 2006/0123040 A1 | 6/2006 | McCarthy et al. | |
| 2006/0149838 A1 | 7/2006 | Hunt et al. | |
| 2006/0155708 A1 | 7/2006 | Brown et al. | |
| 2006/0161879 A1 | 7/2006 | Lubrecht et al. | |
| 2006/0161884 A1 | 7/2006 | Lubrecht et al. | |
| 2006/0232927 A1 | 10/2006 | Vinberg et al. | |
| 2006/0235664 A1 | 10/2006 | Vinberg et al. | |
| 2006/0259609 A1 | 11/2006 | Hunt et al. | |
| 2006/0259610 A1 | 11/2006 | Hunt et al. | |
| 2006/0271341 A1 | 11/2006 | Brown et al. | |
| 2007/0006177 A1 | 1/2007 | Alber et al. | |
| 2007/0112847 A1 | 5/2007 | Dublish et al. | |
| 2007/0192769 A1 | 8/2007 | Mimura et al. | |
| 2008/0059214 A1 | 3/2008 | Vinberg et al. | |

FOREIGN PATENT DOCUMENTS

| | | | |
|---|---|---|---|
| CN | 1375685 A | | 10/2002 |
| EP | 0964546 A2 | | 12/1999 |
| EP | 1180886 A1 | | 2/2002 |
| EP | 1307018 A1 | | 5/2003 |
| JP | 6250956(A) | | 9/1994 |
| JP | 8297567 | | 11/1996 |
| JP | 10124343(A) | | 5/1998 |
| JP | 10240576(A) | | 9/1998 |
| JP | 11007407 | | 1/1999 |
| JP | 11340980 A | | 12/1999 |
| JP | 11345180(A) | | 12/1999 |
| JP | 2000151574(A) | | 5/2000 |
| JP | 2000293497 A | | 10/2000 |
| JP | 2001339437 A | | 12/2001 |
| JP | 2001526814 | | 12/2001 |
| JP | 2002084302 | | 3/2002 |
| JP | 2002354006 A | | 12/2002 |
| JP | 2003030424(A) | | 1/2003 |
| JP | 2003532784 | | 11/2003 |
| JP | 2005155729 | | 6/2005 |
| KR | 10-2002-0026751 | | 4/2002 |
| KR | 10-2004-0008275 | | 1/2004 |
| RU | 2111625 C1 | | 5/1998 |
| RU | 2189072 C2 | | 9/2002 |
| WO | WO9853410 | | 11/1998 |
| WO | WO9930514 A2 | | 6/1999 |
| WO | WO9963439 | | 12/1999 |
| WO | WO0022526 | | 4/2000 |
| WO | WO0031945 | | 6/2000 |
| WO | WO0073929 | | 12/2000 |
| WO | WO0230044 A2 | | 4/2002 |
| WO | WO0237748 | | 5/2002 |
| WO | WO02085051 | | 10/2002 |
| WO | WO03027876 A1 | | 4/2003 |
| WO | WO03039104 | | 5/2003 |

OTHER PUBLICATIONS

"C.O.B.A.S Centralized Out-Of-Band Authentication System", QT Worldtel Inc., Sep. 8-9, 2003, pp. 14.

"Enhanced IP Services for Cisco Networks", retrieved on Jun. 19, 2007, at <<http://proquest.safaribooksonline.com/1578701066>>, Sep. 23, 1999, pp. 11.

Frolund, et al., "Design-Time Simulation of a Large-Scale, Distrubuted object System" ACM 1998, pp. 374-400.

Harbour, et al., "MAST An Open Environment for Modeling, Analysis, and Design of Real-Time Systems", available at least as early as Jan. 10, 2007, at <<http:// citeseer.ist.psu.edu/cache/papers/cs/30959/http:zSzzSzwww.ctr.unican.eszSzpublicationszSzmgh-jlm-jjg-jcp-jmd-2 002a.pdf/mast-an-open-environment.pdf>>, pp. 1-16.

Howard et al., "Designing Secure Web-Based Applications for Microsoft Windows 2000", 2000.

Levillain, et al., "Switch-Based Server Load Balancing for Enterprises," Alcatel Telecommunications Review; No. 4 pp. 298-302; 2002.

Liu et al., "Visualization in Network Topology Optimization", ACM, 1992, pp. 131-138.

Miyamoto, et al., "VLAN Management System on Large-scale Network," Journal of Information Processing Society of Japan, vol. 41, No. 12, pp. 3234-3244, the Information Processing Society of Japan, Dec. 15, 2000, (CSDB: National Academy Paper 200200108005).

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

"Pretty Good Privacy PGP for Personal Privacy, Version 5.0 For Windows 95 Windows NT", Pretty Good Privacy Inc., 1997, pp. 137.

Shi et al., "An Effective Model for Composition of Secure Systems", The Journal of Systems and Software, 1998, pp. 233-244.

Somers, "Hybrid: Unifying Centralised and Distributed Network Management Using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html, p. 1.

Burns et al., "Allocation and Data Placement Using Virtual Contiguity", Feb. 6, 2001, 6 pgs.

Vadim, "On Virtual Data Centers and Their Operating Environments", Computer Systems and Technology Laboratory, HP Labs, Mar. 16, 2001, 20 pgs.

Chunxiao, et al., "Configure and move the e-Commerce Business Model by Utilizing XML, Applications of Computer Systems", No. 2, Feb. 28, 2002, p. 8-11.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx.

Menezes, et al., "Handbook of Applied Cryptography", CRC Press, 1996, Chapters 8 & 12, pp. 283-319 and 489-541.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

The Japanese Office Action mailed on Jan. 26, 2007 for Japanese Patent Application No. 2001-326848, a counterpart foreign application of U.S. Patent No. 6,886,038.

The Japanese Office Action mailed on Dec. 14, 2007 for Japanese Patent Application No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Lee, et al., "Community Services: A Toolkit for Rapid Deployment of Network Services", Proceedings of the IEEE International Conference on Cluster Computing, Cluster 2002, IEEE, 2002, 4 pages.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb. 20, 2007, 9 pgs.

"System Definition Model," Windows Server System Home, http://www.microsoft.com/windowsserversystem/dsi/sdm.mspx.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, 2001, http://www.hpl.hp.com/techreports/2001/HPL-2001-276.pdf.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

Morimotoet al., "Compatabilty Testing for Windows Server 2003", Microsoft Windows Server 2003 Unlesahed, Chapter 18, Section 1, Jun. 14, 2004, 2 pages.

Sloman, "Policy Driven Management for Distributed Systems", Journal of Networks and System Management, 1994, vol. 2, No. 4, Plenum Publishing Corporation 1994, pp. 333-360.

Yonezawa, "Feature article UML-compatible modeling tool front line, Ensure consistence between code and model, Applicable to a large-scale team development", DB Magazine, Japan, Mar. 1, 2002, vol. 11, No. 13, pp. 97-105.

Yuura, "Component-Oriented Development Method and Environment for Advanced Enterprises Information Systems", Japan, May 1, 1998, vol. 80 No. 5, pp. 25-30.

Nagase, "Catalysis: Development of Component Based Application by Using UML", bit, vol. 31, No. 7, pp. 37-45, Kyoritsu Publishing, Co., Ltd., Japan, Jul. 1, 1999.

Notice of Rejection (English translation) from Japanese Application 2004-63,225, mailed on Sep. 14, 2010, 5 pages.

* cited by examiner

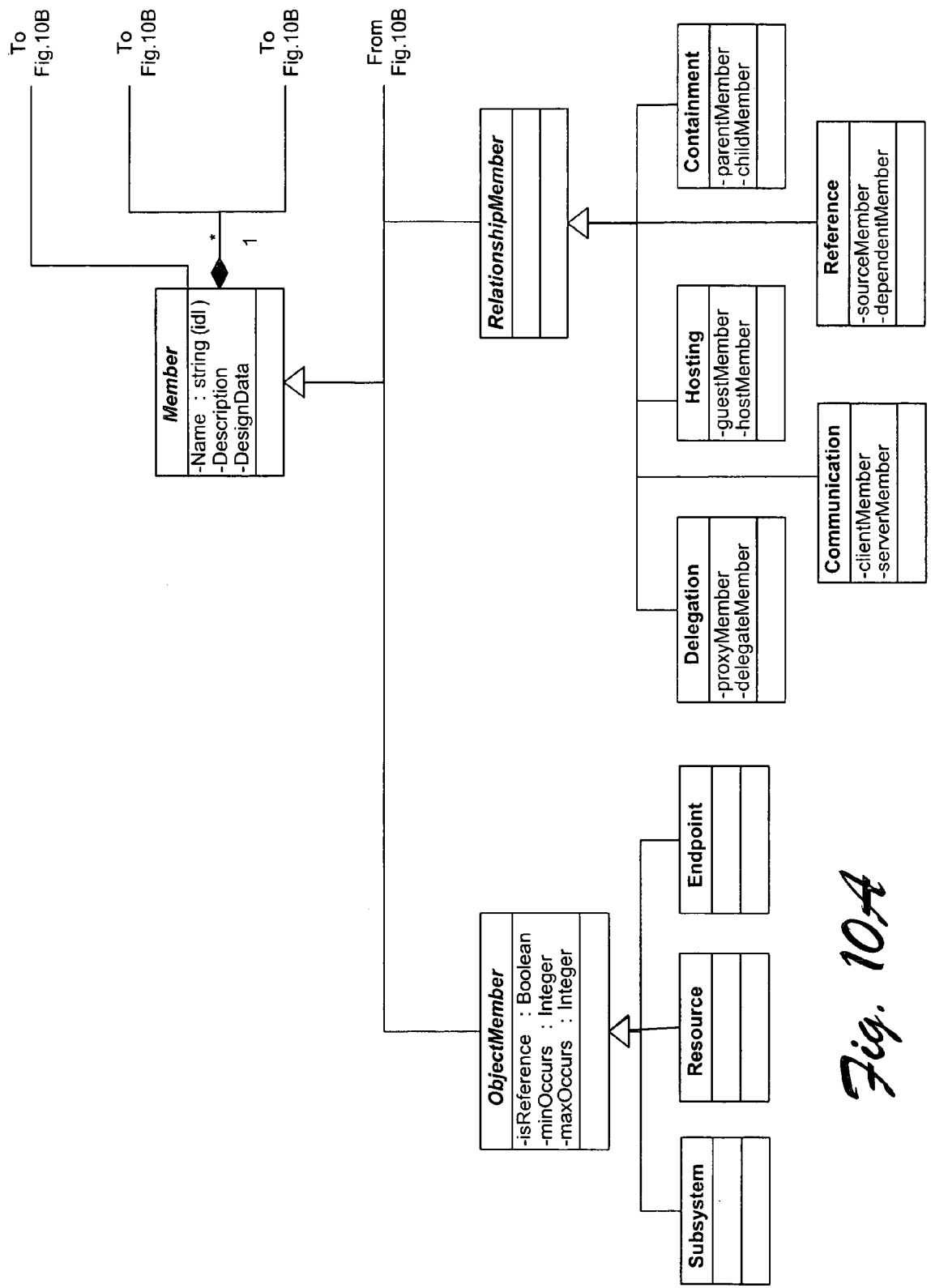

ARCHITECTURE FOR DISTRIBUTED COMPUTING SYSTEM AND AUTOMATED DESIGN, DEPLOYMENT, AND MANAGEMENT OF DISTRIBUTED APPLICATIONS

RELATED APPLICATIONS

This application claims the benefit of U.S. Provisional Application No. 60/452,736, filed Mar. 6, 2003, entitled "ARCHITECTURE FOR DISTRIBUTED COMPUTING SYSTEM AND AUTOMATED DESIGN, DEPLOYMENT, AND MANAGEMENT OF DISTRIBUTED APPLICATIONS", which is hereby incorporated by reference.

This patent application is related to the following U.S. patent applications (all of which are incorporated by reference):

- U.S. patent application Ser. No. 10/382,942, filed on Mar. 6, 2003, titled "VIRTUAL NETWORK TOPOLOGY GENERATION".
- U.S. patent application Ser. No. 09/695,812, filed on Oct. 24, 2000, titled "SYSTEM AND METHOD FOR DISTRIBUTED MANAGEMENT OF SHARED COMPUTERS".
- U.S. patent application Ser. No. 09/695,813, filed on Oct. 24, 2000, titled "SYSTEM AND METHOD FOR LOGICAL MODELING OF DISTRIBUTED COMPUTER SYSTEMS".
- U.S. patent application Ser. No. 09/695,820, filed on Oct. 24, 2000, titled "SYSTEM AND METHOD FOR RESTRICTING DATA TRANSFERS AND MANAGING SOFTWARE COMPONENTS OF DISTRIBUTED COMPUTERS".
- U.S. patent application Ser. No. 09/695,821, filed on Oct. 24, 2000, titled "USING PACKET FILTERS AND NETWORK VIRTUALIZATION TO RESTRICT NETWORK COMMUNICATIONS".
- U.S. patent application Ser. No. 09/696,707, filed on Oct. 24, 2000, titled "SYSTEM AND METHOD FOR DESIGNING A LOGICAL MODEL OF DISTRIBUTED COMPUTER SYSTEM AND DEPLOYING PHYSICAL RESOURCES ACCORDING TO THE LOGICAL MODEL".
- U.S. patent application Ser. No. 09/696,752, filed on Oct. 24, 2000, titled "SYSTEM AND METHOD PROVIDING AUTOMATIC POLICY ENFORCEMENT IN A MULTI-COMPUTER SERVICE APPLICATION".

TECHNICAL FIELD

The invention relates to an architecture for a distributed computing system.

BACKGROUND

Internet usage has exploded over the past several years and continues to grow. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is a data center (such as an Internet data center (IDC) or an Enterprise Data Center (EDC)), which is a specifically designed complex that houses many computers for hosting network-based services. Data centers, which may also go by the names of "Webfarms" or "server farms", typically house hundreds to thousands of computers in climate-controlled, physically secure buildings. Data centers typically provide reliable Internet access, reliable power supplies, and a secure operating environment.

Today, large data centers are complex and often called upon to host multiple applications. For instance, some web-sites may operate several thousand computers, and host many distributed applications. These distributed applications often have complex networking requirements that require operators to physically connect computers to certain network switches, as well as manually arrange the wiring configurations within the data center to support the complex applications. As a result, this task of building physical network topologies to conform to the application requirements can be a cumbersome, time consuming process that is prone to human error. Accordingly, there is a need for improved techniques for designing and deploying distributed applications onto the physical computing system.

SUMMARY

An architecture and methodology for designing, deploying, and managing a distributed application onto a distributed computing system is described.

BRIEF DESCRIPTION OF THE DRAWINGS

The same numbers are used throughout the drawings to reference like features.

DETAILED DESCRIPTION

The following disclosure describes a number of aspects pertaining to an architecture for designing and implementing a distributed computing system with large-scale application services. The disclosure includes discussion of a system definition model (SDM), which is also referred to as a service definition model, and an SDM runtime environment. The disclosure further includes design aspects such as how to model various data center components.

As used herein, the term "wire" may also be referred to as "connections", "communication", or "communication relationship". Also, the term "system" may be referred to as "module" and the term "resource space" may be referred to as "resources". Additionally, the term "application space" may also be referred to as "applications", and the term "instance space" may also be referred to as "instances". Further, the term "class" may also be referred to as "abstract definition", the term "port" may also be referred to as "endpoint", and the term "type" may also be referred to as "definition".

Figure 1:
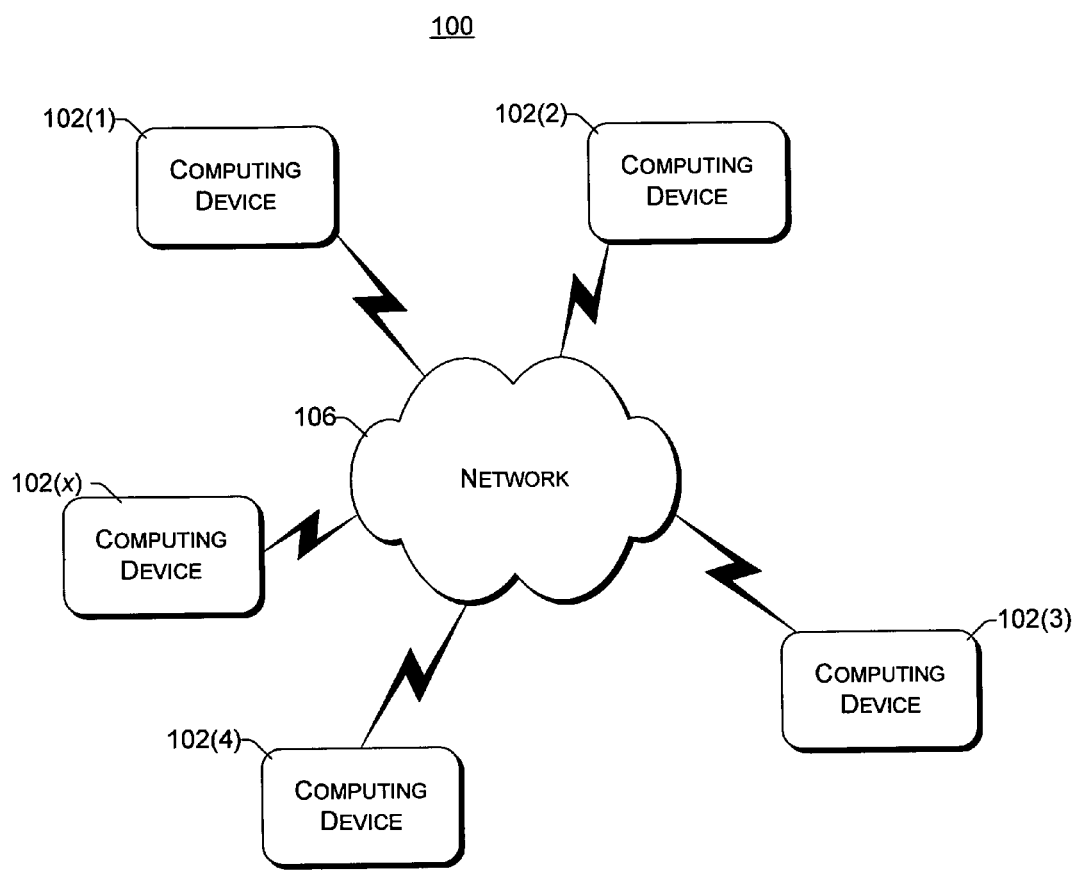
FIG. 1 illustrates an example network setting.

FIG. 1 illustrates an example network setting 100. In setting 100, multiple (x) computing devices 102(1), 102(2), . . . , 102(x) are coupled to a network 106. Network 106 is intended to represent any of a variety of conventional network topologies and types (including wire and/or wireless networks), employing any of a variety of conventional network protocols (including public and/or proprietary protocols). Network 106 may include, for example, a local area network (LAN), a wide area network (WAN), portions of the Internet, and so forth. Setting 100 represents any of a wide variety of settings, including, for example, data centers (e.g., Internet data centers (IDCs)), office or business settings, home settings, educational or research facilities, retail or sales settings, data storage settings, and so forth.

Computing devices 102 can be any of a variety of conventional computing devices, including desktop PCs, workstations, mainframe computers, server computers, Internet appliances, gaming consoles, handheld computers, cellular telephones, personal digital assistants (PDAs), etc. One or more of devices 102 can be the same types of devices, or alternatively different types of devices. Additionally, even if multiple devices are the same types of devices, the multiple devices may still be configured differently (e.g., two devices 102 may be server computers, but may have different hardware configurations, such as different processors, different amounts of RAM, different sizes of hard disk drives, and so forth).

One or more computing devices 102 may also be re-configured after being added to setting 100. For example, a particular computing device 102 may operate for a period of time (e.g., on the order of minutes, hours, days, months, etc.) performing one function, and then an administrator may decide that a different function is desirable (e.g., change from being a server computer to a workstation computer, from a web server to a local file server, etc.).

Figure 2:
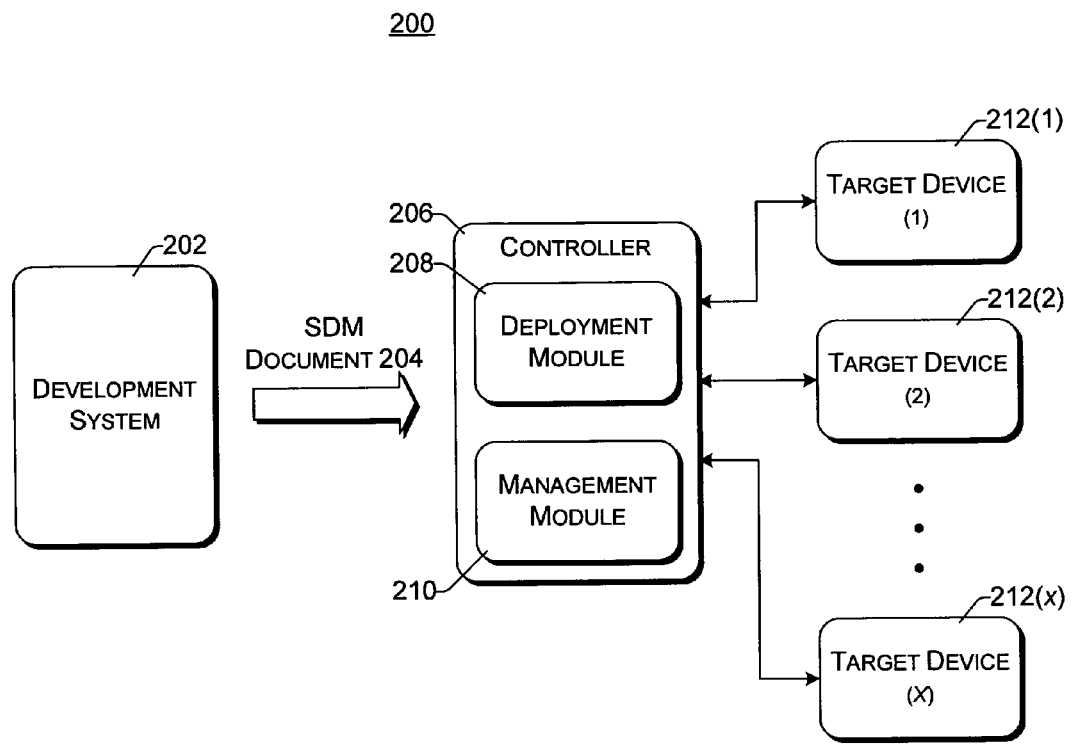
FIG. 2 is a block diagram illustrating an example architecture using the SDM definition model.

FIG. 2 is a block diagram illustrating an example architecture 200 using the system definition model. The SDM is designed to be used across the entire lifecycle of a system. A system is a set of related software and/or hardware resources that can work together to accomplish a common function. One example of such a system is an application, which refers to a set of instructions that can be run or executed by a computing device to perform various functionality. Examples of applications include entertainment applications such as games, productivity applications such as word processors, reference applications such as electronic encyclopedias, distributed applications such as may be used for web services or financial analysis, and so forth. Another example of such a system is an environment on which an application (or another environment) can be deployed. An environment refers to the software and/or hardware resources on which an application (or another environment) is deployed. Such environments can be layered, as discussed in more detail below.

The lifecycle of a system typically includes three primary phases (also referred to as stages): a design or development phase, followed by a deployment or installation phase, followed by an operations or management phase. As the model applies to all three phases of the lifecycle of a system, the model can thus be seen as an integration point for the various phases in the lifecycle of a system, and facilitates each of these phases. Additionally, by using the model knowledge can be transferred between these phases, such as knowledge regarding management of the system (e.g., being fed back to the design and development team (e.g., thereby allowing the design and development team to modify the system, such as for future versions or to improve the performance of the current version); knowledge of the structure, deployment requirements and operational behavior of the system; knowledge of the operational environment from the desktop to the data center; knowledge of the service level as observed by the end user; and so forth.

Generally, during the design phase, development tools leveraging the SDM are used to define a system comprised of communicating software and hardware components. A system definition contains all information necessary to deploy and operate a distributed system, including required resources, configuration, operational features, policies, etc. During the deployment phase, the system definition is used to automatically deploy the system and dynamically allocate and configure the software and hardware (e.g., server, storage and networking) resources required. The same system definition can be used for deployments to different host environments and to different scales. During the management phase, an SDM Service in the operating system provides a system-level view for managing the system. This enables new management tools to drive resource allocation, configuration management, upgrades, and process automation from the perspective of a system.

The architecture 200 employs the SDM definition model as well as a schema that defines functional operations within the SDM definition model. The definition model includes various different kinds of data structures which are collectively referred to as "definitions". Functionality of the SDM is exposed through one or more platform services, such as application program interfaces (APIs).

During the design phase for a system, a development system 202 generates a document that contains the system definition, such as an SDM document 204. Development system 202 can be any of a variety of development systems, such as the Visual Studio® development system available from Microsoft® Corporation of Redmond, Wash. SDM document 204 defines all information (also referred to herein as knowledge) related to the deployment and management of the system. Any knowledge necessary for or used when deploying the system or managing the system is included in SDM document 204. Although described herein as a single document, it is to be appreciated that the knowledge could alternatively be spread out and maintained in multiple documents.

SDM document 204 includes one or more constraints (also referred to as requirements) of the system that an environment in which the system is to be deployed and/or run must satisfy. The environment itself is also described using an SDM document. Such environments can be single computing devices, or alternatively collections of computing devices (e.g., data centers), application hosts, etc. Different systems can be installed to different environments. For example, a data center may include fifty computing devices, and one system may be deployed to five of those computing devices, while another system may be deployed to thirty five of those computing devices. These requirements can take a variety of forms, such as: hardware requirements regarding the computing device(s) on which the system is to be deployed (e.g., a minimum processor speed, a minimum amount of memory, a minimum amount of free hard drive space, a minimum amount of network bandwidth available, particular security mechanisms available, and so forth), software requirements regarding the computing device(s) on which the system is to be deployed (e.g., a particular operating system, one or more other applications that also must be installed, specifications regarding how a particular system and/or the operating system is to be configured, a particular type of security or encryption in use, and so forth), other requirements regarding the computing device(s) on which the system is to be deployed (e.g., particular security keys available, data center policies that must be enforced, authentication that is used, environment topology, etc.).

Requirements can also go in the other direction—that is, the environment can have constraints or requirements on the configuration of the system that is to be installed (e.g., to implement the standards or policies of the environment). These can be "explicit" requirements that are created by the operator of the environment, such as particular settings or configurations the system must have, particular functionality the system must provide or support, particular.security mechanisms the system must support, and so forth. These can also be "implicit" requirements that that arise because of a particular configuration of the environment. For example, if a host computing device in the environment is using a particular type of file system then it may not be possible for some actions to be performed using that file system (although it may be possible for those same actions to be performed using another file system).

During the design and development phase of the system, SDM document 204 can be used to validate the system for one or more particular environment(s). This is a two-way validation: the system is validated for the environment and the environment is validated for the system. The environment can be validated for the system by comparing the requirements identified in the SDM document 204 with the environment and determining whether all of the requirements are satisfied by the environment. The system can be validated for the environment by comparing the requirements identified in an SDM document for the environment with the system and determining whether all of the requirements are satisfied by the system. If all of the requirements are satisfied by the environment and the system, then the designer or developer knows that the system can be deployed in and will run in the environment. However, if all of the requirements are not satisfied by the environment and/or the system, then the designer or developer is optionally informed of the requirements that were not satisfied, thereby informing the designer or developer of what changes should be made to the SDM document 204 (and correspondingly to the system) and/or to the environment in order for the system to be deployed and run in that environment.

The knowledge regarding deployment of the system that is included in the SDM document 204 describes how the system is to be deployed in one or more environments. The SDM document 204 is made available to a controller 206, which includes a deployment module 208 and a management module 210. In certain embodiments, the SDM document 204 as well as all of the files of the system (e.g., binaries, data, libraries, etc.) needed to install the system are packaged together into a single container (e.g., a single file) referred to as an SDU (System Definition Unit). Controller 206 can be one or more of computing devices 102 of FIG. 1. For example, a single device 102 of FIG. 1 may be the controller for a particular data center, or alternatively the controller responsibilities may be distributed across multiple devices 102.

Deployment module 208 includes services that are used to deploy the system in the environment(s). In FIG. 2, the environment in which the system is deployed (or is deployed on) is one or more target devices 212. Systems may also be deployed to controller 206. These services of deployment module 208 include one or more functions that can be called or invoked to install or deploy one or more systems in the environment.

Different knowledge for deployment in different environments may be included in the SDM document 204. This deployment knowledge describes any changes that need to be made to the environment (e.g., changes to a system registry; folders, directories, or files that need to be created; other setting or configuration parameters of the computing device that need to be set to particular values; and so forth), as well as what files (e.g., program and/or data files) that need to be copied to the computing device(s) in the environment and any operations that need to be performed on those files (e.g., some files may need to be decompressed and/or decrypted). In many implementations, the deployment knowledge in the SDM document 204 includes, for example, information analogous to that presently found in typical setup or installation programs for systems.

During the deployment process, controller 206 generates a record or store of the software and hardware resources involved in the deployment as well as the relationships between them. This record or store can subsequently be used by controller 206 during the management phase.

Management module 210 includes services that are used to manage the system once it is installed in the environment(s). These services of management module 210 include one or more functions that can be called or invoked to manage the systems in the environment. The knowledge regarding management of the system that is included in the SDM document 204 describes how the system is to be managed in one or more environments.

Different knowledge for managing a system in different environments may be included in the SDM document 204. The management knowledge includes any knowledge used in the management or operation of the system. Management involves, for example, configuration (and optionally subsequent reconfiguration), patching and upgrading, maintenance tasks (e.g., backup), health or performance monitoring, and so forth.

Changes to deployed systems are made through management module 210. The services of management module 210 include one or more functions that can be called or invoked to make changes to one or more systems deployed in the environment. By making such changes through the management module 210, several benefits can be realized. One such benefit is that controller 206 can maintain a record of the changes that have been made. Controller 206 may maintain a copy of the SDM document 204 for the system and record in the SDM document 204 any changes that are made to the system. Alternatively, controller 206 may maintain a separate record of the changes made to the system.

This record of changes maintained by controller 206 can simplify subsequent operations, such as solving problems with the system and/or environment, or when having to reinstall the system due to a hardware failure (allowing the system to be reinstalled and returned to running with the same parameters/settings as it had at the time of failure). By having such changes made through controller 206 and by having controller 206 maintain the record, some human error can be removed from the environment (e.g., if the administrator making the change is supposed to log the change in a book but forgets to do so there would be no record of the change—this problem is solved by having controller 206 maintain the record).

Furthermore, by making changes to systems through controller 206, as well as deploying systems through controller 206, controller 206 can serve as the repository of knowledge about the environment, the systems deployed in the environment, and interactions between them. Knowledge regarding the environment and/or systems deployed in the environment can be readily obtained from controller 206. This knowledge can be used to ensure the consistency of the controlled environment by validating that the controlled devices in the environment reflect the state stored in the central controller 206.

It should be noted that in some situations changes may be made to a system and/or environment but are not made through controller 206. For example, a computing device may be accidentally turned off or may fail. In these situations, attempts are made to reflect such changes in controller 206. These changes may be reflected in controller 206 automatically (e.g., a system may run that attempts to detect device failures and use the services of management module 210 to notify controller 206 of such failures) or may be reflected in controller 206 manually (e.g., an administrator may use the services of management module 210 to notify controller 206 of such changes). Alternatively, the changes that were made could be reversed to bring the system and/or portion of the environment back into line with the desired state of the system as recorded by controller 206.

The SDM document 204 can thus be viewed as a "live" document—it can be constantly changing based on changes to the environment and/or changes to the system throughout the lifecycle of the system.

System Definition Model (SDM)

The system definition model (SDM) is a modeling technology used to create definitions of systems. A system is a set of related software and/or hardware resources that work together to accomplish a common function. Example systems include multi-tier line-of-business applications, Web services, e-commerce sites, and enterprise data centers. The SDM provides tools and a context for an application architect, network architect, datacenter architect, or other developer to design distributed computer applications and data centers in an abstract manner. The SDM defines a set of elements that represent functional units of the systems that will eventually be implemented by physical computer resources and software. The SDM also defines elements that are relevant to operators or other individuals that will manage a system. Additionally, the SDM captures data pertinent to development, deployment, and operations. Associated with the SDM elements is a schema that dictates how functional operations represented by the components are to be specified.

A system is composed of resources, endpoints, relationships and sub-systems. Definitions of each of these items are declared in an SDM document. An SDM document is an XML document that contains one or more definitions of systems, resources, endpoints and relationships. Resources may be hardware resources or software resources. Endpoints represent communications across systems. Relationships define associations between systems, resources and endpoints. Sub-systems can be treated as complete systems and are typically part of a larger system.

A system definition captures the basic structure of a dynamic system. It can be viewed as the skeleton on which all other information is added. This structure is typically specified during the development process, by architects and developers, and typically does not change frequently. In addition to the structure, the SDM can contain deployment information, installation processes, schemas for configuration, events and instrumentation, automation tasks, health models, operational policies, etc. Other information can be added by the operations staff, by vendors, and/or by management systems across the lifetime of a distributed system.

SDM Schema Design Specification

Figure 3:
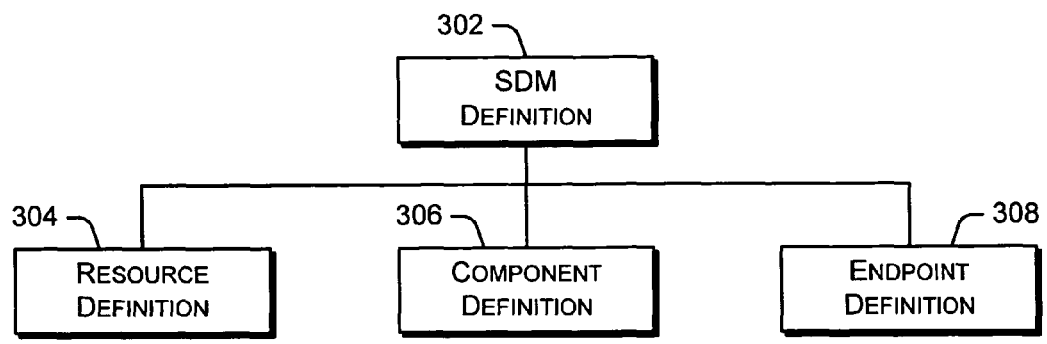
FIG. 3 illustrates an example definition structure defined in the SDM schema design specification.

The SDM is designed to support description of the configuration, interaction and changes to the components in a distributed system (e.g., the modeled system). "Definitions" describe entities that exist in a system and "relationships" identify the links between the various entities. Definitions and relationships are further defined to capture semantic information relevant to the SDM. As shown in FIG. 3, an SDM definition 302 includes three sub-definitions: a resource definition 304, a component definition 306, and an endpoint definition 308.

Figure 4:
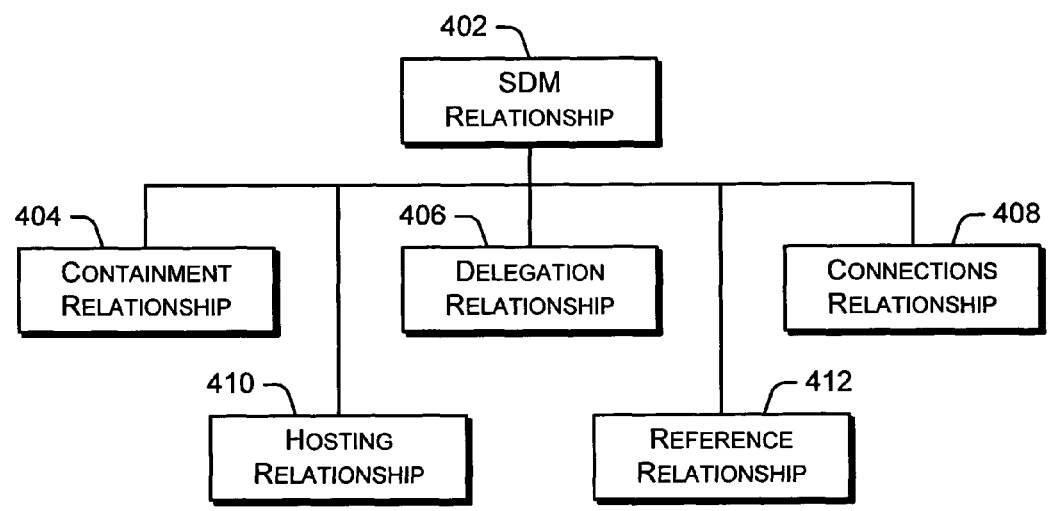
FIG. 4 illustrates an example relationship structure defined in the SDM schema design specification.

As shown in FIG. 4, an SDM relationship 402 includes five sub-relationships: a containment relationship 404, a delegation relationship 406, a connections relationship 408, a hosting relationship 410, and a reference relationship 412. The connections relationship 408 may also be referred to as a "communication relationship". Further details regarding definitions and relationships are provided below.

The SDM includes "abstract definitions" that provide a common categorization of system parts, provide tool support for a wide range of applications and provide the basis for definition checking at design time. A set of abstract definitions provide a comprehensive basis for service design. "Concrete definitions" represent parts of an actual application or data center design. A concrete definition is generated by selecting an abstract definition and providing an implementation that defines the concrete definition's members and setting values for its properties. Distributed applications are generated using collections of these concrete definitions.

The SDM also includes "constraints" that model restrictions based on the allowed set of relationships in which an instance of a relationship can participate. Constraints are useful in describing requirements that depend on the configuration of objects involved in a relationship. For example, a constraint may be used to determine whether participants on each end of a communication protocol are using compatible security settings.

A flow can be identified as part of a definition and/or a resource. This flow is used to control application behavior at runtime by propagating operator settings to the systems, subsystems, or other components that utilize such settings.

Abstract Definitions and Relationships

Abstract definitions define the building blocks that check application configuration at design time and then deploy and manage an application at run time. These building blocks represent entities that exist in the modeled system. For example, abstract definitions can model files and directories, the configuration inside a web server, or the databases inside a SQL server.

Abstract relationships model the interactions that can occur between abstract definitions. Relationships are binary and directed, identifying the definitions of the instances that participate in manifestations of the relationship. Relationships provide a way of associating entities with one another, thereby allowing the modeling of containment, construction and communication links between entities.

Constraints are used by definitions to constrain the relationships in which they participate. Constraints are further used by relationships to constrain the definitions that can be linked. These constraints can target the definition and settings of participants in a relationship.

The abstract definition space is divided into three categories: components, endpoints and resources. Abstract component definitions describe self-contained independently deployable parts of an application. These definitions represent parts of an application that interact through well-defined communication channels that can cross process and machine boundaries. Abstract endpoint definitions describe the communication endpoints that a component may expose. These abstract endpoint definitions can model all forms of communication that the system is aware of to verify system connectivity at design time and to enable connections at runtime. Abstract resource definitions describe behavior that is contained within a component. Resource definitions may have strong dependencies on other resource definitions. These dependencies can include requiring a specific installation order and initiating runtime interaction through various communication mechanisms.

Abstract definitions include the ability to expose settings. In one embodiment, these settings are name-value pairs that use an XML schema to define the definition of the setting. Settings can be dynamic or static. Static settings are set during the deployment process. Dynamic settings can be changed after deployment. The code responsible for applying settings values to the running system is hosted in the SDM runtime.

The SDM model supports inheritance over abstract definitions. A derived definition can extend the properties exposed by its parent and can set values for its parent's properties. A derived definition can participate in the relationships that identify its parent as a participant.

As mentioned above, relationships are divided in five categories: communication (or connections), containment, delegation, hosting and reference. Communication relationships capture potential communication interactions between abstract endpoint definitions. The existence of a communication relationship indicates that it may be possible for components that expose endpoints of the identified definition to communicate. The actual establishment of the link is subject to constraints on the endpoints and the exposure of the endpoints.

Containment relationships describe the ability of an abstract definition to contain members of other abstract definitions. More specifically, a containment relationship between two abstract definitions A and B allows a concrete definition that implements A to contain a member of a definition that implements B. Containment relationships model the natural nesting structures that occur when developers build applications. By containing a member of another definition, the parent is able to control the lifetime and visibility of the contained definition. All definition instances in the run time space exist as members of other definition instances, forming a completely connected set of instances. Thus, the set of containment relationships describes the allowed containment patterns that occur in the runtime space.

Delegation relationships selectively expose contained members. For example, delegation can expose endpoint members from component definitions. By delegating an endpoint from an inner component, the outer component exposes the ability to communicate using a particular protocol without exposing the implementation behind the protocol.

Hosting and reference relationships represent two forms of dependency relationships. A hosting relationship is used to capture knowledge regarding how to create an instance of a definition on a particular host. The hosting relationship allows the developer to create their own definition in a manner that is independent from the operation of a specific host. This relationship also allows a single definition to be deployed on multiple host types without rewriting the guest definition. The hosting relationship describes a primary dependency between abstract definitions that exists before an instance of a concrete definition is created. Each instance participates as a guest in a hosting relationship, thereby causing the hosting relationships to form a connected tree over the instance space. Reference relationships capture additional dependencies used for parameter flow and for construction ordering.

Concrete Definitions and Relationships

Concrete definitions are created from abstract definitions. Concrete relationships are created from abstract relationships. The combination of abstract definitions and abstract relationships defines a schema for modeling the target system. A concrete definition uses a subset of the abstract definition space to create a reusable configuration of one or more abstract definitions. The abstract definition space can be compared to the schema for a database. In this analogy, the concrete definition space represents a reusable template for a set of rows in the database. The concrete definition is validated against the abstract definition space in the same way that the rows in the database are validated against the constraints of the schema, such as foreign keys, etc. A developer can infer knowledge of the concrete definition from knowledge of the abstract definition. Thus, tools associated with the abstract definition can operate with many implementations that are derived from that abstract definition. For example, a tool that knows about abstract Web services can operate with any Web service deployed into a datacenter without requiring additional information from the developer.

Each concrete definition provides an implementation for a specific abstract definition that includes extensions to the settings schema, values for settings, declarations for definition and relationship members, and constraints on the relationships in which the definition can participate. The behavior of the concrete definition follows the definition of the abstract definition. In particular, abstract component definitions become component definitions, abstract endpoint definitions become endpoint definitions and abstract resource definitions become resource definitions.

Each concrete relationship provides an implementation for a specific abstract relationship that includes a settings schema and settings values, nested members of the same relationship category (e.g., hosting, containment, or communication), and constraints on the definitions that can participate in the relationship.

Concrete hosting relationships define a set of hosting relationships that can map the members of one concrete definition onto another concrete definition. For example, a concrete hosting relationship can identify the bindings between a web application and the IIS host to which it will be deployed. More than one hosting relationship can exist for a particular definition, thereby allowing the developer to define deployments for specific topologies.

A concrete definition can declare members of other concrete or abstract definitions—referred to as "definition members". These definition members are then referenced from "relationship members" that define the relationships between the definition members. Definition members include references to instances of a particular definition. Settings flow can provide values for the definition or can constrain the construction parameters used when creating the definition. When declaring a definition member, the user (e.g., developer) can decide whether the definition member is created at the same time the outer component is created (referred to as "value semantics") or whether the definition member is created by an explicit new operation that occurs at a later time (referred to as "reference semantics").

Relationship members define the relationships that definition members will participate in when they are created. If a definition member is contained in the concrete definition, then a containment relationship member is declared between the definition member and this reference for the outer definition. If the definition member is delegated, then a delegation relationship member would be defined between the definition member and a nested definition member. Communication relationship members can be declared between endpoints on definition members and dependency relationship members (reference and hosting) can be declared between definition members or nested definition members.

Relationship constraints narrow the set of relationships in which a particular definition is willing to participate. Relationship constraints identify constraints on a particular relationship and on the participants at the other end of the relationship.

Instance Space

The instance space stored in the SDM runtime identifies the current state of the modeled system. The SDM runtime contains a record of the instances that have been created and the relationships between those instances. Each instance has an associated version history that links each version to a change request. A change request is the process that creates a new instance. The change request defines a set of create, update and delete requests for definitions and relationships associated with specific members of an existing instance. The root is handled as a special case.

The change request is expanded by the runtime, verified against one or more constraints, and then constructed. The expansion process identifies definition and relationship instances that are constructed implicitly as part of the construction request of the containing definition. As part of the expansion process, the settings flow is evaluated across all relationships. The verification step checks that all required relationships exist and that the relationships fulfill the necessary constraints. Finally, the construction process determines an appropriate ordering over the deployment, update, or removal of each instance. The construction process then, in the correct sequence, passes each instance to an instance manager to perform the appropriate action.

Data centers can be created using multiple software components. One or more connections are configured between the multiple software components. Some of these software components may function as hosts for the application layer. Example component definitions in the host layer include IIS, SQL, AD, EXCHANGE, DNS and Biztalk.

The network/OS/storage layer supports the construction of data center networks and platforms. This layer also supports the configuration of a network security model, configuration of the operating system platform and association of one or more storage devices with the operating system platform. Example component definitions in the network/OS/storage layer include VLAN, Windows, Filter and Storage.

The hardware layer identifies the definitions of systems that exist in the data center and the physical connections that exist between those systems. To satisfy the relationships needed by a particular component, that component is bound to a host component that has matching capabilities. This process is referred to as "logical placement". At deployment time, instances of the guest component are positioned on instances of the host component. This process is referred to as "physical placement".

Figure 5:
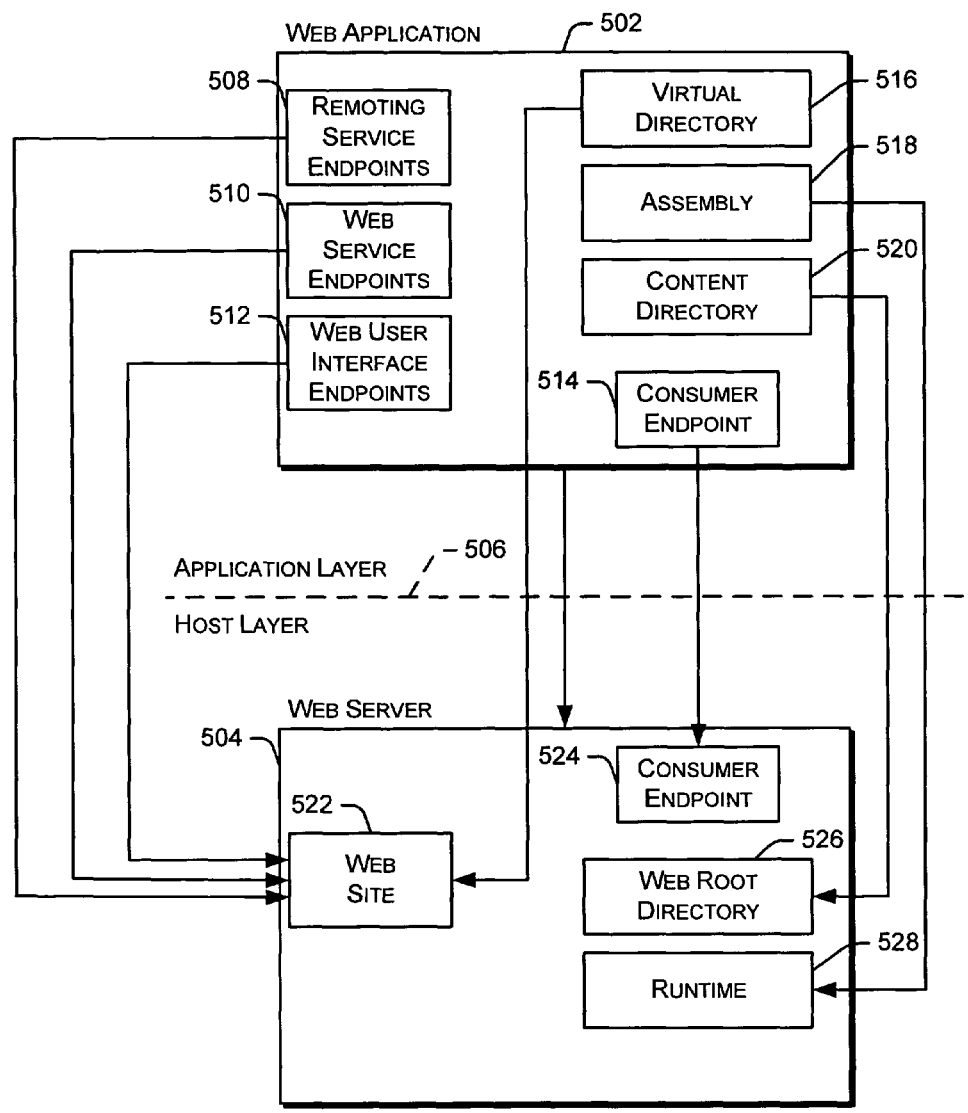
FIG. 5 illustrates an example of mapping a Web application to a Web server host.

FIG. 5 illustrates an example of mapping a Web application 502 to a Web server host 504. A boundary identified by broken line 506 separates an application layer from a host layer. Web application 502, contains remoting service endpoints 508, Web service endpoints 510 and Web user interface endpoints 512, all of which map to a Web site 522 in Web server 504. Additionally, a virtual directory 516 in Web application 502 maps to Web site 522. Web application 502 also includes a consumer endpoint 514 that maps to a consumer endpoint 524 in Web server 504. An assembly portion 518 of Web application 502 maps to a runtime portion 528 of Web server 504. A content directory 520 in Web application 502 maps to a Web root directory 526 in Web server 504.

A process for managing changes to a distributed system is associated with the SDM model. Changes to the distributed system are driven by a change request that passes through one or more processing steps before the actions in the request are distributed and executed against target systems.

Figure 6:
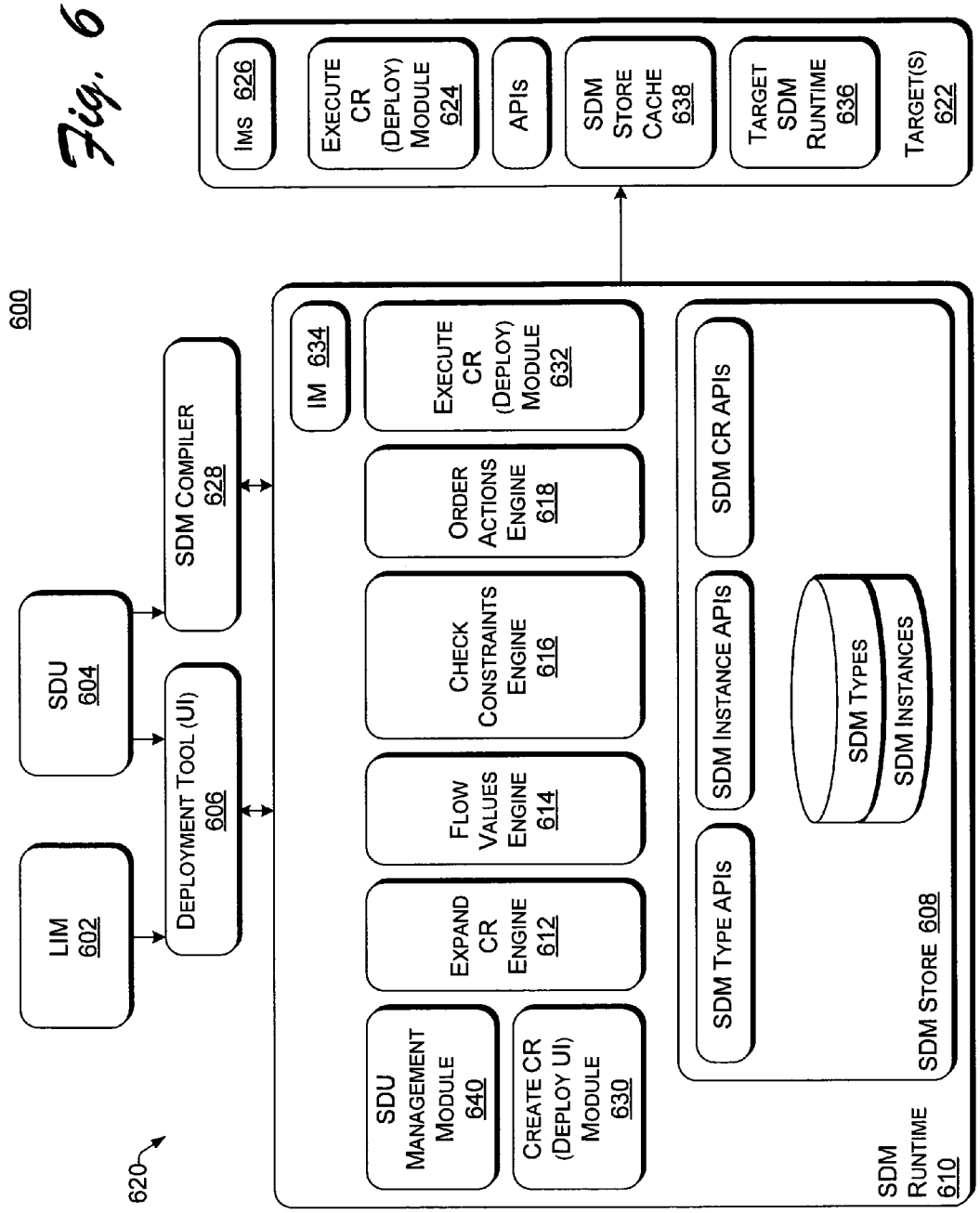
FIG. 6 illustrates an example architecture using an SDM runtime.

FIG. 6 illustrates an example architecture 600 using an SDM runtime. Architecture 600 is an example of architecture 200 of FIG. 2 using an SDM runtime 610 as well as the example implementation of the SDM discussed below in the section "Example Implementation". The SDM runtime 610 contains a set of components and processes for accepting and validating SDM files, loading SDUs (System Definition Units—which are packages of one or more SDM files and their related files), creating and executing SDM Change Requests and deploying SDM based systems into target environments. The runtime functionality allows systems described using the SDM to be defined and validated, deployed to a set of computing devices, and managed.

The following is a brief, functional discussion of how the components in FIG. 6 work together. An operator or administrator is able to describe an environment into which applications can be deployed, such as the topology of a data center. The operator or administrator produces an SDM file describing the environment, the file being referred to as the "logical infrastructure" (LIM) 602, or as a data center description or data center model. This SDM file can be generated using any of a variety of development systems, such as the Visual Studio® development system available from Microsoft® Corporation of Redmond, Wash.

Additionally, an application developer is able to design and develop their application using any of a variety of development systems, such as the Visual Studio® development system. As the developer defines components of the application and how these components relate to one another, the developer is able to validate the application description against the datacenter description 602. This is also referred to as "Design Time Validation".

Once the application is complete, the developer saves the description in an SDM and requests that the application be packaged for deployment as an SDU 604. The SDU includes the application SDM as well as the application binaries and other referenced files used to install the application.

The LIM 602 and SDU 604 are fed to deployment tool 606 of a controller device 620 for deployment. Deployment tool 606 includes a user interface (UI) to enable an operator to load the desired SDU 604. Deployment tool 606 works with create CR module 630 to install the application associated with the SDU 604 in accordance with the information in the SDM within SDU 604. Additionally, SDM definitions and instances from SDU 604 are populated in a store 608 of the SDM runtime 610. SDUs are managed in SDM runtime 610 by SDU management module 640, which makes the appropriate portions of the SDUs available to other components of runtime 610 and target(s) 622.

The operator can also specify what actions he or she wants to take on the targets 622 (e.g., target computing devices) on which the application is being deployed. The operator can do this via a deployment file, which is also referred to herein as a Change Request (CR). The CR is run through one or more engines 612, 614, 616, and 618. Generally, expand CR engine 612 expands the CR to identify all associated components as well as their connections and actions, flow values engine 614 flows values for the components (such as connection strings), check constraints engine 616 checks constraints between the environment and the application, and order actions engine 618 specifies the order for all of the necessary actions for the CR.

To initiate change to the system (including deploying an application) or validation of a model, an operator or process submits a CR. The CR contains a set of actions that the operator wants performed over the instances in the runtime 610. These actions can be, for example, create actions, update actions, and/or delete actions.

In addition to user or operator initiated change requests, there may also be expansion/automatically generated change requests that are generated as part of the expansion process, discussed in more detail below. Regardless of their source, the change requests, once fully expanded and checked, are executed by sending actions to the targets 622, such as: discover, install, uninstall and change a target instance.

The CR is treated as an atomic set of actions that complete or fail as a group. This allows, for example, the constraint checking engine 616 to consider all actions when testing validity.

In design time validation, the CR will be created by the SDM Compiler 628 and will contain one or the minimum of each SDM component in the SDM file. This CR of create instance commands will flow through the expansion engine 612, the flow values engine 614, and the constraint checking engine 616. Errors found in these three phases will be returned to the user via the development system he or she is using.

In deployment, the operator will create a CR with the UI presented by deployment tool 606. The CR will flow through all the engines 612, 614, 616, and 618 in the SDM runtime 610, and the appropriate actions and information will be sent by CR module 632 to the appropriate target(s) 622, where the request is executed (e.g., the application is installed). The appropriate target(s) 622 for a particular installation are typically those target(s) on which the application is to be installed.

When beginning to process a CR, in a definition resolution phase, create CR module 630 resolves all definitions and members that are referenced in the change request. The change request will assume that these are already loaded by the runtime 610; create CR module 630 initiates a load/compile action if they do not exist. Create CR module 630 also implements a path resolution phase where references to existing instances and instances defined by create actions within the change request are resolved.

The expansion performed by expansion engine 612 is a process where, given a change request, all the remaining actions required to execute the request are populated. In general, these actions are construction and destruction actions for definition and relationship instances. The operator could optionally provide details for all the actions required to construct or destroy an instance, or alternatively portions of the process can be automated: e.g., the operator provides key information about the changes he or she wants by identifying actions on members (e.g., byReference members), and the remainder of the actions are filled in on nested members (e.g., byReference and byvalue members) and relationships. By way of another example, automated expansion can also refer to external resource managers that may make deployment decisions based on choosing devices with available resources, locating the application close to the data it requires, and so forth.

Expansion engine 612 also performs "auto writing". During auto writing, engine 612 analyzes the scale invariant grouping of components and compound components specified in the SDM and determines how the components should be grouped and interconnected when scaled to the requested level.

Expansion engine 612 also performs value member expansion, reference member expansion (discovery), and relationship expansion.

Value member expansion refers to identification of all of the non-reference definition members. The cardinality of these members are noted and, since all the required parameters are known, for each member create requests are added to the change request for those members whose parent is being created. If the change request contains destruction operations, then destruction operations are added for all their contained instances.

Reference member expansion refers to reference members (as opposed to non-reference definition members). The cardinality of reference members is often undefined and they can have deployment time settings that require values in order for the instance to be constructed. So the process of expanding a reference member (e.g., a byReference member) can require more information about the instance than the runtime is in a position to provide.

Related to reference member expansion is a process referred to as discovery, which is a process used to find instances that have already been deployed. Discovery is an action typically initiated by an operator of the environment. For example, during an install request, expansion engine 612 determines if the instance already exists, if so determines what exists and if not then creates it. An instance manager (IM) 634 on the controller 620 communicates with the instance managers 626 on the target device 622 to initiate a discovery process. The discovery process returns data regarding the instance from the target device 622 to the controller 620.

The process of discovery populates reference definition members as part of a construction or update action. Typically, only reference members with object managers (instance managers that also do discovery) that support discovery participate in this process.

When a new instance is discovered a check is made that the instance does not already exist in the SDM database using instance specific key values. Once it is known that it is a new instance, the instance is classified according to the definitions of the members being discovered. If the instance does not match a member or there is an ambiguous match then the member reference is left blank and the instance is marked as offline and incomplete.

Relationship expansion refers to, once all the definition instances that will be constructed are known, creating relationship instances that bind the definition instances together. If definition instances are being destroyed, all relationship instances that reference the definition instances are removed.

To create the relationships the member space is used to identify the configurations of the relationships that should exist between the instances. Where the definition members have cardinality greater than one the topology of the relationships is inferred from the base relationship definition. For example, for communication relationship an "auto wiring"

can be done, and for host relationships a host is picked based on the algorithm associated with the hosting relationship.

During a flow stage, flow values engine 614 evaluates flow across all the relationship instances. Flow values engine 614 may add update requests to the change request for instances that were affected by any altered parameter flow. Engine 614 evaluates flow by determining the set of instances that have updated settings as a result of the change request. For each of these, any outgoing settings flows that depend on the modified settings are evaluated and the target nodes added to the set of changed instances. The process continues until the set is empty or the set contains a cycle.

After the flow statd, a process of duplicate detection is performed. The duplicate detection may be performed by one of the engines illustrated in FIG. 6 (e.g., flow values engine 614 or check constraints engine 516), or alternatively by another engine not shown in FIG. 6 (e.g., a duplicate detection engine may be included in SDM runtime 610). The process of duplicate detection matches expanded instances against instances that already exist in the SDM data store. For example, the process detects if another application has installed a shared file. When an instance that already exists is detected, one of several actions can be taken depending on the version of the existing instance: the install can be failed; the instance can be reference counted; the instance can be upgraded; or the installation can be performed side-by-side.

Check constraints engine 616 implements a constraint evaluation phase in which all the constraints in the model are checked to see if they will still be valid after the change request has been processed.

After check constraints engine 616 finishes the constraint evaluation phase, a complete list of actions is available. So, order actions engine 618 can use the relationships between components to determine a valid change ordering. Any of a variety of algorithms can be used to make this determination.

Once order actions engine 618 is finished determining the ordering, deployment can be carried out by distributing subsets of the ordered set of actions that are machine specific. Once the actions have been ordered and grouped by machine, the actions as well as a copy of the necessary portion of the SDM runtime store 608 with instance information are sent to a target computing device 622. The SDM can be stored temporarily at the target device in a store cache 638.

The target computing device includes a target portion 636 of the SDM runtime that communicates with SDM runtime 610. The target computing device 622 also includes an agent that contains an execution engine 624 and can communicate with the appropriate instance managers (IMs) 626 on the target device to make changes on the target, such as crate, update, and delete actions. Each action is sent as an atomic call to the instance manager 626 and the instance manager 626 returns a status message and for some actions, also returns data (e.g., for discovery). Once all the actions are completed on target 622, the target's agent returns any errors and status to the controller 620. The controller 610 then uses this information to update the SDM runtime store 608.

As discussed above, change is carried out by breaking the change requests down into distributable parts based on the relationships that are affected. Once all the parts are completed (or after one or more has failed) the results are collated in the runtime 610 and a summary returned to the operator. In the event of a failure, all the actions can be "rolled back" and the system returned to the state it was in before the change was initiated.

In certain embodiments, during design time validation discussed above, an SDM Compiler 628 receives an SDM file, creates a test CR, runs the test CR through the expand, flow values and check constraints engines of the SDM runtime, and returns any errors to the development system. This process provides SDM validation for deployment during design time for the developer.

The public interface to SDM runtime 610 and/or controller 620 is through an object model (APIs) library. The library is a managed code object model and allows the following to be performed:

Manage the SDMs in the runtime—SDM files can be loaded into the runtime. SDMs are immutable and are loaded one at a time (i.e., an SDM file can be loaded rather than only parts of the file (e.g., individual ones of the individual definitions, classes or mappings from the SDM file)). SDMs can be deleted from the runtime and an XML document for an SDM in the runtime can be produced.

Manage the SDUs known by the runtime.

Manage SDM definitions—find and reflect on SDM elements (from an SDM loaded in the runtime). There is no public API provided for authoring a new SDM (i.e., this is a read only object model over the immutable elements of the SDM). This includes SDMs, SDUs, identities, versions, classes, definitions, binding/mappings and versioning policy.

Manage SDM instances—find and reflect on instances of components, endpoints, resources and relationships. In the instance space each instance can be identified by a GUID, a stable path or an array based path. The paths are strings and can be relative. These identifiers, including relative paths allows instances to be found and referenced in documents such as the change request document.

Manipulate instances—make changes to SDM instances, including creating, changing topology, upgrading, changing settings and deleting. Instance changes are made within the bounds of a change request which provides an atomic unit of update so that any errors or constraint violations will result in the entire request failing. Instance requests also allow for instances to exist temporarily without a binding to a host, as an instance must have a host when the request is committed. It also allows for many operations that will affect a single component's installation or settings to be performed and have the installation or settings update deferred until commit so that a single update occurs on the component. The SDM model checking is performed prior to or at change request commit time and the commit will fail on any model or constraint violations.

Load a change request—a change request is a document, for example an XML file, that represents a set of instance space operations. This document can take advantage of relative paths to be a reusable 'script' for creating or deleting application instances.

Find and reflect on change requests—including getting the installation/update tasks and all error information, and retrying the installation/update of components affected by the request.

Generate a change request document from a change request in the database. Such documents are somewhat portable.

Subscribe to events on change request tasks, such as progress, log or status updated. The lifetime of these event subscriptions limited by the lifetime of the process that loaded the client library (i.e. these are regular CLR events).

The SDM runtime engine performs the reasoning on the SDM model and the functions surfaced by the APIs. The library communicates to the runtime engine as a web service with fairly coarse calls such as load SDM, create component instance and get entire SDM (for reflecting on SDM entities). The format of many of the parameters for this web service is XML with the same schema for SDM files. The engine may also perform checks on permissions.

The controller 620 can make use of Instance Managers (IMs), which can be associated with any definition or relationship in the model. IMs may perform one or more of the following roles:

Support deployment of the instance.

Support validation of the instance once it has been deployed (auditing).

Support discovery of already deployed instances that were not deployed through the runtime.

Support flow of setting values.

Support evaluation of constraints.

Support expansion of a change request.

Support presentation of the instance to a user as a CLR class through the API.

For deployment, an instance manager (IM) plug-in on controller 620 is associated with a class host relation and is separate from the plug-in used in the development system that provides the design experience for the classes and produces the associated binaries in the SDU 604 and the settings schema. Instance managers are supplied to the SDM runtime 610 as CLR classes (e.g., in a dll assembly) that implement an instance manager interface or inherit from abstract class. An SDM Instance Manager, also referred to as an Instance Manager (IM) plug-in, provides the following functions to the controller 620:

Generates the files and commands (tasks) to install, uninstall or reinstall component instances on their hosts—When a change request results in a new component instance, removal of a component instance or a change to a component that requires an uninstall and reinstall, it is the instance manager that takes the settings for the instance, the host instance, the definitions associated with the component and the binaries associated with those definitions in the SDU 604 and produces the files and commands needed to perform the install or uninstall on a target server ready for either manual execution or dispatch via the deployment engine.

Generates the files and commands (e.g., tasks) to update a component instance when its settings change or when the view from one of its endpoints changes (e.g., due to communication relationship topology changes or a visible endpoint has settings changed)

Maps the endpoint instances visible on a component instance's endpoints to settings on component instance—In the SDM a component instance has endpoint instances that, as a result of some communication relationship topology, can see other endpoint instances. The details of the other endpoint instances are mapped to settings that the component instance can fetch at runtime, usually so that it can bind to it. For example, a web site may have a database client endpoint instance so a communication relationship can be established with a database. When correctly established its database client endpoint is able to see a single database server endpoint instance and the settings on that server endpoint. This information is used by the instance manager to place a connection string for the server in a configuration file under the name of the client endpoint. The end result is that code simply reads the connection string for the database from its configuration settings.

Generates the files and commands (tasks) to audit a component instance—Auditing confirms existence, correct settings. This may apply to host instance settings also.

For any task will report status—The IM will translate the output captured, either partial or complete, and provide the status of the task as success, failure or incomplete and optionally offer progress on incomplete (% or last response), details on failure (error message) and a human readable log on any status. By going back to the instance manager to interpret the output of a task, the instance manager is free to have its tasks log structured information (for example, as XML or even SOAP) rather than trying to have to produce sufficient logging for diagnosis while keeping it human readable.

The instance managers may also provide code that does the constraint checking between hosts and their guests. Installers may use a common constraint language, for example based on XML, XPath and XQuery.

Layering

The SDM model provides a separation of concerns between the developers of applications, the designers of the software infrastructure and the architects of the data center. Each of these groups focuses on particular services and has a differing set of concerns. For example, developers may be primarily concerned with the configuration and connectivity between the hosts that they utilize, such as SQL, IIS and the CLR. Designers of the host configuration may be primarily concerned with the network topology and the OS configuration. The architects developing the network topology, OS configuration and storage mapping may be primarily concerned with the hardware that exists in the data center.

The SDM enables the functional composition of systems across a horizontal and vertical axis. Composition along the horizontal axis is done with systems and subsystems. Composition along the vertical axis is done with "layers". Applications, services, network topologies, and hardware fulfill a role in a distributed system, but are typically defined independently and owned by different teams or organizations. Layering is accomplished by components defining a set of constraints on a host and vice versa.

To support this separation of concerns, the SDM exposes a concept of layering. Layering refers to using hosting relationships to bind an application to the services on which it depends without declaring those services as part of the containment structure of the application. Layering allows systems to be developed by different individuals at different times and at different levels.

Figure 7:
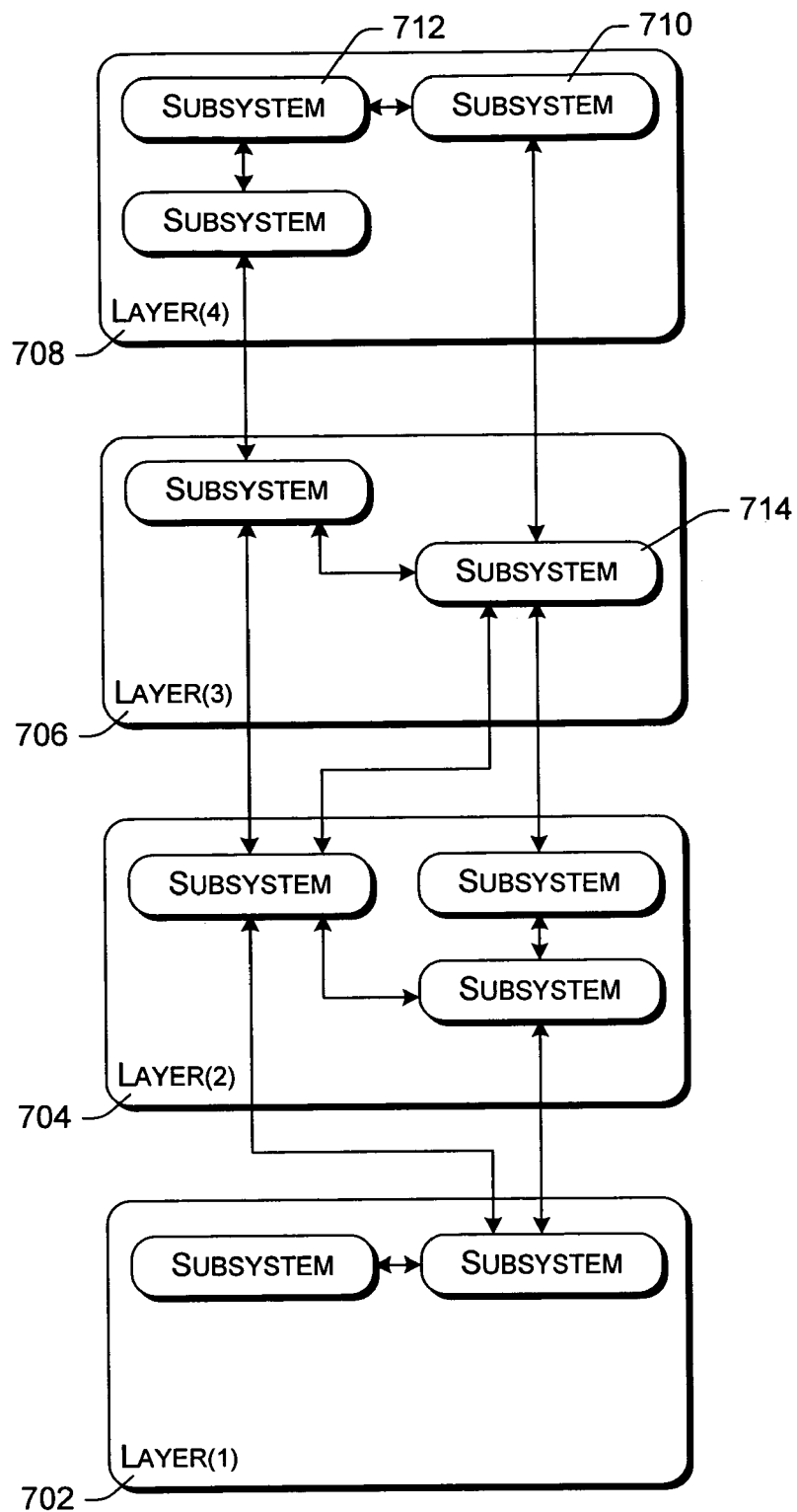
FIG. 7 illustrates an example layered setting.

FIG. 7 illustrates an example layered setting. Four layers are illustrated in FIG. 7: layer 702, layer 704, layer 706, and layer 708. Although four layers are shown in FIG. 7, the actual number of layers can vary, and can be greater or less than four. Additionally, the content of different layers can vary in different embodiments. As can be seen in FIG. 7, the different layers are situated above and/or below other layers (e.g., layer 706 is above layer 704 but below layer 708).

Different systems and subsystems within a layer can interact with one another, and also can interact with systems and subsystems of different layers. For example, a subsystem 710 in layer 708 can interact with a subsystem 712 in layer 708, as well as a subsystem 714 in layer 706. Additionally, each layer can be viewed as the environment for the next higher layer. For example layer 706 is the environment for systems and subsystems in layer 708, while layer 704 is the environment for systems and subsystems in layer 706. Each layer 702, 704, 706, and 708 has its own associated SDM document.

The different layers 702, 704, 706, and 708 can represent different content. In certain embodiments, layer 702 is a hardware layer, layer 704, is a network topology and operating systems layer, layer 706 is an application hosts layer, and layer 708 is an applications layer. The hardware layer represents the physical devices (e.g., computing devices) on which the layered system is built (e.g., devices 102 of FIG. 1). The network topology and operating systems layer represents the network topology of the computing devices (e.g., network setting 100 of FIG. 1) as well as the operating systems installed on those computing devices. The application hosts layer represents applications installed on the computing devices that can host other applications (e.g., SQL Server, IIS, and so forth). The application layer represents applications that are installed on the computing devices that do not host other applications (e.g., entertainment applications such as games, productivity applications such as word processors, reference applications such as electronic encyclopedias, distributed applications such as may be used for web services or financial analysis, and so forth).

Example SDM Implementation

The following discussion describes an embodiment of the schema that defines the elements of the SDM.

1 Definitions

| Term | Definition |
|---|---|
| Change Request | A declarative document that describes a set of changes to a modeled system |
| Fully qualified change request | A change request that has passed through the model evaluation stages and is now ready to be executed against the target system |
| Abstract type | A type that is used to define the settings required to act on a modeled system object |
| Concrete type | A reusable definition of a modeled system object that contains definitions for member types and relationships. |
| Relationship | An sdm object that is used to describe the interaction between modeled system elements |
| System Definition Model (SDM) Document | An xml document that contains definitions for abstract objects, concrete types and relationships |
| Software Distribution Unit (SDU) | The combination of a set of SDM documents and the associated binary information (files) required to deploy those types to an SDM managed system |
| SDM Layer | A layer is a set of abstract objects that are specific to the objects modeled in that layer. For example the application layer types may include Web application and Database, while the operating system layer may include types for file systems and network devices. Some types will not be assigned to layers and will instead be usable across a range of layers. |
| SDM Instance space | A set of concrete type and relationship instances that represent the modeled system |

2 Architectural Overview

The System Definition Model (SDM) is designed is to support description of the configuration, interaction and changes to the components in a distributed system (the modeled system). SDM is based on an object-relational model. We use objects to describe entities that exist in the system and relationships to identify the links between them. The SDM further refines objects and relationships to capture semantics that are important to the SDM. In particular, we divide objects into systems, endpoints and resources and we divide relationships into communication, containment, hosting, delegation, and reference.

We use abstract definitions to provide a common categorization of system parts allowing tool support for a wide range of applications and providing the basis for type checking at design time. We expect the set of abstract definitions to provide a comprehensive basis for system design and we expect that they will change slowly over time.

We build concrete object definitions that represent parts of an actual application or datacenter design. We take an abstract object definition and provide an implementation that defines the concrete type's members and setting values for its properties. We then build systems from collections of these definitions.

Constraints are used to model restrictions over the allowed set of relationships that an instance can participate in. We use constraints to capture fine grained requirements that depend on the configuration of objects involved in a relationship. For example, a constraint may be used to validate that participants on each end of a communication protocol are using compatible security settings.

In order to effect change on the target system, SDM uses a declarative description of the required changes called a change request. SDM defines the process that is used to expand, validate and execute a change request as part of the SDM execution model.

The instance space captures both the desired and current state of the managed application. We track changes in the instance space and associate them with the change request that initiated the change.

The following uml diagrams capture the broad interactions between the objects in the sdm model. For simplicity some of these interactions have been defined between base types where the actual interaction exists between derived types and as a result is more specialized. For example, communication relationships may only reference abstract endpoint definitions.

An Sdm document contains information that describes the document, managers for the definitions in the document, import statements that reference other documents and a set of definitions.

Figure 8:
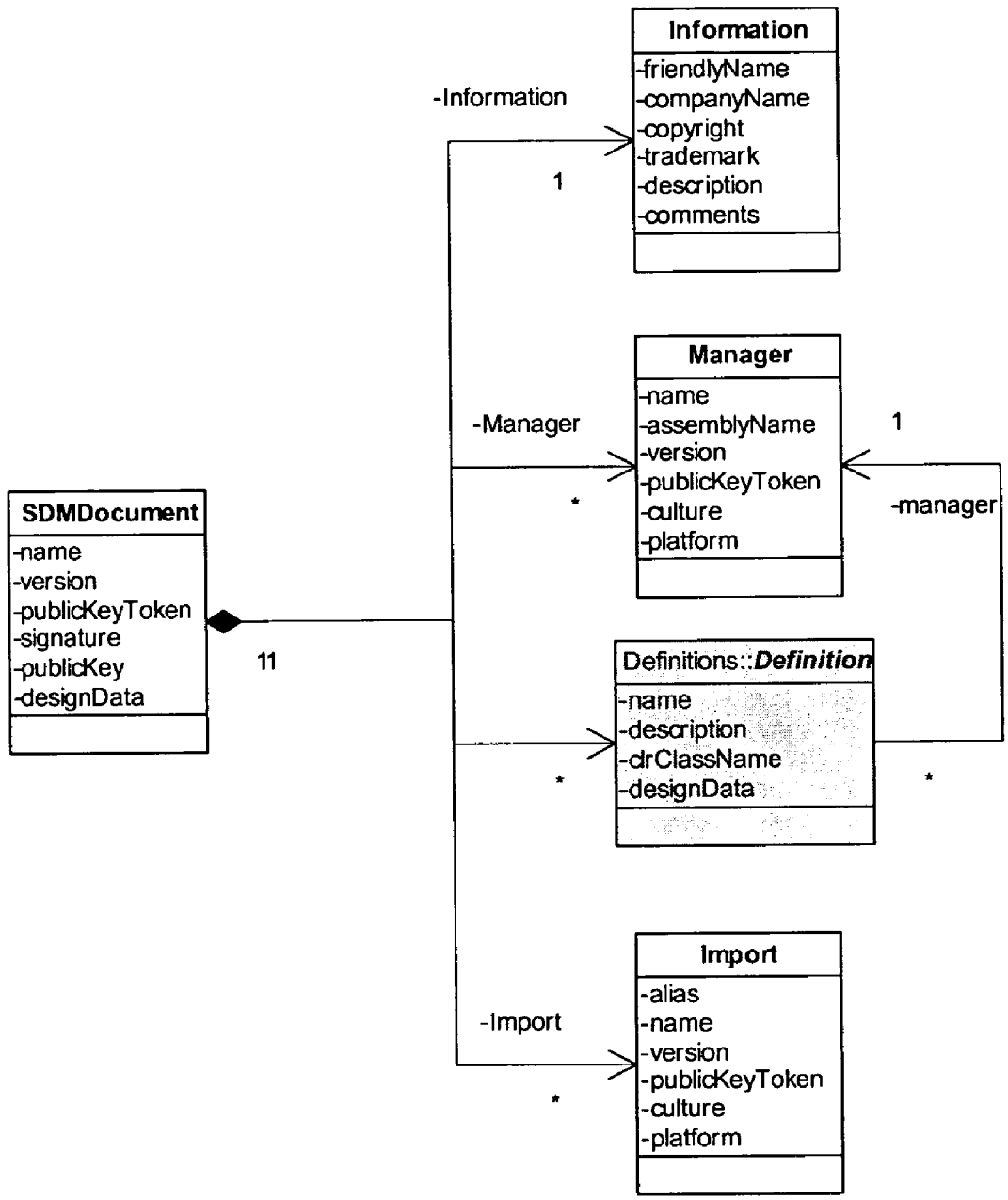
FIG. 8 illustrates an example SDM document.

FIG. 8 illustrates an example document.

Figure 9A:
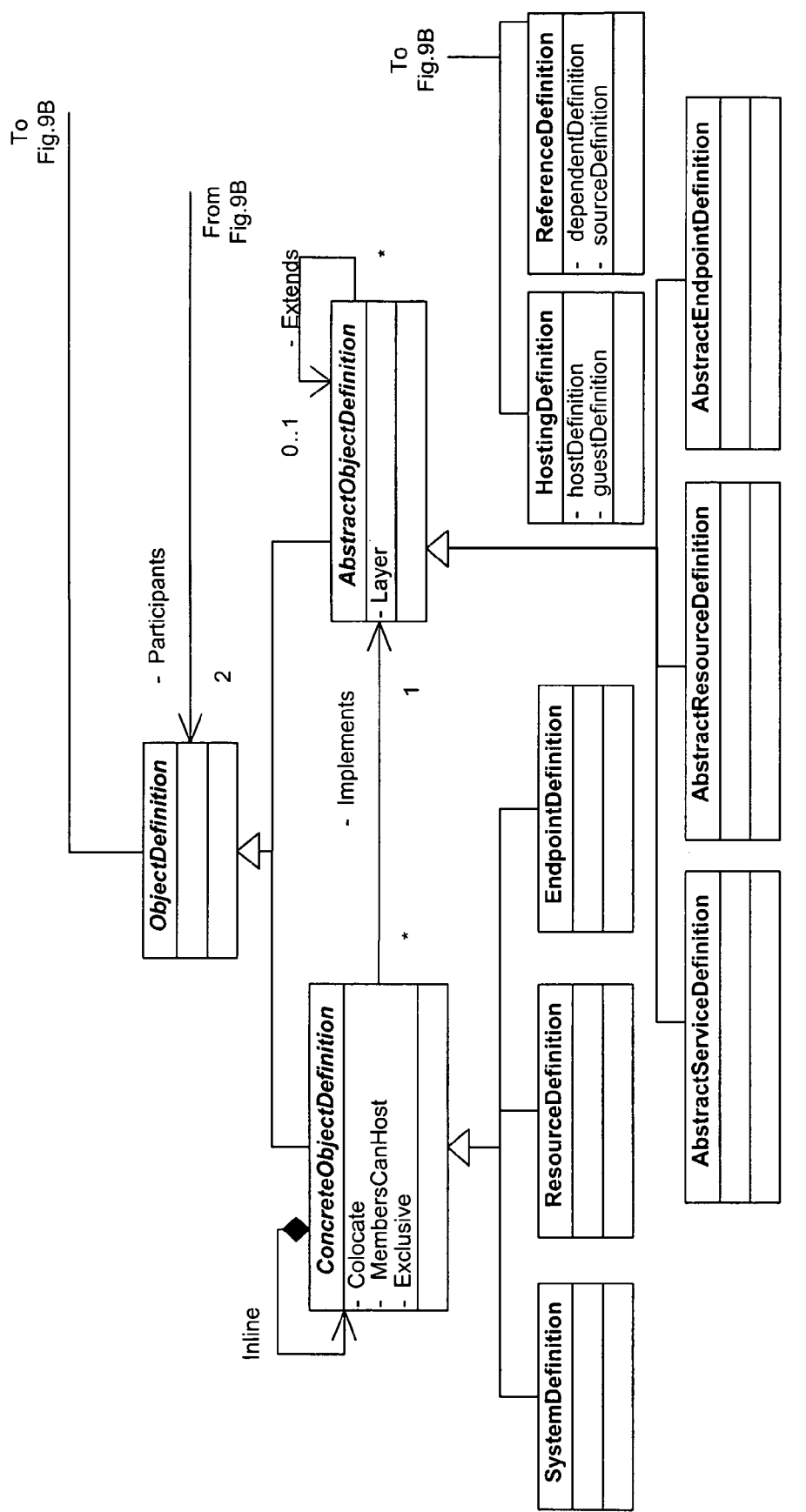
FIG. 9 illustrates an base definition and members.
Figure 9B:
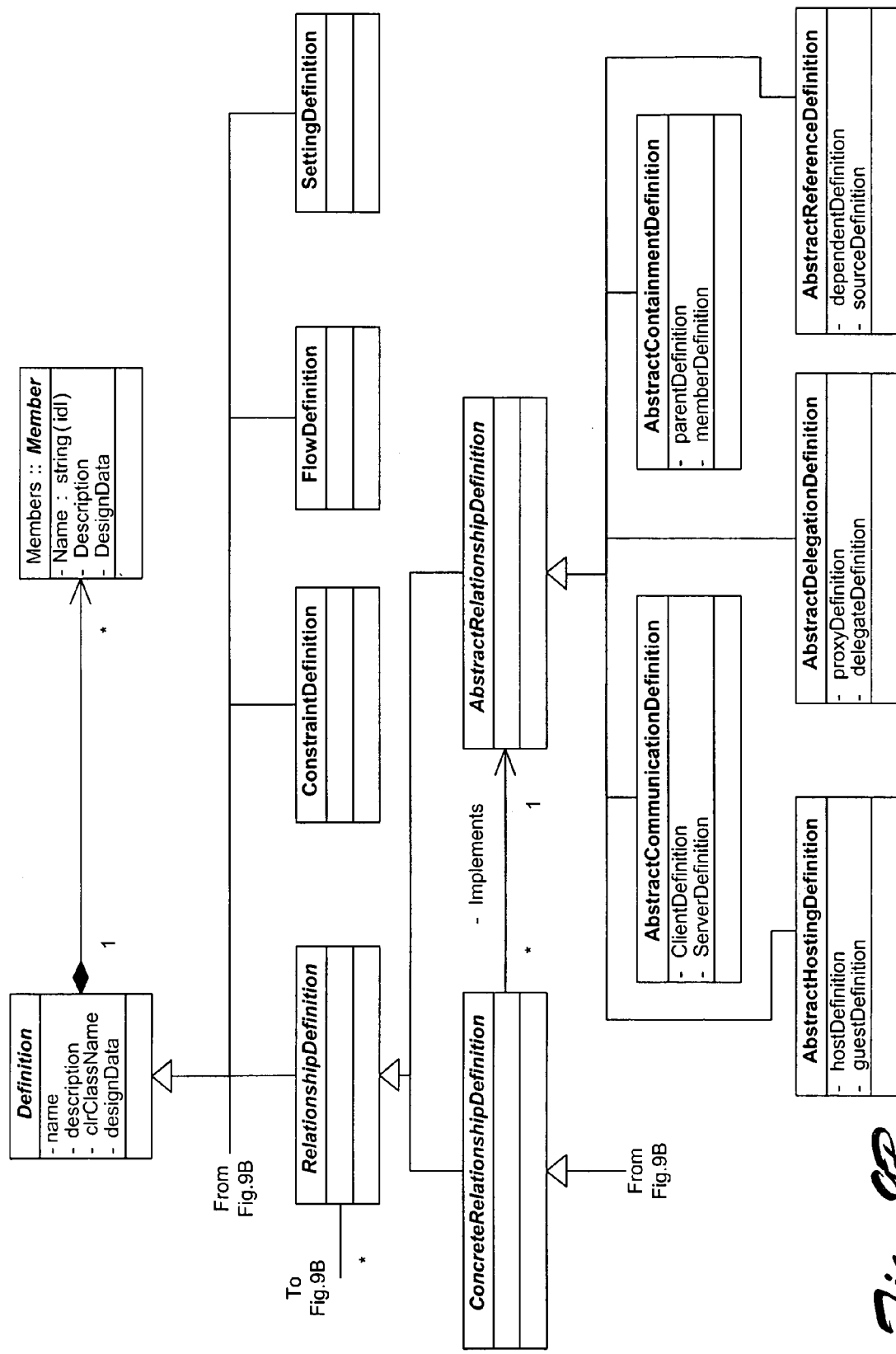

All sdm definititions derive from a common base definition and may contain members as shown in FIG. 9. The relationship between definitions and members can be more complex than is shown on the following diagrams.

Figure 10B:
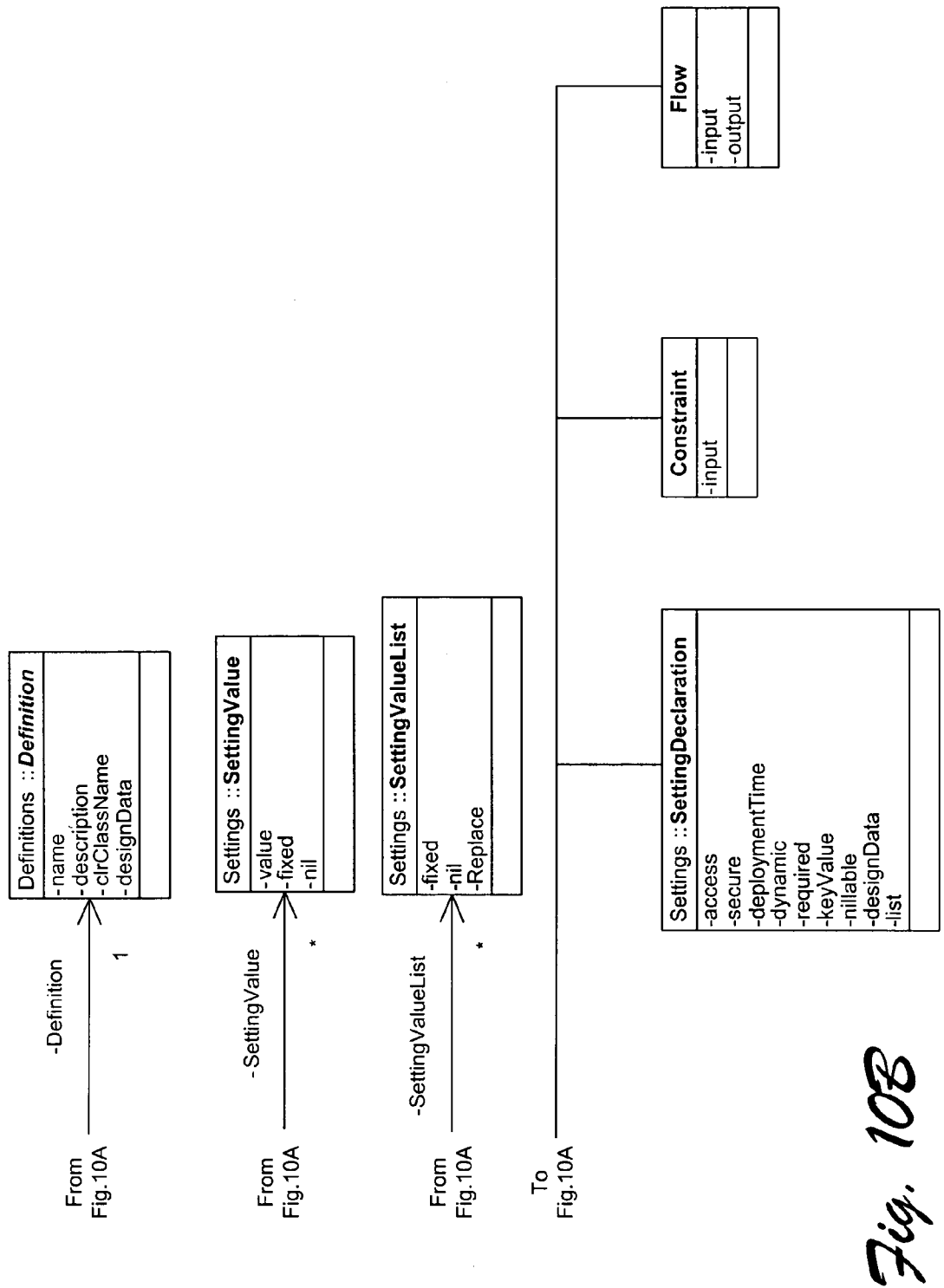
FIG. 10 illustrates an example member.

Members are divided by the kind of definition that they reference as shown in FIG. 10.

Figure 11:
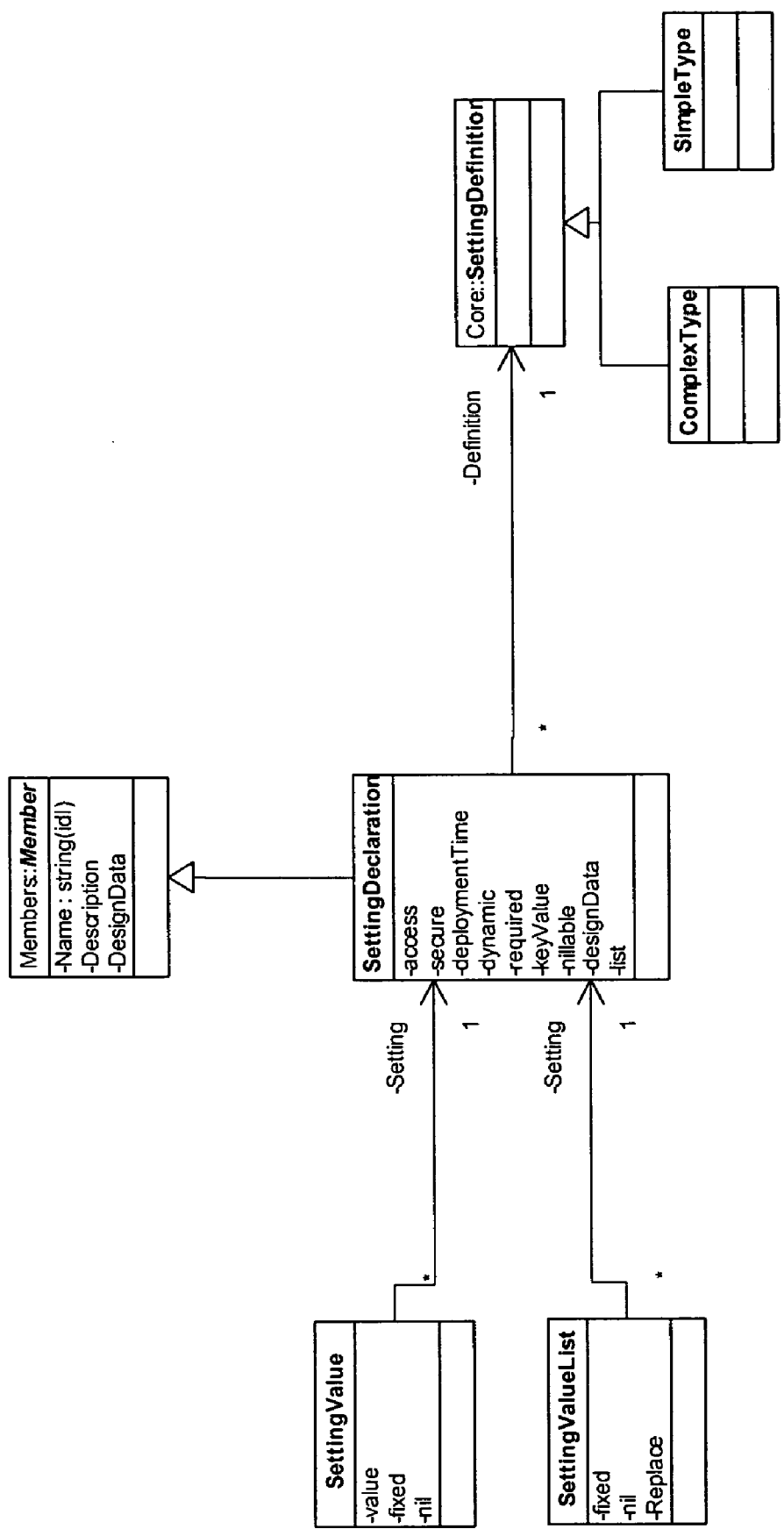
FIG. 11 illustrates example setting values and value lists.

Setting declarations reference a setting definition. Setting values and value lists provide values for settings as shown in FIG. 11.

2.1 The Lifecycle of an SDM Application

Figure 12:
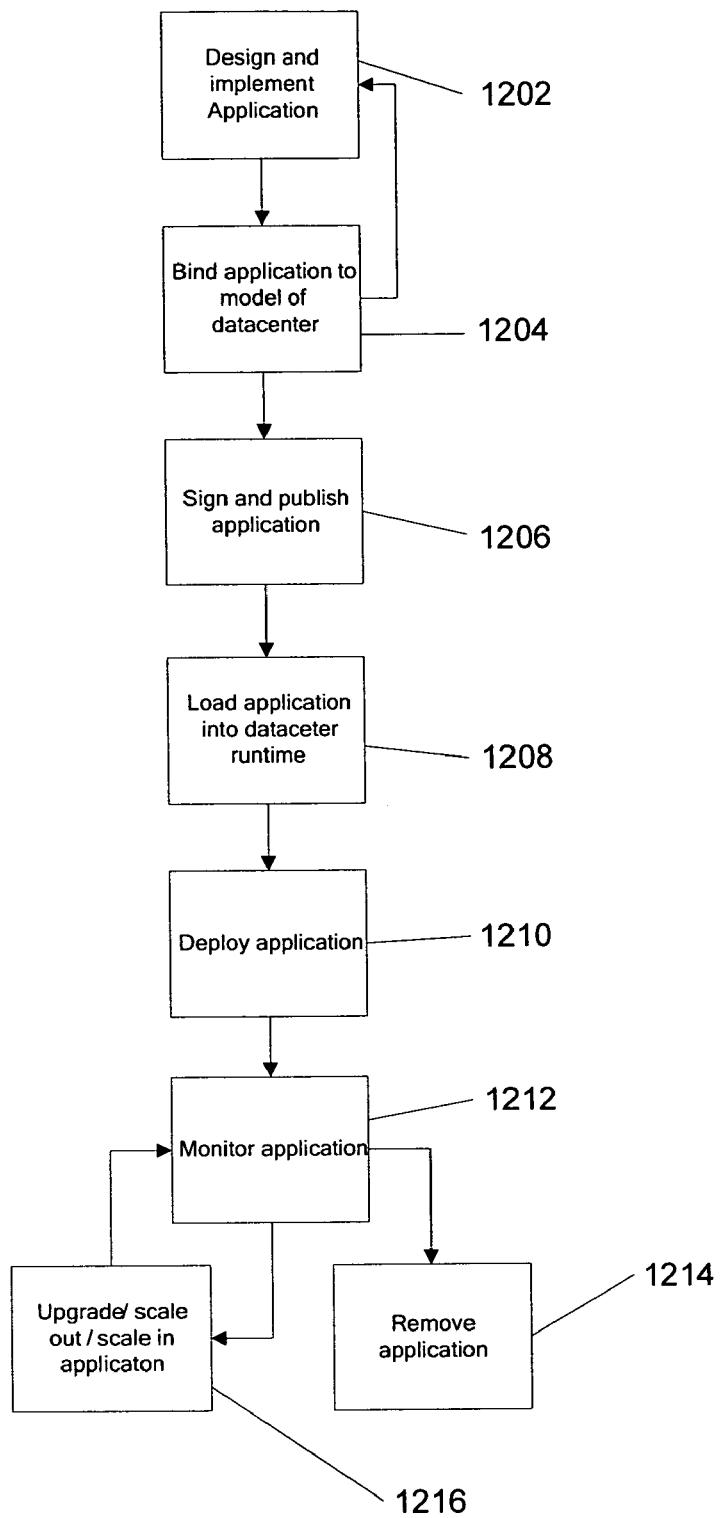
FIG. 12 illustrates an example lifecycle of an SDM application in accordance with certain embodiments.

An example lifecycle of an SDM application in accordance with certain embodiments is shown in FIG. 12.

The application is designed and implemented within the visual studio environment (block 1202). Developers implement components and then combine them within compound components. The application is described within an SDM file. In order to verify that their application will deploy within a particular datacenter a developer will bind their application to a representation of the datacenter also described in an SDM file (block 1204). This representation will include definitions for the hosts of their application components and constraints on the configuration of their application. If the binding fails, then the developer can revise their application design.

Once a developer is happy with their application, they can sign and publish the application so that there is now a strong name and version associated with the application (block 1206). The published form of an application is called a Software distribution Unit (SDU). The operator takes the SDU from the developer and loads the application into the SDM runtime (block 1208). In the process of loading the application, the operator chooses the model of the datacenter to which they want to bind the application. When the operator chooses to deploy an application they supply deployment time parameters to the application and they determine the scale of the application (block 1210). This is done using a change request.

Once an application is deployed, the operator can interact with the runtime to determine the configuration of the application and the setting for each part of the application (block 1212). The runtime can also verify that the actual configuration of the application matches the desired configuration as recorded in the runtime. The operator can remove a deployed application by submitting a change request (block 1214). The operator can also rollback individual changes made to the running application such as removing a service pack. In block 1216, the configuration of a running application can be changed by adding or removing parts of the deployed application such as to web frontends. The application can also be upgraded by installing newer versions of one or more of the application components.

2.2 Abstract Object and Relationship Definitions

Abstract object definitions define the building blocks that we need in order to check application configuration at design time and then to deploy and manage an application at run time. These building blocks represent entities that exist in the modeled system. For example, we use abstract object definitions to model files and directories, the configuration inside a web server or the databases inside a sql server.

We use abstract relationship definitions to model the interactions that can occur between abstract object definitions. Relationships are binary and directed, identifying the object definition that defines the instances that participate in manifestations of the relationship. Relationships provide a way of tying objects together so that we can model containment, construction and communication links between objects.

Constraints are then used by objects to constrain the relationships they participate in and by relationships to constrain the objects that can be linked. These constraints can target both the definition and the settings of participants in a relationship. This allows a constraint to narrow the participants in a relationship to instance that are derived from a particular definition and to require that the instance have setting values that fall in a particular range.

We divide Object definitions into three categories: systems, endpoints and resources.

Abstract system definitions are used to describe self-contained independently deployable parts of an application. These definitions represent parts of an application that interact through well defined communication channels that can cross process and machine boundaries.

Abstract endpoint definitions are used to describe the communication endpoints that a system may expose. These are used to model all forms of communication that the system should be aware of in order to verify system connectivity at design time and to enable connections at runtime.

Abstract resource definitions describe behavior that is contained within a system. Resource definitions may have strong dependencies on other resource definitions. These dependencies can include requiring a specific installation order and initiating runtime interaction through undocumented communication mechanisms.

All abstract object definitions share the ability to expose settings. These settings are simple name-value pairs that use xml schema to define the type of the setting. Settings can be dynamic or static, if they are static then they can only be set during the deployment process, if they are dynamic, then they can be changed after deployment. The code responsible for applying settings values to the running system is hosted in the SDM runtime.

The SDM supports inheritance over abstract object definitions. A derived definitions can extend the properties exposed by its parent and can set values for its parents properties. A derived definition can participate in any of the relationships that identify its parent as a participant.

Relationship definitions are divided in five categories: communication, containment, delegation, hosting, and reference.

Communication relationships are used to capture potential communication interactions between abstract endpoint definitions. The existence of a communication relationship indicates that it may be possible for systems that expose endpoints of the identified definition to communicate. The actual establishment of the link is subject to constraints on the endpoints and the exposure of the endpoints.

Containment relationships describe that ability for an abstract object definition to contain members of another abstract object definition. More specifically, a containment relationship between two abstract object definitions A and B allows a concrete object definition that implements A to contain a member of a concrete object definition that implements B.

We use containment to model the natural nesting structures that occur when developers build applications. By containing a member object, the parent is able to control the lifetime and visibility of the contained object. All object instances in the run time space exist as members of other object instances, forming a completely connected set of instances. Thus, the set of containment relationship describes the allowed containment patterns that occur in the instance space.

Delegation relationships are used to selectively expose contained object members; in particular, we use delegation to expose endpoint members from system definitions. By delegating a endpoint from a subsystem, the outer system exposes the ability to communicate on a particular protocol without exposing the implementation behind the protocol.

Hosting and reference relationships are two forms of dependency relationship. A hosting relationship describes a primary dependency between abstract objects that should exist before an instance of a concrete object can be created. Every instance should participate as a guest in exactly one hosting relationship, resulting in the hosting relationships also forming a completely connected tree over the instance space. Reference relationships capture additional dependencies that can be used for parameter flow and for construction ordering.

2.3 Concrete Object and Relationship Definitions

We build concrete object definitions from abstract object definitions and concrete relationship definitions from abstract relationship definitions.

The combination of abstract object definitions and abstract relationship definitions defines a schema for modeling the target system. The role of a concrete object definition is to use a subset of the abstract definition space to create a reusable configuration based on one or more abstract definitions. As a simple analogy, the abstract definition space can be compared to the schema for database; the concrete object definition would then represent a reusable template for a set of rows in the database. The rows are only created in the database when an instance of the concrete object is created. To perform design time validation we can validate a concrete object definition against the abstract definition space in the same way that we would validate the rows in the database against the constraints of the schema (for example foreign keys, etc).

Each concrete object definition provides an implementation for a specific abstract object definition. The implementation includes extensions to the settings schema, values for settings and declarations for object member, relationship members and constraint members and flow members. The behavior of the concrete object follows the definition of the abstract object: abstract system definition become concrete system definitions, abstract endpoint definitions become concrete endpoint definitions and abstract resource definitions become concrete resource definitions.

Each concrete relationship definition provides an implementation for a specific abstract relationship definition. The implementation can include settings declarations and values, nested members of the same relationship category (hosting, containment, communication etc), and constraints on the types that can participate in the relationship.

Concrete hosting relationships are used to define a mapping of the members of one concrete object onto another concrete object. For example, a concrete hosting relationship can be used to identify the bindings between a web application and the IIS host that it will be deployed to. More than one concrete hosting relationship can exist for a given type allowing the developer to define different deployment configurations for specific topologies 2.4 Members A concrete type can declare members of other concrete or abstract objects—we call these object members. These members are then referenced from relationship members that define the relationships between the object members.

Object members are used to create instances of a particular object definition. Settings flow can be used to provide values for the object. When declaring an object member, the user can decide whether the object member is created at the same time the outer system is created (value semantics) or is created by an explicit new operation that occurs at some later time (reference semantics).

Relationship members define the relationships that object members will participate in when they are created. If an object member is contained by its parent, then a containment relationship member will be declared between the type member and the outer type. If the object member is delegated, then a delegation relationship member would be defined between the object member and a nested object member. Communication relationship members can be declared between endpoints on object members and dependency relationship members (reference and hosting) can be declared between object members or nested object members.

Relationship constraints are used to narrow the set of relationships that a particular object is willing to participate in. They identify constraints on a particular relationship and on the participants at the other end of the relationship.

2.5 Instance Space

The instance space stored in the SDM runtime reflects the current state of the modeled system. The runtime contains a complete record of the instances that have been created and the relationships between these instances. Each instance has an associated version history where each version is linked to a change request.

The process of creating new instances is initiated by a change request. The change request defines a set of create, update and delete requests for types and relationships associated with specific members of an existing instance; the root is a special case.

The change request is expanded by the runtime, verified against all constraints, and then constructed. The expansion process identifies object and relationship instances that are constructed implicitly as part of the construction request of the containing object and then settings flow is then evaluated across all relationships. The verification step checks that all required relationships exist and that the relationships fulfill all constraints. Finally, the construction process determines an appropriate ordering over the deployment, update or removal of each instance and then in the correct sequence passes each instance to an instance manager to perform the appropriate action.

2.6 Layering

The goal of the SDM model is to allow a separation of concerns between the developers of applications, the designers of the software infrastructure and the architects of the datacenter. Each of these groups focuses on particular services and has a differing set of dependencies.

For example, developers mainly care about the configuration and connectivity between the hosts that they depend on such as SQL, IIS and the CLR. Designers of the host configuration care about the network topology and the OS configuration, while the architects developing the network topology, OS configuration and storage mapping need to know about the hardware that exists in the datacenter.

To support this separation of concerns, SDM exposes a concept of layering. Layering is the use of hosting relationships to bind an application to the services that it depends on without declaring those services as part of the containment structure of the application.

We identify four layers as part of the SDM model . . .

Application Layer

The application layer supports the construction of applications in a constrained context. The context is defined by the configuration of the hosts identified in the host layer Examples of system definitions in the application layer include web services, databases and biztalk schedules.

Host Layer

Build datacenters out of software components. Configure the connections between components. Some of these components act as hosts for the application layer.

Examples of system definitions in this layer—IIS, SQL, AD, EXCHANGE, DNS and Biztalk.

Network/OS/Storage Layer

Build data center networks and platforms. Configure the network security model and the operating system platform configuration. Add storage to operating system configurations.

Examples of system definitions in this layer—VLAN, Windows, Filter, Storage.

Hardware Layer

The hardware layer identifies the types of machines that exist in the datacenter and the physical connections that exist between these machines.

Figure 13:
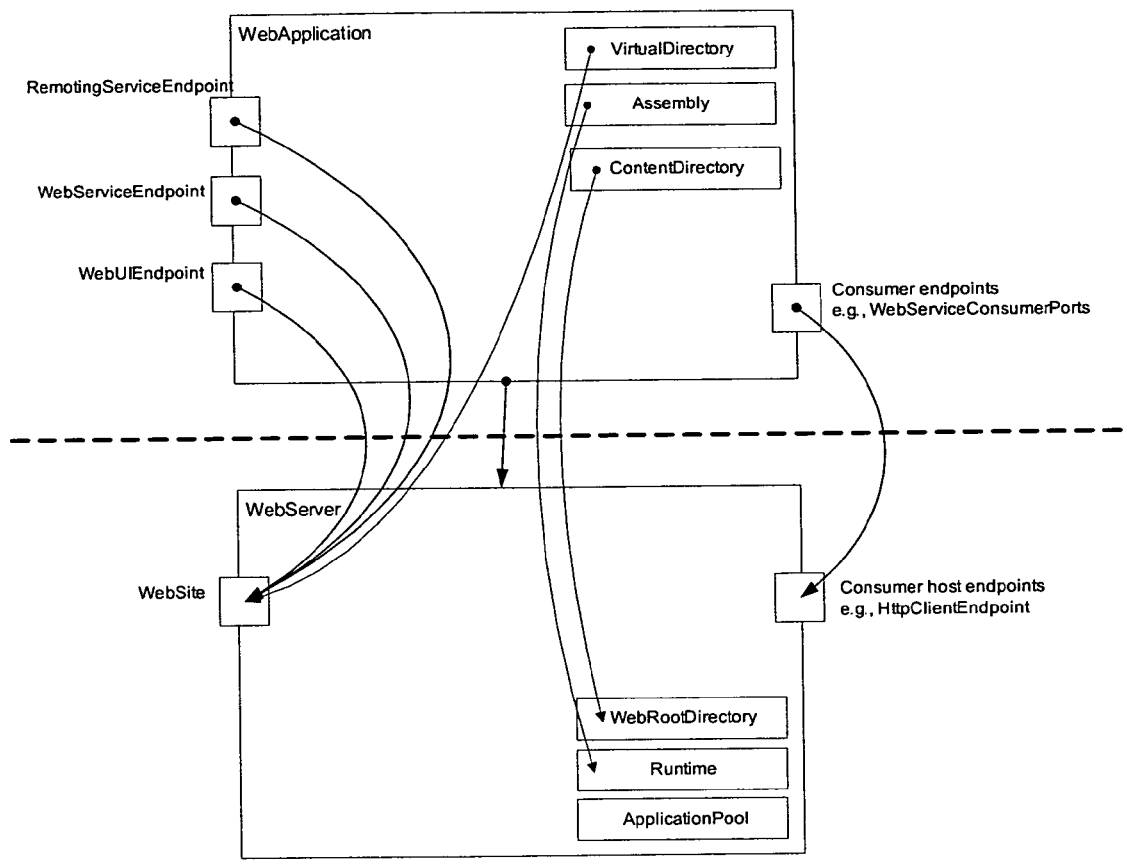
FIG. 13 shows an example mapping of a web application to a web server host.

FIG. 13 shows the example mapping of a layer 4 web application to a layer 3 web server host. The outer box at each layer represents a system, the boxes on the boundary represent endpoints and the boxes on the inside represent resources. We map each of these elements via a hosting relationship to a host at the layer below.

In order to satisfy the relationships required of a system we bind that system to a host system that has matching capabilities. We call this process placement. At design time, we construct a concrete hosting relationship that represents a possible placement. At deployment time, we instantiate an instance of the concrete hosting relationship to bind the guest system instance to the host system instance.

2.7 Model Evaluation

Associated with the SDM model is well-defined process for managing change to a distributed system.

Each change is driven by a declarative change request that passes through several processing steps before the actions in the request are distributed and then executed against target systems.

3 Implementation Details

3.1 Naming

There are a number of places in the SDM where we need a strong naming system for identifying objects. The following naming system allows the creator of a type to sign the definition in such a way that that the user of the definition can be sure that it is the same as the one that developer originally published.

The following header is an example of an identifier for an sdm namespace:

```
<sdm name="FileSystem"
    version="0.1.0.0"
    publicKeyToken="AAAABBBBCCCCDDDD"
    culture="neutral"
    platform="neutral"
    publicKey="aLongKey"
    signature="TheHashOfTheFileContents">
</sdm>
```

To reference a type in another namespace you need to import the namespace:

<import alias="FileSystem" name="FileSystem" version="0.1.0.0"
publicKeyToken="AAAABBBBCCCCDDDD"/>

Then you can use the alias to refer to types within the namespace:

FileSystem:file

3.1.1 Identity

SDM names are scoped by the namespace in which they are defined. A namespace is identified by a name, version, language and a public key token and is contained within a single file.

The base form of identity includes name, version, culture, platform and a public key token.

```
<xs:attributeGroup name="Identity">
    <xs:attribute name="name" type="simpleName"
        use="required"/>
    <xs:attribute name="version" type="fourPartVersionType"
        use="required"/>
    <xs:attribute name="publicKey Token" type="publicKeyTokenType"
        use="optional"/>
    <xs:attribute name="culture" type="xs:string" use="optional"/>
    <xs:attribute name="platform" type="xs:string" use="optional"/>
</xs:attributeGroup>
```

| Attribute/element | Description |
|---|---|
| name | The name of the sdm file is a friendly name that a developer can use to reference the contents of the file. The name in combination with the public key token provides a strong name for the file. |
| version | Version is used to identify the version of the contents of the file. All elements of the file adopt the same version number |
| publicKeyToken | Public key token is a short name for the public key associated with the file. |
| culture | The culture of the binaries. Defaults to neutral |
| platform | The supported platform for the binaries. |

The base identity can be used to reference an existing identity or in conjunction with a signature and a public key, to create a new strong identity. The document will be signed using the private key, allowing the user of the document to verify its contents using the public key.

```
<xs:attributeGroup name="namespaceIdentity">
    <xs:attributeGroup ref="Identity"/>
    <xs:attribute name="signature" type="xs:string" use="optional"/>
    <xs:attribute name="publicKey" type="xs:string" use="optional"/>
</xs:attributeGroup>
```

| Attribute/element | Description |
|---|---|
| signature | The signed hash of the contained sdm type definitions |
| publicKey | The public key that can be used to check the signature of the file. |

A public key token is a 16 character hex string that identifies the public part of a public/private key pair. This is not the public key; it is simply a 64 bit hash of the public key.

```
<xs:simpleType name="publicKeyTokenType">
    <xs:annotation>
        <xs:documentation>Public Key Token: 16 hex digits in
            size</xs:documentation>
    </xs:annotation>
    <xs:restriction base="xs:string">
        <xs:pattern value="([0-9]|[a-f]|[A-F]){16}"/>
    </xs:restriction>
</xs:simpleType>
```

3.1.2 Version

A file version is defined by a four part number of the form N.N.N.N where $0<=N<65535$. By convention the numbers refer to Major.Minor.Build.Revision.

```
<xs:simpleType name="fourPartVersionType">
    <xs:restriction base="xs:string">
        <xs:pattern value="([0-9]{1,4}|[0-5][0-9]{4}|64[0-9]
        {3}|655[0-2][0-9]|6553[0-5])(\.([0-9]{1,4}|[0-5][0-9]
        {4}|64[0-9]{3}|655[0-
2][0-9]|6553[0-5])){3}}"/>
    </xs:restriction>
</xs:simpleType>
```

3.1.3 Simpl Names

Simple names are made up of alpha-numeric characters and limited punctuation. The name should start with a non-numeric character.

```
<xs:simpleType name="simpleName">
    <xs:annotation>
        <xs:documentation>name of a type or
        member</xs:documentation>
    </xs:annotation>
    <xs:restriction base="xs:string">
        <xs:pattern value="[a-z,A-Z]{1}([0-9,a-z,A-Z,_])*"/>
    </xs:restriction>
</xs:simpleType>
```

We plan to conform to the C# definition for identifiers; the appropriate section (2.4.2) has been inserted below. The spec can be found at:

http://devdiv/SpecTool/Documents/Whidbey/VCSharp/Formal%20Language%20Specification/CSharp%20Lanquaqe%20Specification.doc Note we will not support "@" prefixed names in the sdm model.

The rules for identifiers given in this section correspond exactly to those recommended by the Unicode Standard Annex 15, except that underscore is allowed as an initial character (as is traditional in the C programming language), Unicode escape sequences are permitted in identifiers, and the "@" character is allowed as a prefix to enable keywords to be used as identifiers.
identifier:
    available-identifier
    @ identifier-or-keyword
available-identifier:
    An identifier-or-keyword that is not a keyword
identifier-or-keyword:
    identifier-start-character identifier-part-characters$_{opt}$
identifier-start-character:
    letter-character
    _(the underscore character U+005F)
identifier-part-characters:
    identifier-part-character
    identifier-part-characters identifier-part-character
identifier-part-character:
    letter-character
    decimal-digit-character
    connecting-character
    combining-character
    formatting-character
letter-character:
    A Unicode character of classes Lu, Ll, Lt, Lm, Lo, or Nl
    A unicode-escape-sequence representing a character of
    classes Lu, Ll, Lt, Lm, Lo, or
    Nl
combining-character:
    A Unicode character of classes Mn or Mc
    A unicode-escape-sequence representing a character of
    classes Mn or Mc
decimal-digit-character:
    A Unicode character of the class Nd
    A unicode-escape-sequence representing a character of
    the class Nd
connecting-character:
    A Unicode character of the class Pc
    A unicode-escape-sequence representing a character of
    the class Pc
formatting-character:
    A Unicode character of the class Cf
    A unicode-escape-sequence representing a character
    of the class Cf
For information on the Unicode character classes mentioned above, see The Unicode Standard, Version 3.0, section 4.5. Examples of valid identifiers include "identifier1", "_identifier2", and "@if". An identifier in a conforming program should be in the canonical format defined by Unicode Normalization Form C, as defined by Unicode Standard Annex 15. The behavior when encountering an identifier not in Normalization Form C is implementation-defined; however, a diagnostic is not required.
The prefix "@" enables the use of keywords as identifiers, which is useful when interfacing with other programming languages. The character @ is not actually part of the identifier, so the identifier might be seen in other languages as a normal identifier, without the prefix. An identifier with an @ prefix is called a verbatim identifier. Use of the @ prefix for identifiers that are not keywords is permitted, but strongly discouraged as a matter of style.
The example:
class @class public static void @static(bool @bool) {
    if (@bool)
        System.Console.WriteLine("true");
    else
        System.Console.WriteLine("false");
}
}
class Class1
{
static void M( ) {
    cl\u0061ss.st\u0061tic(true);
}
}
defines a class named "class" with a static method named "static" that takes a parameter named "bool".
Note that since Unicode escapes are not permitted in keywords, the token "cl\u0061ss" is an identifier, and is the same identifier as "@class".
Two identifiers are considered the same if they are identical after the following transformations are applied, in order:
The prefix "@", if used, is removed.
Each unicode-escape-sequence is transformed into its corresponding Unicode character.
Any formatting-characters are removed.
Identifiers containing two consecutive underscore characters (U+005F) are reserved for use by the implementation. For example, an implementation might provide extended keywords that begin with two underscores.

3.1.4 Reserved Names

The following is a list of reserved names that we will prevent users from using when creating names for objects in an SDM model.

Within certain contexts certain names will be reserved

| Context | Name |
| --- | --- |
| Abstract and concrete definitions | this |
| Abstract and concrete hosting Relationship definitions | guest, host |
| Abstract and concrete containment relationship definitions | parent, member |

| Context | Name |
|---|---|
| Abstract and concrete communication relationship definitions | client, server |
| Abstract and concrete reference relationship definitions | source, dependent |
| Abstract and concrete delegation relationships definitions | proxy, delegate |

These names are reserved because of our integration with the CLR.

| C# keywords | | | | |
|---|---|---|---|---|
| AddHandler | AddressOf | Alias | And | Ansi |
| As | Assembly | Auto | Base | Boolean |
| ByRef | Byte | ByVal | Call | Case |
| Catch | CBool | CByte | CChar | CDate |
| CDec | CDbl | Char | CInt | Class |
| CLng | CObj | Const | CShort | CSng |
| CStr | CType | Date | Decimal | Declare |
| Default | Delegate | Dim | Do | Double |
| Each | Else | ElseIf | End | Enum |
| Erase | Error | Event | Exit | ExternalSource |
| False | Finalize | Finally | Float | For |
| Friend | Function | Get | GetType | Goto |
| Handles | If | Implements | Imports | In |
| Inherits | Integer | Interface | Is | Let |
| Lib | Like | Long | Loop | Me |
| Mod | Module | MustInherit | MustOverride | MyBase |
| MyClass | Namespace | New | Next | Not |
| Nothing | NotInheritable | NotOverridable | Object | On |
| Option | Optional | Or | Overloads | Overridable |
| Overrides | ParamArray | Preserve | Private | Property |
| Protected | Public | RaiseEvent | ReadOnly | ReDim |
| Region | REM | RemoveHandler | Resume | Return |
| Select | Set | Shadows | Shared | Short |
| Single | Static | Step | Stop | String |
| Structure | Sub | SyncLock | Then | Throw |
| To | True | Try | TypeOf | Unicode |
| Until | volatile | When | While | With |
| WithEvents | WriteOnly | Xor | eval | extends |
| instanceof | package | var | | |

3.1.5 References to Other Namespaces

We allow namespaces to reference other namespaces by importing them into the current namespace and then associating an alias with the namespace. The imported namespace is referenced by name, version and public key token. Versioning will be described in section 3.16.

```
<xs:complexType name="import">
    <xs:attribute name="alias" type="simpleName" use="required"/>
    <xs:attributeGroup ref="identity"/>
</xs:complexType>
```

| Attribute/element | Description |
|---|---|
| alias | The alias used to reference the external sdm file within the scope of the current sdm file. |

3.1.6 Qualified Paths

Qualified paths are then either names that refer to definitions or managers defined in the current namespace or in an aliased namespace.

[<alias> :] <simpleName> (. <simpleName>)*

The alias is defined in an import statement. The following simple names identify a type or in the case of a path, a nested type.

```
<xs:simpleType name="qualifiedName">
    <xs:restriction base="xs:string">
        <xs:pattern value="[a-z,A-Z]{1}([0-9,a-z,A-Z,_])*
```

-continued

```
(:[a-z,A-Z]{1}([0-9,a-z,A-Z,_])*)?(\.[a-z,
A-Z]{1}([0-9,a-z,A-
Z,_])*)*"/>
    </xs:restriction>
</xs:simpleType>
```

3.1.7 Definition and Member Paths

A path is a sequence of names that identifies a member or setting. A path should begin with a well-known name or member name that is defined by the object or relationship associated with the path.

```
<simpleName>(.<simpleName>)*
<xs:simpleType name="path">
    <xs:restriction base="xs:string">
        <xs:pattern value="[a-z,A-Z]{1}([0-9,a-z,A-Z,_])*
            (\.[a-z,A-Z]{1}([0-9,a-z,A-Z,_])*)*"/>
    </xs:restrictions>
</xs:simpleType>
```

3.1.8 Instance Paths

Paths in the instance space are based on xpaths where the element names in the xpath correspond to member names and attributes in the xpath correspond to settings.

3.1.9 Name Resolution

Names that do not begin with an alias are not fully qualified. This means that the scope in which they are evaluated can change the resulting binding. An example of this is nested definitions. When resolving a nested definition name, definitions in local scope hide definitions in a broader scope.

3.2 Settings

All definitions can expose settings declarations. These settings are used to describe the values that can be provided when a concrete definition is created from an abstract definition, or when a definition is references from a member within another definition.

To define a setting you first need to define the definition of the setting using xsd.

```
<xs:schema>
    <xs:simpleType name="registryValueType">
        <xs:restriction base="xs:string">
            <xs:enumeration value="binary"/>
            <xs:enumeration value="integer"/>
            <xs:enumeration value="long"/>
            <xs:enumeration value="expandString"/>
            <xs:enumeration value="multiString"/>
            <xs:enumeration value="string"/>
        </xs:restriction>
    </xs:simpleType>
</xs:schema>
```

You can then declare a setting that uses the definition and includes a set of attributes to define the behavior of the setting.

<settingDeclaration name="valueType" type="registryValueType" access="readwrite" dynamic="false" required="true"/>

Once you have a setting declaration you can provide a value for the setting.

<settingvalue name="valueType" fixed="true">long</settingValue>

3.2.1 Setting Definitions

We use XSD schemas to define the setting definitions used by setting declarations. We support the use of simple and complex types from a schema though other schema elements may exist to support the definition of those types.

The settings definition section should contain a complete xml schema including namespace declaration and namespace imports. We will check that the imports in the xsd schema match the imports in the sdm file with the exception of the xsd schema namespace. This means that all referenced types should be defined in another sdm file; the schema cannot reference types that are defined in arbitrary xsd files.

```
<xs:complexType name="settingDefinitions">
    <xs:sequence>
        <xs:element ref="xs:schema"/>
    </xs:sequence>
    <xs:attribute name="manager" type="qualifiedName" use="optional"/>
    <xs:attribute name="clrNamespace" type="xs:string" use="optional"/>
</xs:complexType>
```

| Attribute/element | Description |
| --- | --- |
| xs:schema | A schema in the http://www,w3,org/2001/XMLSchma namespace. |
| manager | The clr assembly that contains helper classes for this schema |
| clrNamespace | The clr namespace in which these classes are defined. All setting type will resolve to a clr based on their mapping through CLR serialization. |

Settings should be resolvable from three separate namespaces:

a) The sdm namespace—when we refer to setting types within system, resource, endpoint, relationship, constraint or flow types.

b) The clr namespace—when we refer to settings using strongly typed classes within the clr and when setting types are built on other setting types.

c) The XSD namespace—when setting types are built using other setting types.

For this to work, we should place a number of restrictions on the way we declare settings:

a) All settings should be in the same groupings within each of the clr, sdm and xsd namespaces. That is, if two settings are together in one namespace, they should be together in all three namespaces.

b) Imported namespaces within an xsd schema definition should match the imported namespaces in an SDM file and the imported namespaces in the associated helper assembly.

c) With the exception of the xsd namespace, all imported namespaces in an xsd schema should be defined within an sdm file.

XSD types from imported SDM documents are accessible using QNames:

<alias>:<type-name>

Hence, for example, if Foo.sdm imports Bar.sdm, the setting types of Bar.sdm may be referenced in the settingTypes element of Foo.sdm as this example illustrates:

```
<!--Foo.sdm-->
...
<import alias="bar" location="Bar.sdm".../>
<settingTypes>
    ...
    <xs:simpleType name="D">
        <xs:restriction base="bar:B".../>
    </xs:simpleType>
    ...
</settingTypes>
<!--Bar.sdm-->
...
<settingTypes>
    ...
    <xs:simpleType name="B">
        <xs:restriction base="xs:string".../>
    </xs:simpleType>
    ...
</settingTypes>
```

3.2.2 Built in Simpl Data Types

The SDM supports a limited set of built in data types that are an intersection of the XSD and C# namespaces. These types are supported natively by the SDM runtime and are defined in the following table. In addition to these types, users are free to construct and use their own mapping between xsd and cls types.

| Type | Description | XSD Type | C# Type |
|---|---|---|---|
| string | A string is a sequence of Unicode characters | string | string |
| integer | 64-bit signed integral type | long | long |
| float | Single-precision floating point type | float | float |
| double | Double-precision floating point type | double | double |
| boolean | a boolean value is either true or false | boolean | bool |
| any | The base type of all other types | anyType | object |
| Date | A simple date | date | dateTime |

These types can be flowed to compatible derivations of these types in the c# and xsd type spaces. For example a value for string can be flowed to an xsd type that defined a restriction on string and any value can be flowed to a setting that accepts type="any".

3.2.2.1 XSD Built in Types

Figure 14:
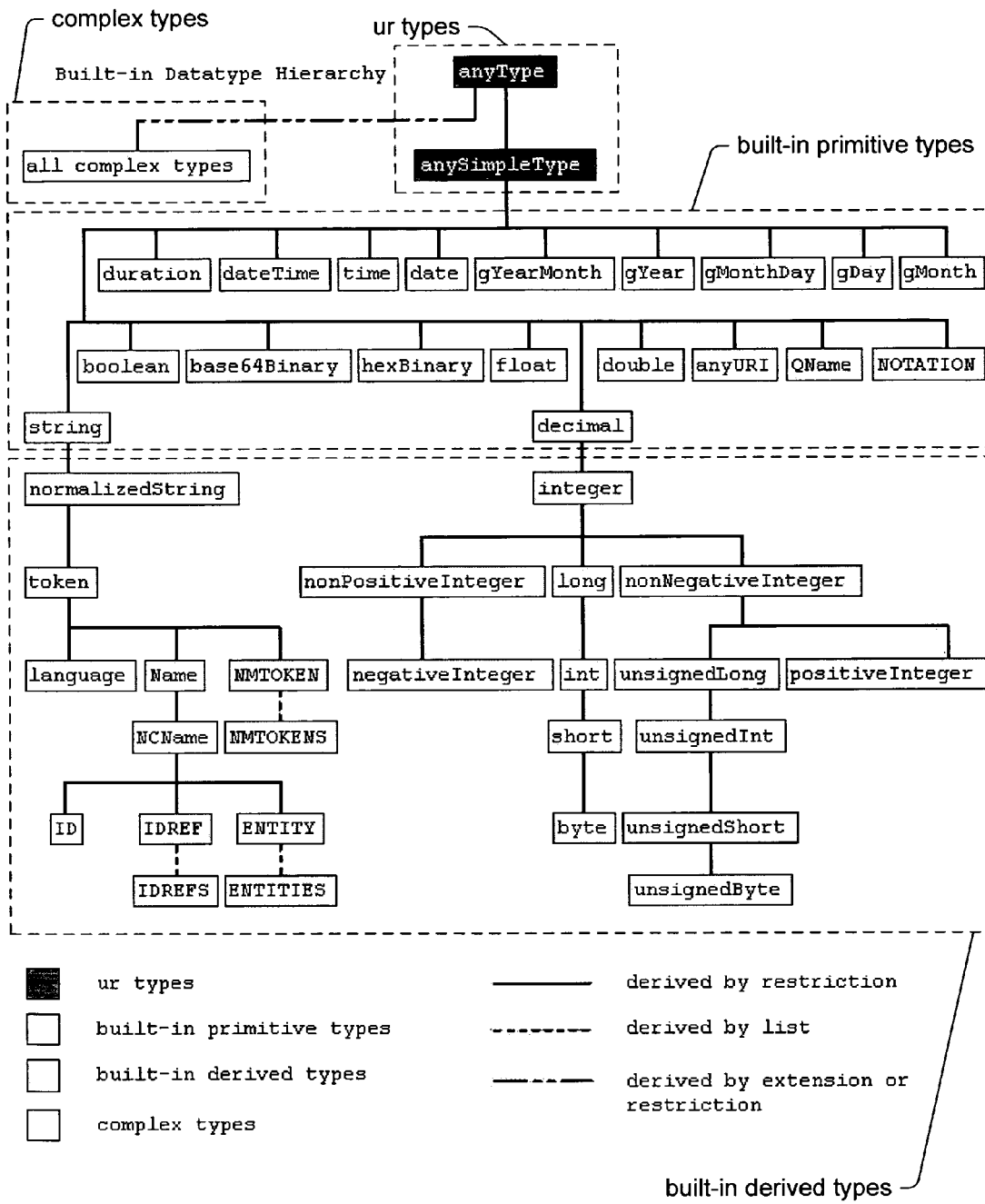
FIG. 14 illustrates an example built-in datatype hierarchy.

FIG. 14 illustrates an example built-in datatype hierarchy.

3.2.2.2 C# Data Types

| Type | Description | Example |
|---|---|---|
| object | The ultimate base type of all other types | object o = null; |
| string | String type; a string is a sequence of Unicode characters | string s = "hello"; |
| sbyte | 8-bit signed integral type | sbyte val = 12; |
| short | 16-bit signed integral type | short val = 12; |
| int | 32-bit signed integral type | int val = 12; |
| long | 64-bit signed integral type | long val1 = 12; long val2 = 34L; |
| byte | 8-bit unsigned integral type | byte val1 = 12; |
| ushort | 16-bit unsigned integral type | ushort val1 = 12; |
| uint | 32-bit unsigned integral type | uint val1 = 12; uint val2 = 34U; |
| ulong | 64-bit unsigned integral type | ulong val1 = 12; ulong val2 = 34U; ulong val3 = 56L; ulong val4 = 78UL; |
| float | Single-precision floating point type | float val = 1.23F; |
| double | Double-precision floating point type | double val1 = 1.23; double val2 = 4.56D; |
| bool | Boolean type; a bool value is either true or false | bool val1 = true; bool val2 = false; |
| char | Character type; a char value is a Unicode character | char val = 'h'; |
| decimal | Precise decimal type with 28 significant digits | decimal val = 1.23M; |

3.2.2.3 Supported Conversions

These are the conversions that exist between xsd types and cls types.

| XML Schema (XSD) type | .NET Framework type |
|---|---|
| anyURI | System.Uri |
| base64Binary | System.Byte☐ |
| Boolean | System.Boolean |
| Byte | System.SByte |
| Date | System.DateTime |
| dateTime | System.DateTime |

-continued

| XML Schema (XSD) type | .NET Framework type |
|---|---|
| decimal | System.Decimal |
| Double | System.Double |
| duration | System.TimeSpan |
| ENTITIES | System.String☐ |
| ENTITY | System.String |
| Float | System.Single |
| gDay | System.DateTime |
| gMonthDay | System.DateTime |
| gYear | System.DateTime |
| gYearMonth | System.DateTime |
| hexBinary | System.Byte☐ |
| ID | System.String |
| IDREF | System.String |
| IDREFS | System.String☐ |
| int | System.Int32 |
| integer | System.Decimal |
| language | System.String |
| long | System.Int64 |
| month | System.DateTime |
| Name | System.String |
| NCName | System.String |
| negativeInteger | System.Decimal |
| NMTOKEN | System.String |
| NMTOKENS | System.String☐ |
| nonNegativeInteger | System.Decimal |
| nonPositiveInteger | System.Decimal |
| normalizedString | System.String |
| NOTATION | System.String |
| positiveInteger | System.Decimal |
| QName | System.Xml.XmlQualifiedName |
| short | System.Int16 |
| string | System.String |
| time | System.DateTime |
| timePeriod | System.DateTime |
| token | System.String |
| unsignedByte | System.Byte |
| unsignedInt | System.UInt32 |
| unsignedLong | System.UInt64 |
| unsignedShort | System.UInt16 |

3.2.3 Setting Declaration

The settings declaration section uses the setting definitions from the previous section to create named settings. Attributes are used to provide further information about each setting.

```
<xs:complexType name="SettingDeclaration">
    <xs:complexContent>
        <xs:extension base="Member">
            <xs:attribute name="List" type="xs:boolean"/>
            <xs:attributeGroup ref="settingsAttributes"/>
        </xs:extension>
    </xs:complexContent>
</xs:complexType>
```

| Attribute/element | Description |
|---|---|
| settingsAttributes | The set of attributes that can be applied to an individual setting declaration |
| list | This attribute is used to indicate that this setting is a list of values rather than a single value. |

3.2.4 List Support

In order to support manipulation of multivalued settings, we support simple lists of setting values. A list is a sequence of values of the same definition as the setting declaration. Lists can be flowed to other lists that that they can either replace or merge with. We do not support duplicate detection when merging values into a list as this can be done more flexibly using settings flow and we do not guarantee any form of ordering.

A list declaration includes an attribute list set to true:
<settingDeclaration name="roles" type="xs:string" list="true"/>

Values are then provided using a settingValueList. When providing the list, the user can specify whether to replace or merge with previous values.

```
<settingValueList name="roles" fix="true" replace="true">
    <value>staticContent</value>
    <value>aspPages</value>
</settingValueList>
```

The sdm supports simple manipulation of lists of values. When a path from a flow member targets a setting declaration, then the resulting behavior is dependent of the definitions at either end of the path.

| Source  | Destination | Result |
|---------|-------------|--------|
| Element | List        | replace = false - element is added to the list<br>replace = true - list with single element |
| List    | List        | replace = false - source and destination lists are merged<br>replace = true - source list |
| List    | Element     | The sdm cannot resolve which element to select from the list so this combination is not supported. |

3.2.5 Setting Attributes

Setting attributes are used by the runtime to describe the behavior of a particular setting.

```
<xs:attributeGroup name="settingsAttributes">
    <xs:attribute name="access">
        <xs:simpleType>
            <xs:restriction base="xs:string">
                <xs:enumeration value="readwrite"/>
                <xs:enumeration value="readonly"/>
                <xs:enumeration value="writeonly"/>
            </xs:restriction>
        </xs:simpleType>
    </xs:attribute>
    <xs:attribute name="secure" type="xs:boolean"/>
    <xs:attribute name="deploymentTime" type="xs:boolean"/>
    <xs:attribute name="required" type="xs:boolean"/>
    <xs:attribute name="dynamic" type="xs:boolean"/>
    <xs:attribute name="keyValue" type="xs:boolean"/>
    <xs:attribute name="nillable" type="xs:boolean"/>
</xs:attributeGroup>
```

| Attribute Name | Description | Default |
|---|---|---|
| access | The access attribute of a setting specifies whether reading and writing the setting's value is permitted; providing SDM runtime access control and display/editing rules to designers.<br><br>| Attribute Value | Meaning in SDM Runtime | Display/Editing Rules |<br>|---|---|---|<br>| readwrite | Indicates that a setting value can be read and written. | Value is displayed and can be edited. |<br>| readonly | Indicates that a setting value can be read, but not written. This value cannot be a target for flow.<br><br>In general a readonly setting will be one that is calculated or provided by the real world instance.<br><br>Example: A value that represents the number of connections on a server | Value is displayed, but cannot be edited. |<br>| writeonly | Indicates that a setting value can be written, but not read. This value cannot be a source for flow.<br><br>Example: a password for a service account | Value is masked, but can be edited. | | readWrite |
| deploymentTime | A value that can only be provided as part of the deployment process for an instance. Design time constraints cannot be evaluated against this value. A definition or member cannot supply a fixed value for this setting. | False |
| required | If required is true, a value should be provided for this setting before an instance is deployed. This setting cannot be readonly. | False |

-continued

| Attribute Name | Description | Default |
|---|---|---|
| dynamic | If dynamic is true, the instance manager supports changes to this value after an instance has been deployed. | True |
| keyValue | Keyvalue is used to Indicate that a setting is unique within its hosting scope. The instance manager will use this setting in paths to identity object instances and to detect collisions with existing instances. | False |
| Secure | The secure attribute of a setting specifies whether the value of a setting should be encrypted (true or false) when stored to an SDM document. Also indicates whether tools should log this value during manipulations such as installs. | False |
| nillable | The nillable attribute of a setting indicates whether a setting value is valid if it carries the namespace-qualified attribute xsi:nil from namespace htto:/www.w3.org/2001/XMLSchema-instance. | false |

3.2.6 Setting Values

Depending on whether the setting has been declared as a single value or a list, the value for the setting can be provided using either a setting value element or a setting value list element.

3.2.6.1 Setting Value

A setting value is used to provide a value for a particular setting declaration. The value should match the definition associated with the declaration. If the value is declared fixed, then the provided value will be used in all derived definitions or referencing members depending on the point at which the value is fixed. Once a value is fixed it cannot be overridden.

```
<xs:complexType name="settingValue">
    <xs:complexContent>
        <xs:restriction base="xs:anyType">
            <xs:attribute name="name" type="simpleName"
                use="required"/>
            <xs:attribute name="fixed" type="xs:boolean"
                use="optional" default="false"/>
            <xs:attribute ref="xsi:nil" use="optional" default="false"/>
        </xs:restriction>
    </xs:complexContent>
</xs:complexType>
```

| Attribute/element | Description |
|---|---|
| name | The name of the setting declaration that this value will apply to. |
| fixed | The fixed attribute controls whether the value provided can subsequently be overridden by new values A fixed value of true indicates that the value provided for a setting cannot be overridden<br>If the value of fixed is true on a concrete definition member's setting value, it is fixed in all deployments of that member. Otherwise, if the value of fixed is false it is override-able in each deployment of that member.<br>If the value of fixed is true on a concrete definition's setting value, it is fixed for all members (i.e., uses) of that concrete definition. Otherwise, if the value of fixed is false, it may vary with each member (i.e., use) of that concrete definition.<br>If the value of fixed is true on an abstract definition's setting value, it is fixed for concrete definitions that implement or |

-continued

| Attribute/element | Description |
|---|---|
| | abstract objects that extend that abstract definition. Otherwise, if the value of fixed is false, it may be overridden by a concrete definition, in a derived abstract definition or in a member declaration. |
| Nil | Finally, a setting value is considered valid without content if it has the attribute xsi:nil with the value tru . An element so labeled should be empty, but can carry attributes if permitted by the setting definition. |

3.2.6.2 Setting Value List

A setting value list is used to provide one or more values for a setting declared as a list. When declaring the values the user can decide to merge with previous values or to overwrite all previous values.

```
<xs:complexType name="settingValueList">
    <xs:sequence>
        <xs:element name="value" minOccurs="0"
            maxOccurs="unbounded">
            <xs:complexType>
                <xs:complexContent>
                    <xs:restriction base="xs:anyType">
                    </xs:restriction>
                </xs:complexContent>
            </xs:complexType>
        </xs:element>
    </xs:sequence>
    <xs:attribute name="name" type="simpleName" use="required"/>
    <xs:attribute name="fixed" type="xs:boolean" use="optional"
        default="false"/>
    <xs:attribute name="replace" type="xs:boolean" use="optional"
        default="false"/>
</xs:complexType>
```

| Attribute/element | Description |
|---|---|
| name | The name of the setting declaration that this value will apply to. |
| fixed | The fixed attribute controls whether the value provided can subsequently be overridden by new values A fixed value of true indicates that the |

-continued

| Attribute/element | Description |
|---|---|
| | value provided for a setting cannot be overridden If the value of fixed is true on a concrete definition member's setting value, it is fixed in all deployments of that member. Otherwise, if the value of fixed is false it is override-able in each deployment of that member. If the value of fixed is true on a concrete definition's setting value, it is fixed for all members (i.e., uses) of that concrete definition. Otherwise, if the value of fixed is false, it may vary with each member (i.e., use) of that concrete definition. If the value of fixed is true on an abstract definition's setting value, it is fixed for concrete definitions that implement or abstract objects that extend that abstract definition. Otherwise, if the value of fixed is false, it may be overridden by a concrete definition, in a derived abstract definition or in a member declaration. |
| replace | The replace attribute is used to indicate whether the new value for a setting should replace or merge with any previous non-fixed values for a setting. If replace is true then all previous values will be ignored. If replace is false, then the new and the previous values will be combined into a single list. Duplicates will NOT be detected during the merge process. |

3.2.7 Settings Inheritance

Settings inheritance means that a derived definition implicitly contains all the settings declarations from the base definition. Some important aspects of settings inheritance are:

Settings inheritance is transitive. If C is derived from B, and B is derived from A, then C inherits the settings declared in B as well as the settings declared in A.

A derived definition can add new settings declarations to those it inherits from the base definition it extends, but it cannot remove the definition of an inherited setting.

3.2.8 Type Conversions

We support lossless conversions between the built in types. Other type conversions require flow in order to execute the appropriate conversions.

3.3 Attributes

Many of the objects in the SDM can be attributed to capture behavior that is orthogonal to core behavior of the object. We use a general attribution model defined as follows:

3.4 Definitions and Members 3.4.1 Definition

Definition is the base from which object, relationship, constraint and flow definitions are derived. All definitions can include a settings schema, and design surface data. Each definition is identified by a simple name and references a manager. The manager is responsible for providing extension support to the SDM runtime for this particular definition.

The settings schema defines the values that can be found on an instance of this definition. The DesignData element is used to contain data that is specific to the display and editing of this definition on the design surface.

```
<xs:complexType name="Definition">
    <xs:sequence>
        <xs:element name="Description" type="Description"
            minOccurs="0"/>
```

-continued

```
        <xs:element name="DesignData" type="DesignData"
            minOccurs="0"/>
        <xs:choice minOccurs="0" maxOccurs="unbounded">
            <xs:element name="SettingDeclaration"
                type="SettingDeclaration"/>
            <xs:element name="SettingValue"
                type="SettingValue"/>
            <xs:element name="SettingValueList"
                type="SettingValueList"/>
        </xs:choice>
    </xs:sequence>
    <xs:attribute name="Name" type="SimpleName" use="required"/>
    <xs:attribute name="Manager" type="QualifiedName"
        use="optional"/>
    <xs:attribute name="ClrClassName" type="xs:string"
        use="optional"/>
</xs:complexType>
```

| Attribute/element | Description |
|---|---|
| SettingDeclaration | The declaration of a setting |
| SettingValue | A value for a setting on the defintion or its base definition. A value can be provided once for a setting declaration within an definition. |
| SettingValueList | A list of values for a writable list setting on the definition or its base definition. |
| DesignData | Design surface specific data |
| Name | A name for this definition that is unique within the scope of the containing sdm file. |
| Manager | A reference to the manager declaration for this definition. See section: 3.10 for a definition of the manager. |
| ClrClassName | The name of the clr class that supports this definition in the runtime. The class should exist in the assembly identified by the manager. The manager attribute should be present if this attribute is present. |
| Description | A text description of the definition. |

3.4.2 Member

Members are used to identify definition instances that can exist at runtime. All members are identified by a unique name within the scope of the type, can provide settings for the definition they reference and can contain design surface specific data.

```
<xs:complexType name="Member">
    <xs:sequence>
        <xs:element name="Description" type="Description"
            minOccurs="0"/>
        <xs:element name="DesignData" type="DesignData"
            minOccurs="0"/>
        <xs:choice minOccurs="0" maxOccurs="unbounded">
            <xs:element name="SettingValue" type="SettingValue"/>
            <xs:element name="SettingValueList"
                type="SettingValueList"/>
        </xs:choice>
    </xs:sequence>
    <xs:attribute name="Name" type="SimpleName" use="required"/>
    <xs:attribute name="Definition" type="QualifiedName"
        use="required"/>
</xs:complexType>
```

| Attribute/element | Description |
| --- | --- |
| Description | A description of the members |
| DesignData | Design surface specific information about the member |
| SettingValue | Values for settings that correspond to writeable settings on the referenced type. If these values are marked as fixed then they should be used when an instance is created for the member, if they are not fixed, then the values can be overridden by deployment or flowed parameters. |
| SettingValueList | A list of values for a writable list setting on the referenced type. |
| Name | A unique name for the member within the scope of the containing type. |
| Definition | The name of the definition that this member references. |

3.5 Settings Flow

Settings flow is used to pass parameters between members of an object definition and between participants in relationships. As part of a flow, the user can use transformations to combine or separate setting values and to calculate new setting values.

All settings flow members use a flow definition to implement the transform. A flow definition is declared in the sdm file. The following is a flow type that parses a url.

```
<FlowDefinition name="UrlToComponents">
    <SettingDeclaration name="url" type="url" access="writeonly"/>
    <SettingDeclaration name="protocol" type="xs:string"
    access="readonly"/>
    <SettingDeclaration name="server" type="xs:string"
    access="readonly"/>
    <SettingDeclaration name="path" type="xs:string"
    access="readonly"/>
    <SettingDeclaration name="file" type="xs:string"
    access="readonly"/>
</FlowDefinition>
```

A flow member is then declared within an object or relationship. The flow member provides the input for the flow definition and then directs the output from the flow to the target settings.

```
<Flow name="deconstructUrl"      type="UrlToComponents">
    <Input name="url" path="webservice.url"/>
    <Output name="server" path="webservice.server"/>
</Flow>
```

3.5.1 Flow Definition

We use a flow definition to define a particular transform that we wish to apply to a set of setting values. The flow definition exposes a setting schema that defines the input settings (write-only settings) and the output settings (read-only settings), a DesignData section for design surface specific information such as an input interface for defining the transform and a description for use when browsing the sdm file. The flow definition is identified by name within the namespace in which it is defined. The definition also identifies a manager that will support the runtime when it evaluates the flow.

We expect that the runtime will include several standard flow definition to simplify the construction of flow elements where straightforward transformations are required. Examples might include copy, merge and string substitution. Since flow definition can be parameterized, we also expect there to be one or more simple transformations that perform different actions based on configuration parameters.

```
<xs:complexType name="FlowDefinition">
    <xs:complexContent>
        <xs:extension base="Definition"/>
    </xs:complexContent>
</xs:complexType>
```

3.5.2 Flow Member

Each flow element identifies one or more source nodes, one or more destination nodes, some static settings and a flow definition. When the flow is evaluated, source data is collected from the source nodes, combined with settings from the flow element and passed to the flow definition for transformation. The output data is passed to the destination nodes.

Re-evaluation of the flow will be triggered whenever one of the source values changes. For this reason, we need to avoid circular flows that cause values to flip flop. If the value remains constant then the loop will terminate. The runtime will detect and terminate infinite loops by keeping track of the stack depth.

```
<xs:complexType name="FlowMember">
    <xs:complexContent>
        <xs:extension base="Member">
            <xs:choice minOccurs="0" maxOccurs="unbounded">
                <xs:element name="Input" type="SettingTarget"/>
                <xs:element name="Output" type="OutputPath"/>
            </xs:choice>
        </xs:extension>
    </xs:complexContent>
</xs:complexType>
```

| Attribute/element | Description |
| --- | --- |
| input | A list of paths to setting values that are used as input to the flow. Each input should identify a write only setting on the flow definition. |
| output | A list of paths to settings that will be set as a result of this flow. Each output should identify a read only setting on the flow definition. |

3.5.3 Setting Target

A settings target identifies a path to a setting value in a member or nested member that is relative to a well known name in the context in which the flow is defined. Examples of well-known names include this in a definition or reference declaration, host and guest in a hosting relationships declaration, or a target defined within a constraint declaration. The setting target also identifies the setting on the associated flow definition that will be used as either the source value or destination setting of setting identified by the path.

```
<xs:complexType name="SettingTarget">
    <xs:attribute name="Name" type="SimpleName"/>
    <xs:attribute name="Path" type="Path"/>
</xs:complexType>
```

| Attribute/element | Description |
|---|---|
| Name | The name of the setting on the flow or constraint definition that is the source or destination of the setting identified by the path. |
| Path | Path to the source or destination setting relative to the context in which the flow is defined. The path should identify a single setting - this implies that the maximum cardinality of all the members on the path should be one or zero. |

Output path is a variation on the settingTarget that supports the semantics for fixing and replacing the target values.

```
<xs:complexType name="OutputPath">
    <xs:complexContent>
        <xs:extension base="SettingTarget">
            <xs:attribute name="Fix" type="xs:boolean"
                use="optional"/>
            <xs:attribute name="Replace" type="xs:boolean"
                use="optional"/>
        </xs:extension>
    </xs:complexContent>
</xs:complexType>
```

| Attribute/element | Description |
|---|---|
| Fix | This will declare the target value to be fixed. This means that any attempts to subsequently modify the value will result in an error. |
| Replace | When a list is the target of the path, we can choose to either merge or replace the current contents of the list. The default behavior is to merge with the current contents. |

3.6 Settings Constraints

Constraints are used to identify restrictions on setting values of members of a definition or on the participants in a relationship. These restrictions are evaluated in the instance space at both design time and at deployment time.

All setting constraints use a constraint definition to evaluate the setting values. The constraint definition uses settings declarations to identify the values it constrains. The following constraint definition implements a simple comparison function that takes two arguments and an operator, then evaluates the constraint and finally returns success or error.

```
<ConstraintDefinition name="SimpleOperatorComparison">
    <SettingDeclaration name="LHS" type="xs:any"
        access="writeonly"/>
    <SettingDeclaration name="operator" type="operator"
        access="writeonly"/>
    <SettingDeclaration name="RHS" type="xs:any"
        access="writeonly"/>
</ConstraintDefinition>
```

A constraint member then used to provide the values to the constraint type for evaluation.

```
<Constraint name="constraintSecurityMode"
    definition="SimpleOperatorComparison">
        <Input name="LHS" path="webservice.securityMode"/>
        <SettingValue name="operator">= =</settingValue>
        <SettingValue name="RHS">basicAuth</settingValue>
</Constraint >
```

3.6.1 Constraint Definition

A constraint definition defines a constraint that acts on a set of input values. The constraint can be parameterized to select custom behavior or to support for a simple constraint engine that uses parameters to define its behavior. We expect that a set of standard constraint definitions will be written for simple parameter value constraints and a set of complex constraints to support known relationships between abstract objects.

```
<xs:complexType name="ConstraintDefinition">
    <xs:complexContent>
        <xs:extension base="Definition"/>
    </xs:complexContent>
</xs:complexType>
```

3.6.2 Constraint Member

A constraint member identifies a set of input values for a particular constraint definition. The member can identify static values for settings and can use input statements to bind a constraint setting to a path.

```
<xs:complexType name="ConstraintMember">
    <xs:complexContent>
        <xs:extension base="Member">
            <xs:choice minOccurs="0" maxOccurs="unbounded">
                <xs:element name="Input" type="SettingTarget"/>
            </xs:choice>
        </xs:extension>
    </xs:complexContent>
</xs:complexType>
```

| Attribute/element | Description |
|---|---|
| input | A list of inputs to the constraint. An input identifies a path to the source setting value that will be passed to the constraint and constraint setting that will be set as a result. The source setting definition and the constraint setting definition should be compatible. |

3.7 System Endpoint and Resource Definitions

This section describes the schema for abstract and concrete object definitions.

An abstract object definition exposes a set of setting declarations, can contain constraints on the relationships that it participates in and has an associated manager in the runtime.

The following is an abstract system definition for a web server. The web server has two settings and has a relationship constraint that requires it to contain at least on vsite type.

```
<AbstractSystemDefinition name="WebServer"
        clrClassName="micorosft.sdm.IISSupportClass"
```

```
            manager="IISSupportCode">
        <SettingDeclaration name="serverName" type="xs:string"/>
        <SettingDeclaration name="category" type="xs:string"/>
        <RelationshipConstraint name="containsVsites"
            relationship="containmentRelationship"
            myRole="parent"
            targetType="vsite"
            minOccurs="1"
            maxOccurs="unbounded"/>
</ AbstractSystemDefinition>
```

The vsite is an abstract endpoint definition that contains server binding information.

```
<AbstractEndpointDefinition name="vsite">
    <SettingDeclaration name="ipAddress" type="ipaddress"
        required="true"/>
    <SettingDeclaration name="Endpoint" type="xs:int"/>
    <SettingDeclaration name="domainName" type="xs:int"/>
    <SettingDeclaration name="securityModel"
        type="securityModelEnum"/>
</AbstractEndpointDefinition>
```

A concrete system definition for a frontend webserver identifies the webserver category as static content, contains a single byReference endpoint member which can represent between 1 and 100 endpoint instances. The concrete endpoint definition for the endpoint is nested inside the system definition and it defines the ip Endpoint for the vsite to be Endpoint 80.

```
<SystemDefinition name="FrontendWebServer"
implements="WebServer" >
    <SettingValue name="category"
        fixed="true">staticContentOnly</settingValue>
    <Port name="contentOnlyVsite" type="port80Vsite"
        isReference="true" minOccurs="1" maxOccurs="100"/>
    <PortDefinition name="port80Vsite" implements="vsite">
        <SettingValue name="Endpoint"
            fixed="true">80</settingValue>
    </PortDefinition >
</SystemDefinition>
```

3.7.1 Object Definition

Abstract and concrete object extend the following base object definition. In addition to the elements of the base type Definition, they share the ability to constrain the relationships that the objects participate in.

```
<xs:complexType name="ObjectDefinition">
    <xs:complexContent>
        <xs:extension base="Definition">
            <xs:choice minOccurs="0" maxOccurs="unbounded">
                <xs:element name="Flow" type="FlowMember"
                    minOccurs="0" maxOccurs="unbounded"/>
                <xs:element name="RelationshipConstraintGroup"
                    type="RelationshipConstraintGroup"/>
                <xs:element name="RelationshipConstraint"
                    type="RelationshipConstraint"/>
            </xs:choice>
        </xs:extension>
    </xs:complexContent>
</xs:complexType>
```

| Attribute/element | Description |
|---|---|
| Flow | A flow members declaration |
| RelationshipConstraint | Constraints on the relationships that these types can participate in. |
| RelationshipConstraintGroup | Constraints on the relationships that these types can participate in. |

3.7.2 Abstract Object Definitions

Abstract object definitions are used to define building blocks that the design surface exposes and from which all concrete objects are derived: a concrete object definition should implement an abstract object definition.

Abstract object definitions extend SDM object by adding simple inheritance: the extends attribute is used to identify a base object definition for an abstract object definition. The abstract object definition then inherits the settings and relationship constraints from that base object definition. Through inheritance, the object definition can extend the settings and constraints of the abstract object definition by adding new settings and constraints.

Abstract object definitions can also add constraints on the relationships that they wish to participate in. For example, an abstract object definition may require the existence of certain relationships, may constrain the object definitions that may be placed on the other end of the relationship or may constrain the settings on the instances that participate in a given relationship.

3.7.2.1 Abstract Object Definition

All abstract objects can identify the layer with which they wish to be associated. If this is not provided it is assumed that the object definition can be used at any layer. Abstract object definitions can identify a base object definition that they extend, in which case they inherit the settings and constraints of that object definition and can be substituted for the base object definition in the relationships in which the base object definition participates.

```
<xs:complexType name="AbstractObjectDefinition">
    <xs:complexContent>
        <xs:extension base="ObjectDefinition">
            <xs:attribute name="Layer" type="xs:string"
                use="optional"/>
            <xs:attribute name="Extends" type="QualifiedName"
                use="optional"/>
        </xs:extension>
    </xs:complexContent>
</xs:complexType>
```

| Attribute/element | Description |
|---|---|
| layer | The layer attribute identifies the layer at which this abstract object definition can be used. If it is not provided, the abstract object definition can be used at any layer. |
| extends | Identifies the abstract object definition that this object definition derives from. |

3.7.2.2 Abstract Endpoint, System and Resource Object Definitions

There are three classifications of abstract object definition in the SDM model, these are: abstract endpoint definition, abstract system definition and abstract resource definition. Each of these is a simple rename of abstract object definition.

```
<xs:complexType name="AbstractEndpointDefinition">
    <xs:complexContent>
        <xs:extension base="AbstractObjectDefinition"/>
    </xs:complexContent>
</xs:complexType>
<xs:complexType name="AbstractSystemDefinition">
    <xs:complexContent>
        <xs:extension base="AbstractObjectDefinition"/>
    </xs:complexContent>
</xs:complexType>
<xs:complexType name="AbstractResourceDefinition">
    <xs:complexContent>
        <xs:extension base="AbstractObjectDefinition"/>
    </xs:complexContent>
</xs:complexType>
```

Endpoint definitions represent communication endpoints. The settings on the endpoint relate to its use in the binding process. For example, with a client server protocol, server endpoint definitions might use the settings schema to identify settings that are required to bind to the endpoint, client endpoint definitions might expose client specific connection attributes.

System definitions are used to represent collections of data, software or hardware elements. Examples include web services, databases and switches. Resource definitions are used to capture specific elements that can be identified as part of a system definition.

3.7.3 Implicit Base Definitions

Figure 15:
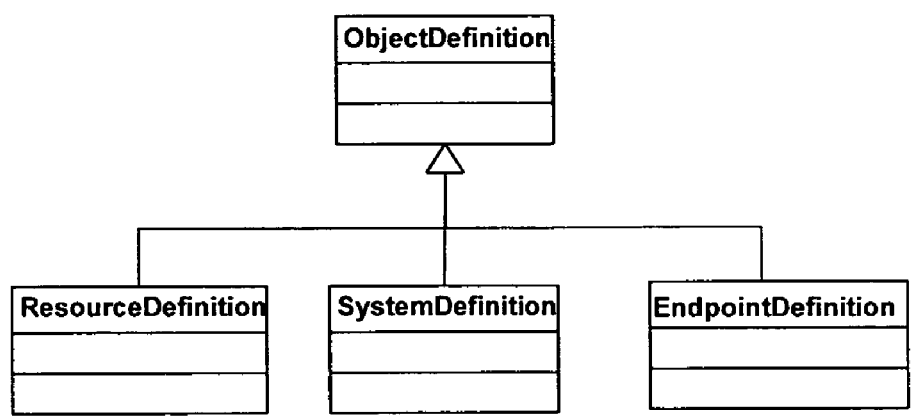
FIG. 15 illustrates an example of implicit extension of an abstract object definition.

All abstract object definitions that do not extend another abstract object definition implicitly extend one of the endpoint, system or resource base definitions as illustrated in FIG. 15. These base definitions form a root for each of the trees that can be used in relationship and constraint declarations. This allows the relationship or constraint to indicate that any of the types derived from the root can be used in place of the identified root definition. These root types are always abstract and cannot be instantiated directly.

The definitions of these types include base constraints that control their instantiation within the model; they can be found in System.sdm.

3.7.4 Concrete Object Definitions

Concrete object definitions provide an implementation for an abstract object definition. The implementation is constructed from object and relationship members, values for the settings of implemented abstract definition, new settings declarations, flow between members and constraints on members.

Concrete definitions can also contain declarations of nested definitions. These definitions can be used for members within the scope of the containing definitions and referenced in constraints outside the scope of the definition.

3.7.4.1 Base Concrete Object Definition

Base concrete type extends object definition, inheriting setting declarations, design data, an optional manager reference, a name, constraints on the relationships that it can participate in, the ability to provide values for the abstract definition's settings and the ability to describe flow between its settings and its member's settings. The concrete definition then adds the ability to identify the abstract definition that it implements and several optional attributes add the ability to customize the binding behavior of the definition.

```
<xs:complexType name="ConcreteObjectDefinition">
    <xs:complexContent>
        <xs:extension base="ObjectDefinition">
            <xs:attribute name="Implements" type="QualifiedName"
                use="required"/>
        </xs:extension>
    </xs:complexContent>
</xs:complexType>
```

| Attribute/element | Description |
|---|---|
| Implements | Identifies the abstract type that this concrete type implements. |

3.7.4.2 Object Member

Objects members should reference either an abstract or concrete object definition. They can represent an array of instances in which case they can define the upper and lower bounds for the array. If they are a reference member, then the user instantiating the object should explicitly construct an instance for the member. If they are not a reference member, then the runtime will create an instance at the same time as the outer object is created.

```
<xs:complexType name="ObjectMember">
    <xs:complexContent>
        <xs:extension base="Member">
            <xs:attribute name="MinOccurs" type="xs:int"
                use="optional"/>
            <xs:attribute name="MaxOccurs" type="xs:int"
                use="optional"/>
            <xs:attribute name="IsReference" type="xs:boolean"
                use="required"/>
        </xs:extension>
    </xs:complexContent>
</xs:complexType>
```

| Attribute/element | Description |
|---|---|
| MinOccurs | Lower bound on the number of instances associated with this member. If it is zero, then the member is optional. Default is one. |
| MaxOccurs | Upper bound on the number of instances associated with this member. Should be one or greater. Default is one. |
| IsReference | If this value is true, then the instance associated with the member should be explicitly created by the operator or referenced in another type. If it is false, then the instance is created when the type is created. |

In an sdm model we need to differentiate members that get created when the parent is constructed and destroyed when the parent is destroyed from those that may have lifetimes independent from the parent. We use the IsReference attribute for this purpose. A simple analogy is with C++ declarations that allow stack based and heap based construction based on whether new is used to create an instance. If a member is marked as IsReference then an explicit new operation is required on the part of the operator to create an instance and associate it with the member.

There are a number of reasons that we do this:
1. When an operator constructs a system, we expose the ability to construct is Reference members. This greatly simplifies the operator experience.
2. When we process an sdm document we have clear boundaries at which the instance space of the document can vary from that of the concrete definition space.

3.7.4.3 Relationship Member

Relationship members identify the relationships that will exist between object members when they are created. Relationship instances are either explicitly created by the operator or implicitly created by runtime. Examples of the former are hosting relationships between instances, the latter, communication relationships between systems.

```
<xs:complexType name="RelationshipMember">
    <xs:complexContent>
        <xs:extension base="Member">
        </xs:extension>
    </xs:complexContent>
</xs:complexType>
```

3.7.4.3.1 Hosting Member

Host members are used to declare a hosting relationship between two object members. The object members may be direct members of the containing definition or nested members that have a membership relationship with the definition. There should be a membership chain between the referenced member and the containing definition.

```
<xs:complexType name="HostingMember">
    <xs:complexContent>
        <xs:extension base="RelationshipMember">
            <xs:attribute name="GuestMember" type="Path"
                use="required"/>
            <xs:attribute name="HostMember" type="Path"
                use="required"/>
        </xs:extension>
    </xs:complexContent>
</xs:complexType>
```

| Attribute/element | Description |
| --- | --- |
| GuestMember | Identifies a member that has a definition compatible with the guest of the relationship. Member can be nested. |
| HostMember | Identifies a member that has a definition compatible with the host of the relationship. Member can be nested. |

3.7.4.3.2 Communication Member

A communication member is used to declare a communication relationship between endpoint members of immediate system members of the definition.

```
<xs:complexType name="CommunicationMember">
    <xs:complexContent>
        <xs:extension base="RelationshipMember">
            <xs:attribute name="ClientMember" type="Path"
                use="required"/>
            <xs:attribute name="ServerMember" type="Path"
                use="required"/>
        </xs:extension>
    </xs:complexContent>
</xs:complexType>
```

| Attribute/element | Description |
| --- | --- |
| ClientMember | Identifies an endpoint member that has a definition compatible with the client definition of the relationship. Endpoint member should be a member of an immediate system member of the definition. |
| ServerMember | Identifies an endpoint member that has a definition compatible with the server definition of the relationship. Endpoint member should be a member of an immediate system member of the definition. |

3.7.4.3.3 Containment Member

A containment member is used to declare that a type member is contained by the type. Each type member can either be contained or delegated. The containment member automatically sets the parent value of the containment relationship to be the this pointer of the relationship.

```
<xs:complexType name="ContainmentMember">
    <xs:complexContent>
        <xs:extension base="RelationshipMember">
            <xs:attribute name="ChildMember" type="Path"
                use="required"/>
        </xs:extension>
    </xs:complexContent>
</xs:complexType>
```

| Attribute/element | Description |
| --- | --- |
| ChildMember | Identifies an immediate object member that will be contained by the parent. |

3.7.4.3.4 Delegation Member

A delegation member is used to set up a delegation relationship between an endpoint definition member on the outer type and an endpoint definition member on an immediate system member of the outer type.

```
<xs:complexType name="DelegationMember">
    <xs:complexContent>
        <xs:extension base="RelationshipMember">
            <xs:attribute name="ProxyMember" type="Path"
                use="required"/>
            <xs:attribute name="DelegateMember" type="Path"
                use="required"/>
        </xs:extension>
    </xs:complexContent>
</xs:complexType>
```

| Attribute/element | Description |
| --- | --- |
| ProxyMember | Proxy identifies an immediate endpoint member on the system that does not have a containment relationship to the system. The definition of the member should match the definition of the proxy on the delegation relationship. |
| DelegateMember | Delegate identifies an endpoint member on an immediate member of the type. The type of the endpoint member should match the delegate type on the delegation relationship. |

3.7.4.3.5 Reference Member

A reference member is used to set up a reference relationship between two immediate or nested members of the outer system.

```
<xs:complexType name="ReferenceMember">
    <xs:complexContent>
        <xs:extension base="RelationshipMember">
            <xs:attribute name="DependentMember" type="Path"
                use="required"/>
            <xs:attribute name="SourceMember" type="Path"
                use="required"/>
        </xs:extension>
    </xs:complexContent>
</xs:complexType>
```

| Attribute/element | Description |
|---|---|
| dependentMember | The object member that depends on the source member. Should match the definition of the dependent object in the reference relationship. |
| sourceMember | The source object member. Should match the definition of the source object in the reference relationship. |

3.7.4.4 Endpoint Definition

Endpoint definitions extend the base object definition by adding the ability to declare nested resource types, resource members and host, containment and reference relationship members.

```
<xs:complexType name="EndpointDefinition">
    <xs:complexContent>
        <xs:extension base="ConcreteObjectDefinition">
            <xs:choice minOccurs="0" maxOccurs="unbounded">
                <xs:element name="ResourceDefinition"
                    type="ResourceDefinition"/>
                <xs:element name="Resource"
                    type="ResourceMember"/>
                <xs:element name="Hosting"
                    type="HostingMember"/>
                <xs:element name="Containment"
                    type="ContainmentMember"/>
                <xs:element name="Reference"
                    type="ReferenceMember"/>
            </xs:choice>
        </xs:extension>
    </xs:complexContent>
</xs:complexType>
```

| Attribute/element | Description |
|---|---|
| ResourceDefinition | A nested resource definition that can be used by type members within the scope of the outer type definition. |
| Resource | A resource member declaration that references a resource type. |
| Hosting | A hosting relationship member declaration. |
| Containment | A containment relationship member declaration. |
| Reference | A reference relationship member declaration. |

3.7.4.5 Service Definition

A system type extends the base type by adding support for: nested endpoint, system and resource types; endpoint, system, and resource members and host, containment, connection, delegation and reference relationships.

```
<xs:complexType name="ServiceDefinition">
    <xs:complexContent>
        <xs:extension base="ConcreteObjectDefinition">
            <xs:choice minOccurs="0" maxOccurs="unbounded">
                <xs:element name="EndpointDefinition"
                    type="EndpointDefinition"/>
                <xs:element name="ServiceDefinition"
                    type="ServiceDefinition"/>
                <xs:element name="ResourceDefinition"
                    type="ResourceDefinition"/>
                <xs:element name="Endpoint"
                    type="EndpointMember"/>
                <xs:element name="Subsystem"
                    type="SubSystem"/>
                <xs:element name="Resource"
                    type="ResourceMember"/>
                <xs:element name="Hosting"
                    type="HostingMember"/>
                <xs:element name="Containment"
                    type="ContainmentMember"/>
                <xs:element name="Connection"
                    type="CommunicationMember"/>
                <xs:element name="Delegation"
                    type="DelegationMember"/>
                <xs:element name="Reference"
                    type="ReferenceMember"/>
            </xs:choice>
        </xs:extension>
    </xs:complexContent>
</xs:complexType>
```

| Attribute/element | Description |
|---|---|
| EndpointDefinition | A nested endpoint definition that can be used by members within the scope of the outer service definition |
| ResourceDefinition | A nested resource definition that can be used by type members within the scope of the outer type definition. |
| SystemDefinition | A nested system definition that can be used by members within the scope of the outer system definition |
| Endpoint | An endpoint member declaration that references an endpoint definition. |
| Subsystem | A subsystem member declaration that references a system definition |
| Resource | A resource member declaration that references a resource definition. |
| Containment | A containment relationship member declaration. |
| Hosting | A hosting relationship member declaration. |
| Connection | A connection relationship member declaration. |
| Delegation | A delegation relationship member declaration. |
| Reference | A reference relationship member declaration. |

3.7.4.6 Resource Definition

A resource type may contain nested resource type definitions, resource members, and host, containment and reference relationship members.

```
<xs:complexType name="ResourceDefinition">
    <xs:complexContent>
        <xs:extension base="ConcreteObjectDefinition">
            <xs:choice minOccurs="0" maxOccurs="unbounded">
```

```
            <xs:element name="ResourceDefinition"
                type="ResourceDefinition"/>
            <xs:element name="Resource"
                type="ResourceMember"/>
            <xs:element name="Hosting"
                type="HostingMember"/>
            <xs:element name="Containment"
                type="ContainmentMember"/>
            <xs:element name="Reference"
                type="ReferenceMember"/>
        </xs:choice>
    </xs:extension>
  </xs:complexContent>
</xs:complexType>
```

| Attribute/element | Description |
| --- | --- |
| ResourceDefinition | A nested resource definition that can be used by members within the scope of the outer resource definition. |
| Resource | A resource member declaration that references a resource defintion. |
| Hosting | A hosting relationship member declaration. |
| Containment | A containment relationship member declaration. |
| Reference | A reference relationship member declaration. |

3.7.4.7 Relationship Rules

For a particular instance of an object definition the following tables identify the cardinality associated with each of the roles that the instance can play.

3.7.4.7.1 System Rules

| Definition | Role | System | Endpoint | Resource |
| --- | --- | --- | --- | --- |
| System | Parent(0 . . . *) | Contains | Contains | Contains |
|  | Member(1 . . . 1) | ContainedBy | Not Allowed | Not Allowed |
|  | Proxy(0 . . . *) | Not Allowed | Not Allowed | Not Allowed |
|  | Delegate(0 . . . *) | Not Allowed | Not Allowed | Not Allowed |
|  | Client(0 . . . *) | Not Allowed | Not Allowed | Not Allowed |
|  | Server(0 . . . *) | Not Allowed | Not Allowed | Not Allowed |
|  | Guest(1 . . . 1) | HostedBy | HostedBy (??) | HostedBy |
|  | Host(0 . . . *) | Hosts | Hosts | Hosts |
|  | Source(0 . . . *) | Provides | Not Allowed | Not Allowed |
|  | Dependent(0 . . . *) | Consumes | Not Allowed | Not Allowed |

3.7.4.7.2 Endpoint Rules

| Definition | Role | System | Endpoint | Resource |
| --- | --- | --- | --- | --- |
| Endpoint | Parent(0 . . . *) | Not Allowed | Not Allowed | Contains |
|  | Member(1 . . . 1) | ContainedBy | Not Allowed | Not Allowed |
|  | Proxy(0 . . . *) | Not Allowed | DelegatesTo | Not Allowed |
|  | Delegate(0 . . . *) | Not Allowed | Implements | Not Allowed |
|  | Client(0 . . . *) | Not Allowed | ConnectsTo | Not Allowed |
|  | Server(0 . . . *) | Not Allowed | ProvidesService | Not Allowed |
|  | Guest(1 . . . 1) | HostedBy | HostedBy | HostedBy |
|  | Host(0 . . . *) | Hosts | Hosts | Hosts |
|  | Source(0 . . . *) | Not Allowed | Provides | Provides |
|  | Dependent(0 . . . *) | Not Allowed | Consumes | Consumes |

3.7.4.7.3 Resource Rules

| Definition | Role | System | Endpoint | Resource |
| --- | --- | --- | --- | --- |
| Resource | Parent(0 . . . *) | Not Allowed | Not Allowed | Contains |
|  | Member(1 . . . 1) | ContainedBy | ContainedBy | ContainedBy |
|  | Proxy(0 . . . *) | Not Allowed | Not Allowed | Not Allowed |
|  | Delegate(0 . . . *) | Not Allowed | Not Allowed | Not Allowed |
|  | Client(0 . . . *) | Not Allowed | Not Allowed | Not Allowed |
|  | Server(0 . . . *) | Not Allowed | Not Allowed | Not Allowed |
|  | Guest(1 . . . 1) | HostedBy | HostedBy | HostedBy |
|  | Host(0 . . . *) | Hosts | Hosts | Hosts |
|  | Source(0 . . . *) | Not Allowed | Provides | Provides |
|  | Dependent(0 . . . *) | Not Allowed | Consumes | Consumes |

3.7.4.7.4 Notes

Every instance should participate in exactly one containment relationship and at least one hosting relationship.

This means that:
A) non-reference members should identify a containment relationship
b) in order to be constructed a reference member should identify a containment relationship
c) reference members that do not have a containment relationship can only delegate to other members.

3.8 Relationships

Relationships are used to identify possible interactions between types. They are binary and directed, each identifying the type of the instances that can participate in the relationship. Relationships can also constrain the settings of the instances that participate in the relationship and can flow setting values across the relationship.

The following is a possible hosting relationship for a webApplication on the webserver described in the types section. The relationship contains a constraint that verifies that the security models of the two systems are compatible and it contains a settings flow member that copies the server name from the vsite to the vdir.

```
<AbstractHostingDefinition name="vsiteHostsVdir" guestType="vdir" hostType="vsite">
    <ObjectConstraint name="checkCompatibility" primaryRole="guest" primaryType="vdir">
        <Constraint name="constrainSecurityModel" type="SimpleOperatorComparison">
            <input name="LHS" path="host.securityModel"/>
            <settingValue name="operator">= =</settingValue>
            <input name="RHS" path="guest.securityModel"/>
        </Constraint>
    </ ObjectConstraint >
    <flow type="copy" name="copyServerToVdir">
        <input name="source" path="host.server"/>
        <output name="destination" path="guest.server"/>
    </flow>
</ AbstractHostingDefinition >
```

A relationship is used by declaring a relationship member that identifies the type members that will participate in the relationship.

```
<SystemDefinition name="testSystem" implements="ApplicationSpace">
    <resource name="myVdir" type="vdir" isReference="false"/>
    <resource name="myVsite" type="vsite" isReference="false"/>
    <hosting relationship="vsiteHostsVdir" guestMember="myVdir" hostMember="myVsite"/>
</ SystemDefinition >
```

3.8.1 Relationship Definition

The base relationship definition adds object constraints and flow to definitions. Object constraints are statements about the setting values for the object instances that participate in an instance of this relationship. For example, a communication relationship that represents a DCOM connection may check that the security settings for client and server are compatible. In this case, there is a strict relationship between settings that could easily be captured as part of the design process; there are four factorial setting combinations over the relationship but a much smaller number of valid combinations.

Flow gives the ability for the relationship developer to forward values from one instance to another. This allows the object definitions to be developed separately from their possible interactions and allows the instance to stand alone as a reference point for information rather than requiring a subset of the relationship graph in order to fully describe a particular instance.

The name for the relationship should be unique within the namespace that contains the relationship.

```
<xs:complexType name="RelationshipDefinition">
    <xs:complexContent>
        <xs:extension base="Definition">
            <xs:choice minOccurs="0" maxOccurs="unbounded">
                <xs:element name="ObjectConstraintGroup"
                    type="ObjectConstraintGroup"/>
                <xs:element name="ObjectConstraint"
                    type="ObjectConstraint"/>
                <xs:element name="Flow" type="FlowMember"/>
            </xs:choice>
        </xs:extension>
    </xs:complexContent>
</xs:complexType>
```

| Attribute/element | Description |
| --- | --- |
| ObjectConstraint (group) | Constraints on the instances that participate in this relationship. See section: 3.5.3 |
| Flow | Flow between the instances that participate in this relationship. |

3.8.2 Abstract Relationships

Abstract relationships are relationships that are defined between two abstract object definitions. They represent possible interactions between the two definitions.

```
<xs:complexType name="AbstractRelationshipDefinition">
    <xs:complexContent>
        <xs:extension base="RelationshipDefinition">
            <xs:attribute name="extends" type="QualifiedName"
                use="optional"/>
        </xs:extension>
    </xs:complexContent>
</xs:complexType>
```

3.8.2.1 Abstract Communication Relationship

Communication relationships are used to capture possible communication links between endpoint definitions. They are used to describe interaction between independently deployed software elements. The communication relationship schema extends the base relation schema by adding client and server endpoint references.

```
<xs:complexType name="AbstractCommunicationDefinition">
    <xs:complexContent>
        <xs:extension base="AbstractRelationshipDefinition">
            <xs:attribute name="ClientDefinition"
                type="QualifiedName" use="required"/>
            <xs:attribute name="ServerDefinition"
                type="QualifiedName" use="required"/>
        </xs:extension>
    </xs:complexContent>
</xs:complexType>
```

| Attribute/element | Description |
| --- | --- |
| ClientDefinition | The defintion of the client instance involved in the communication relationship |
| ServerDefinition | The type of the server instance involved in the relationship |

The following combinations of abstract type pairs are valid for communication relationships:

| Client Type | Server Type |
| --- | --- |
| Endpoint | Endpoint |

3.8.2.2 Abstract Hosting Relationship

Hosting relationships are used to capture the fact that a guest requires a host in order to be constructed. Since there can be more than on possible host for a guest, this implies that the hosting relationship is also responsible for the construction of the guest on a host. So in order to create an instance of an object, a hosting relationship should exist from a guest to a compatible host.

For example, a hosting relationship may exist between a Webservice object definition and an IIS object definition. In this case, the relationship indicates that it may be possible to create an instance of system MyWebservice on an instance of system MyIIS using the manager on the hosting relationship assuming MyWebservice and MyIIS implement webservice and IIS respectively. We do not know whether it will be possible to create the relationship until we have evaluated constraints that exist on both the systems and the relationship.

```
<xs:complexType name="AbstractHostingDefinition">
    <xs:complexContent>
        <xs:extension base="AbstractRelationshipDefinition">
            <xs:attribute name="GuestDefinition"
                type="QualifiedName" use="required"/>
            <xs:attribute name="HostDefinition"
                type="QualifiedName" use="required"/>
        </xs:extension>
    </xs:complexContent>
</xs:complexType>
```

| Attribute/element | Description |
| --- | --- |
| GuestDefinition | Identifies the definition of the guest instance. |
| HostDefinition | Identifies the definition of the host instance. |

The following combinations of abstract definition pairs are valid for hosting relationships:

| Guest Type | Host Type |
| --- | --- |
| Endpoint | Endpoint |
| Resource | Resource |
| Resource | System |
| System | Resource |
| System | System |

3.8.2.3 Abstract Containment Relationship

A containment relationship between two abstract objects captures the fact that a concrete type based on the parentType can contain members based on the memberType. Containment implies that the parent instance can control the lifetime of the member instance and can delegate behavior to the member instance.

```
<xs:complexType name="AbstractContainmentDefinition">
    <xs:complexContent>
        <xs:extension base="AbstractRelationshipDefinition">
            <xs:attribute name="ParentDefinition"
                type="QualifiedName" use="required"/>
            <xs:attribute name="MemberDefinition"
                type="QualifiedName" use="required"/>
        </xs:extension>
    </xs:complexContent>
</xs:complexType>
```

| Attribute/element | Description |
| --- | --- |
| ParentDefinition | Identifies the definition of the instance that will contain the member. |
| MemberDefinition | Identifies the definition of the instance that will be the contained member |

The following combinations of abstract definition pairs are valid for containment relationships:

| Parent Type | Member Type |
| --- | --- |
| System | Endpoint |
| System | Resource |
| System | System |
| End point | Resource |
| Resource | Resource |

3.8.2.4 Abstract Delegation Relationship

Delegation is used to forward behavior from an outer system to a contained system. The way we do this is by delegating the endpoints on the outer system to endpoints on the inner system. This effectively forwards all interaction that would have been directed to the outer system to the endpoint on the inner system. Delegation can be chained, allowing the inner system to further delegate its behavior to another system.

A delegation relationship defines pairs of abstract endpoint definitions that can participate in the delegation. Each relationship identifies an abstract endpoint definition that can act as a proxy and an abstract endpoint definition to which it can delegate behavior.

```
<xs:complexType name="AbstractDelegationDefinition">
    <xs:complexContent>
        <xs:extension base="AbstractRelationshipDefinition">
            <xs:attribute name="ProxyDefinition"
                type="QualifiedName" use="required"/>
            <xs:attribute name="DelegateDefinition"
                type="QualifiedName" use="required"/>
        </xs:extension>
    </xs:complexContent>
</xs:complexType>
```

| Attribute/element | Description |
| --- | --- |
| ProxyDefinition | Identifies the definition of the outer endpoint that delegates its behavior to the inner endpoint |
| DelegateDefinition | Identifies the definition of the inner endpoint that provides the required behavior. |

The following combinations of abstract type pairs are valid for delegation relationships:

| Proxy Type | Delegate Type |
| --- | --- |
| Endpoint | Endpoint |

We may allow resource and system delegation to support binding between layers. For example, to allow IIS to expose part of the file system without having to deploy it.

3.8.2.5 Abstract Reference Relationship

We use reference relationships to capture strong dependencies between instances that are in addition to the hosting relationship dependency. These dependencies are used to control construction order during deployment and flow parameters between systems during installation and update. Because reference relationships indicate a strong dependency, we cannot allow a reference relationship to cross a system boundary. This means that resources within one system cannot have dependencies on resources in another system. This would make the system no longer an independent unit of deployment. Where dependencies exist between systems, we use communication relationships. Communication relationships can change over time without requiring reinstallation of the system.

```
<xs:complexType name="AbstractReferenceDefinition">
    <xs:complexContent>
        <xs:extension base="AbstractRelationshipDefinition">
            <xs:attribute name="DependentDefinition"
                type="QualifiedName" use="required"/>
            <xs:attribute name="SourceDefinition"
                type="QualifiedName" use="required"/>
        </xs:extension>
    </xs:complexContent>
</xs:complexType>
```

| Attribute/element | Description |
| --- | --- |
| DependentDefinition | The definition of the instance that depends on the source instance |
| SourceDefinition | The definition of the source instance. This instance is not required to be aware of the dependency. |

The following combinations of abstract type pairs are valid for reference relationships:

| Dependent Type | Source Type |
| --- | --- |
| System | System |
| Resource | Resource |

3.8.3 Implicit Base Relationships

Figure 16:
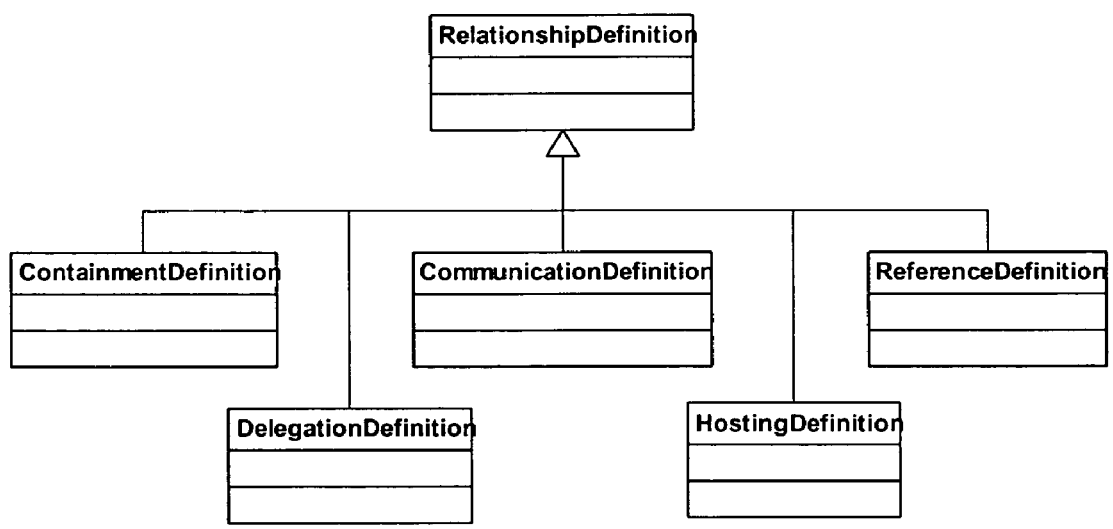
FIG. 16 illustrates an example of implicit extension of an abstract relationships.

All abstract relationships implicitly extend one of the base relationships definitions as illustrated in FIG. 16. These definitions form a root for each of the relationship trees. By doing this we can refer to the root definition from within constraint definitions and we can inherit common type constraints from the root type.

3.8.4 Concrete Relationships

Concrete relationships are relationships between two concrete object definitions. Each concrete relationship should implement an abstract relationship. The abstract relationship should be between a matching pair of abstract objects definitions that are directly or indirectly (through inheritance) implemented by the concrete object definitions.

```
<xs:complexType name="ConcreteRelationship">
    <xs:complexContent>
        <xs:extension base="RelationshipDefinition">
            <xs:attribute name="Implements"
                type="QualifiedName"/>
        </xs:extension>
    </xs:complexContent>
</xs:complexType>
```

3.8.4.1 Hosting Relationship

When we deploy an application to a datacenter we need to resolve all the outstanding hosting relationships for the systems within the application. To do this the operator would need to create hosting members for each of the required hosting relationships. To simplify the task of the operator and to allow the developer to guide the deployment process, the developer can instead create a concrete hosting relationship. The concrete hosting relationship is used to group a set of hosting relationship members in such a way that the operator need only declare a single hosting member when deploying the application.

```
<xs:complexType name="HostingDefinition">
    <xs:complexContent>
        <xs:extension base="ConcreteRelationship">
            <xs:sequence>
                <xs:element name="Hosting" type="HostingMember"
                    minOccurs="0" maxOccurs="unbounded"/>
            </xs:sequence>
            <xs:attribute name="GuestDefinition"
                type="QualifiedName" use="required"/>
            <xs:attribute name="HostDefinition"
                type="QualifiedName" use="required"/>
        </xs:extension>
    </xs:complexContent>
</xs:complexType>
```

| Attribute/element | Description |
| --- | --- |
| HostDefinition | The name of the guest concrete object definition to which this hosting relationship applies. |

-continued

| Attribute/element | Description |
|---|---|
| GuestDefinition | The name of the host concrete object definition to which this hosting relationship applies. |
| Hosting | A list of hosting relationship members that reference members rooted to the guest and host definitions of the concrete relationship |

The following combinations of concrete type pairs are valid for hosting relationships:

| Guest Type | Host Type |
|---|---|
| System | System |

A guest can be bound to a host iff
For each guestMember in Guest
There exists one or more hostMember in Host where
guestMember.Type has a hosting relation with hostMember.type
and guestMember.hostConstraints validate against host-Member.settings
and hostMember.guestConstraints validate against guest-Member.settings
and for each member of guestMember there exists a binding to a member of hostMember For example the following concrete relationship binds a layer three system (Bike) to a layer two host (operating System). In this case, we define a setting for the hosting relationship with the default value of "system folder". We flow this setting to one of three hosting members that define the hosting relationship between systems of the layer 3 application and systems of the layer 2 host.

```
<HostingDefinition name="DefaultBikePlacement"
guestDefinition="Bike"
hostDefinition="OperatingSystem:OperatingSystem">
    <settingDeclaration name="fileLocationRelativeToRoot"
    definition="xs:sting" access="readwrite" dynamic="false"/>
    <settingValue name="dirPath">systemFolder</settingValue>
    <flow name="copyPath" definition="copy">
        <input name="source" path="dirPath"/>
        <output name="destination"
        path="bikeExecutableHost.hostRelativePath"/>
    </flow>
    <hosting name="bikeExecutableHost"
    relationship="fileDirectoryHost"
        guestMember="guest.bikeFile"
        hostMember="host.FileSystem"/>
    <hosting name="bikeEventKeyHost"
    relationship="registryKeyRegistryKeyHost"
        guestMember="guest.bikeEventKey"
        hostMember="host.Registry.ApplicationEventKey"/>
    <hosting name="bikeSoftwareKeyHost"
    relationship="registryKeyRegistryKeyHost"
        guestMember="guest.bikeSoftwareKey"
        hostMember="host.Registry.HKLM"/>
</HostingDefinition >
```

3.8.4.2 Reference Relationship

We can use a concrete reference relationship between two concrete types to capture specific dependencies between systems that do not involve communication relationships. For example, we can capture the fact that for one application to be installed, another should already exist.

```
<xs:complexType name="ReferenceDefinition">
    <xs:complexContent>
        <xs:extension base="ConcreteRelationship">
            <xs:sequence>
                <xs:element name="Reference"
                type="HostingMember"m inOccurs="0"
                maxOccurs="unbounded"/>
            </xs:sequence>
            <xs:attribute name="DependentDefinition"
            type="QualifiedName" use="required"/>
            <xs:attribute name="SourceDefinition"
            type="QualifiedName" use="required"/>
        </xs:extension>
    </xs:complexContent>
</xs:complexType>
```

| Attribute/element | Description |
|---|---|
| DependentDefinition | The name of the dependent concrete object definition to which this reference relationship applies. |
| SourceDefinition | The name of the source concrete object definition to which this reference relationship applies. |
| Reference | A list of reference relationship members that reference members of the guest and host definitions. |

The following combinations of concrete type pairs are valid for reference relationships:

| Dependent Type | Source Type |
|---|---|
| System | System |
| Resource | Resource |
| Resource | Endpoint |
| End point | Resource |

3.9 Object and Relationship Constraints

We use object and relationship constraints to define the topology of the concrete space and to constrain the settings of objects when used in particular relationships.

For example within an abstract object definition (A) we may want to identify that implementations of this abstract definition should contain one instance of another abstract object definition (B). Assuming that at least one appropriate containment relationship already exists, to do this we would use a relationship constraint within A that looked as follows:

```
<RelationshipConstraint name="AContainsB"
    relationship="ContainmentDefinition"
    myRole="parent"
    targetType="B"
    minOccurs="1"
    maxOccurs="1"/>
```

The constraint identifies that there should exist a containment relationship in which the implementation of A plays the role of parent and the type at the other end of the relationship (the member) is of type B. If we want more control over the configuration of B we can add a constraint on the settings of type B as follows:

```
<RelationshipConstraint name="AContainsB"
                relationship="ContainmentDefinition"
                myRole="parent"
                targetType="B"
                minOccurs="1"
                maxOccurs="1">
    <Constraint definition="simpleValueConstraint"
            name="BValueConstraint">
        <input name="LHS" path="member.name" />
        <settingValue name="operator">=</settingValue>
        <settingValue name="RHS">myPort</settingValue>
    </Constraint>
</RelationshipConstraint>
```

In this case, we added a constraint that required the name of the member to equal the string "myPort".

We can also add constraints to relationships; we call these object constraints. From within a relationship we constrain the objects that participate in the relationship. For each role in the relationship, we can identify a object definition and then we can add setting constraints to those object definitions. From the relationship perspective the cardinality is always minOccurs=1 and maxOccurs=1 so this does not appear in the constraint declaration.

```
<ObjectConstraint name="allowedPair"
        primaryRole="host"
        primaryType="IIS"
        secondaryRole="guest"
        secondary Type="webApp"/>
```

Finally, we can nest constraints. This gives us the ability to chain constraints together; the outer constraint sets the context for the inner constraint. The following is an example of an IIS system that hosts webapp systems that it then constrains the webApp only containendpoints of a specific type.

In this case, we use a group of object constraints to specify a set of possibilities of which at least one should be true.

```
<AbstractSystemDefinition name="IIShost">
    <RelationshipConstraint name="WebAppHostConstraint"
    relationship="hostingRelationship" myRole="host"
targetType="webApp">
        <RelationshipConstraint name="WebAppContainsPort"
        relationship="containmentRelationship" myRole="parent"
targetType="portType">
            <ObjectConstraintGroup mode="oneTrue">
                <ObjectConstraint name="hasWebPort"
                    primaryRole="member" primaryType="webPort"/>
                < ObjectConstraint name="hasSqlPort"
                    primaryRole="member" primaryType="sqlPort"/>
            </ObjectConstraintGroup>
        </RelationshipConstraint >
    </RelationshipConstraint >
</ AbstractSystemDefinition >
```

The nested constraints form a path that we can evaluate from the outside in. Each constraint on the path can access the settings of previous instances on the path as well as the current instance. The evaluation of nested constraints is conducted as if the constraint had been defined within the identified system.

From the perspective of foo the following two scenarios should be equivalent. In the first foo places a nested constraint on a contained system bar, in the second, the type bar already contains the constraint.

Scenario 1:

```
< AbstractSystemDefinition name="foo">
    < RelationshipConstraint name="containsBar"
    relationship="containment"
        myRole="parent" targetType="bar" minOccurs="1">
        < RelationshipConstraint name="containsX"
        relationship="containment"
            myRole="parent" targetType="X" minOccurs="1"/>
    </ RelationshipConstraint >
</ AbstractSystemDefinition >
< AbstractSystemDefinition name="bar"/>
```

3.9.1 Constraint Model

There are two parts to the constraint model: guards and predicates. We use guards to define the context in which we execute the predicate. For example within a relationship, we use guards to identify a particular combination of types for which we want to execute a predicate. Within a object, we use guards to identify a set of relationship to other objects.

Predicates are then executed when the requirement of their guards have been met. We have two forms of predicate: setting constraints that validate setting values and group constraints that validate a set of constraints.

We can nest guards within guards, in which case the inner guard is only checked when the outer guard is satisfied. This allows us to build paths that support verification of a relationship structure.

The combination of a guard and its predicates can have a cardinality that indicates the number of times that the guard should match and the predicate evaluate to true.

More formally,

```
Guard    := = ObjectConstraint(ObjectDefintion,
    ObjectDefintion ,required)
        { (Guard | predicate) * } |
    RelationshipConstraint(RelationshipDefinition,
            Targetobject,lBound,uBound)
        { (Guard | predicate) * }
```

A guard is defined as either a ObjectConstraint or a RelationshipConstraint. Object constraints identify two object definitions that are associated with either end of the relationships. Relationship constraints identify a relationship definition and a target object definition. An object constraint can be optional or required while a relationship constraint has a lower bound and an upper bound. This difference in cardinality reflects the fact that a relationship can only ever identify two types while a type can participate in multiple relationships.

Predicate := SettingsConstraint(rule) | group{ (guard)* }

A predicate is either a settings constraint that contains a rule or a group that contains a set of guards. The predicate is evaluated in the context of the guard. In the case of a settings constraint, the predicate can identify settings from the owner of the root guard and the context identified by each nested guard. Groups are used to identify a set of guards of which at least one should match and evaluate to true.

EXAMPLES

1. RelationshipConstraint(containmentRelationship,webapp,0,1){ }

This example shows a guard that evaluates to true whenever there is a containment relationship to a webapp. This guard can evaluate true at most one time. Further matches will result in the return of an error to the user.

```
2. Relationshipconstraint(containmentRelationship,webapp,0,1)
   {
       SettingsConstraint(webapp.name=2)
   }
```

This example adds a predicate to the guard. The guard will only evaluate to true when the relationship and target definitions match and the setting constraint evaluates to true. If the relationship and target definition match and the setting constraint is not true then an error will be returned to the user. If the relationship and target type match and the setting constraint evaluates true more than once, then an error is returned to the user.

```
3. RelationshipConstraint(containmentRelationship,webapp,0,1)
   {
       RelationshipConstraint(containmentRelationship,vdir,0,1)
   }
```

In this example, we nest a guard within a guard. When the outer guard is true (the type that contains the constraint also contains a webapp), we then evaluate the inner guard in the context of the outer guard. That means the inner relationship constraint will be evaluated in the context of a webapp instance. The inner constraint will return true if the webApp contains zero or one vdirs, if it contains more than one vdir then the constraint will return an error to the user.

```
4. ObjectConstraint(webapp,iis,0,1)
   {
       RelationshipConstraint(containmentRelationship,systemType,0,1)
       {
           TypeConstraint(webapp,vdir,0,1)
       }
   }
```

The context of the object constraint is the primary object definition (the first object definition). This means that the relationship constraint will be evaluated in the context of webapp. The relationship constraint defines two possible contexts, the first is the relationship, which will be the context for object constraints, and the second is the target object definition which is the context for relationship constraints.

```
5. RelationshipConstraint(containmentRelationship,webapp,0,1)
   {
       group
       {
           RelationshipConstraint(containmentRelationship,vdir,0,1)
```

-continued

```
           RelationshipConstraint(containmentRelationship,directory,0,1)
       }
   }
```

In this example, we use a group to contain two relationships constraints that will both be evaluated in the context of the Webapp. The group will raise an error unless at least one of the relationships fire and return true. In this case, the Webapp should contain either a Vdir or a directory.

3.9.2 Base Constraint

```xml
<xs:complexType name="Constraint">
    <xs:sequence>
        <xs:element name="Description" type="Description"
            minOccurs="0"/>
        <xs:element name="DesignData" type="DesignData"
            minOccurs="0"/>
    </xs:sequence>
    <xs:attribute name="name" type="SimpleName"/>
</xs:complexType>
```

| Attribute/element | Description |
| --- | --- |
| Name | Name of this constraint section |
| DesignData | Design surface specific information about this constraint |

3.9.3 Object Constraint

An object constraint describes a constraint to one or both of the roles of relationship. The constraint has a name to aid identification of the constraint in the case that it fails, it contains a list of settings constraints targeted at the types associated with the roles and it may further constrain the instance to be of a object derived from the definition associated with the role.

```xml
<xs:complexType name="ObjectConstraint">
    <xs:complexContent>
        <xs:extension base="Constraint">
            <xs:choice minOccurs="0" maxOccurs="unbounded">
                <xs:element name="SettingsConstraint"
                    type="ConstraintMember"/>
                <xs:element name="RelationshipConstraint"
                    type="RelationshipConstraint"/>
                <xs:element name="RelationshipConstraintGroup"
                    type="RelationshipConstraintGroup"/>
            </xs:choice>
            <xs:attribute name="PrimaryRole" type="RolesList"
                use="required"/>
            <xs:attribute name="PrimaryObject"
                type="QualifiedName" use="required"/>
            <xs:attribute name="SecondaryRole" type="RolesList"
                use="optional"/>
            <xs:attribute name="SecondaryObject"
                type="QualifiedName" use="optional"/>
            <xs:attribute name="Required" type="xs:boolean"
                use="optional"/>
        </xs:extension>
    </xs:complexContent>
</xs:complexType>
```

| Attribute/element | Description |
| --- | --- |
| SettingConstraint | A list of setting constraints that apply relative to the Context of this constraint |
| RelationshipConstraint | A nested relationship constraint. The relationship is evaluated as if it had been declared on the type associated with the primary role. |
| RelationshipConstraintGroup | A nested relationship group - the relationships in the group are evaluated as if it had been declared on the type associated with the primary role. Previous constraints become well-know names for settings roots. |
| PrimaryRole | The name of a role in the relationship that this constraint targets. |
| PrimaryObject | The name of the object definition associated with the primary role. |
| SecondaryRole | The name of the other role on the relationship that this constraint targets. |
| SecondaryObject | The name of the object definition associated with the secondary role on the relationship. This is required if a secondary role is specified. |
| Required | If required is true then the constraint should match the definitions it has declared for the roles on the relationship. If required is false, then guard does not have to match the types in use. Required is used to force a relationship to use a particular combination of types. |

3.9.4 Object Constraint Group

An object constraint group allows sets of object constraints to be grouped together so that they can be evaluated using at-least-one semantics. The group will return an error unless at least one of object constraints matches the objects on the relationship and then its contained predicates evaluate to true. We ignore the required attribute for type constraints if the constraint is a direct member of the group.

```
<xs:complexType name="ObjectConstraintGroup">
    <xs:complexContent>
        <xs:extension base="Constraint">
            <xs:sequence>
                <xs:element name="ObjectConstraint"
                    type="ObjectConstraint" maxOccurs="unbounded"/>
            </xs:sequence>
        </xs:extension>
    </xs:complexContent>
</xs:complexType>
```

| Attribute/element | Description |
| --- | --- |
| ObjectConstraint | A list of type constraints defined within the group |

3.9.5 Relationship Constraint

Relationship constraints are used to constrain the relationships in which a object can participate. A relationship constraint identifies the relationship definition, optionally the object definition of the instance at the other end of the relationship and the cardinality of the relationship. The constraint is given a name so that it can be identified in error messages. The body of the relationship constraint contains predicates about both the relationship and the instances at the other end of the relationship.

Relationship constraints can be used for a number of purposes: simply using the cardinality without additional predicates, they can be used to identify relationships that should be provided for an instance to operate correctly, with predicates they can be used narrow the set of configurations for instances that this object is willing to interact with.

```
<xs:complexType name="RelationshipConstraint">
    <xs:complexContent>
        <xs:extension base="Constraint">
            <xs:choice minOccurs="0"
                maxOccurs="unbounded">
                <xs:element name="SettingsConstraint"
                    type="ConstraintMember"/>
                <xs:element name="RelationshipConstraint"
                    type="RelationshipConstraint"/>
                <xs:element name="RelationshipConstraintGroup"
                    type="RelationshipConstraintGroup"/>
                <xs:element name="ObjectConstraint"
                    type="ObjectConstraint"/>
                <xs:element name="ObjectConstraintGroup"
                    type="ObjectConstraintGroup"/>
            </xs:choice>
            <xs:attribute name="Relationship" type="QualifiedName"
                use="required"/>
            <xs:attribute name="MyRole" type="RolesList"
                use="required"/>
            <xs:attribute name="TargetObject" type="QualifiedName"
                use="optional"/>
            <xs:attribute name="MinOccurs" type="MinOccurs"
                use="optional"/>
            <xs:attribute name="MaxOccurs" type="MaxOccurs"
                use="optional"/>
        </xs:extension>
    </xs:complexContent>
</xs:complexType>
```

| Attribute/element | Description |
| --- | --- |
| SettingConstraint | Constraints on the values of settings within the relationship or on objects at the other end of the relationship. |
| RelationshipConstraint | A relationship constraint that is evaluated in the context of the target object (target object definition should be specified). This is equivalent to the adding the constraint to the target object. |
| RelationshipConstraintGroup | A relationship group that is evaluated in the context of the target object (target object should be specified). This is equivalent to the adding the group to the target object. |
| ObjectConstraint | A nested object constraint that is evaluated as though it were part of the relationship defintion identified by the outer constraint. |
| ObjectConstraintGroup | A nested object constraint group that is evaluated as though it were part of the relationship definition identified by the outer constraint. |
| Name | Unique name for the constraint within the scope of the containing definition |
| Relationship | The name of the relationship definition that is being constrained |
| MyRole | The name of the role this object instance will plays in this relationship - this is the name corresponding to the attribute |

| Attribute/element | Description |
| --- | --- |
| | name in the relationship definition eg client/server, guest/host etc If this is not provided we infer the role from the types involved in the relationship. |
| TargetObject | Optional name of the definition of the object that can appear on the other side of the relationship |
| MaxOccurs | The maximum number of times instances of this object can be identified as a participant in the defined role in the named relationship. If this is zero, then the type explicitly forbids participation in the named relationship. |
| MinOccurs | The minimum number of times instances of this object can be identified as a participant in the defined role in the named relationship |

3.9.6 Relationship Constraint Group

A relationship constraint group allows sets of relationship constraints to be grouped together so that they can be evaluated as a predicate with at-least-one semantics. The group will return an error unless at least one of the contained relationship constraints match a relationship definition and target object and its contained predicates return true. If any of the predicated in the contained constraints returns an error, then these errors are propagated to the user. The minOccurs cardinality of the contained relationship constraints is ignored but if the maxOccurs cardinality is violated then an error will be returned to the user.

```
<xs:complexType name="RelationshipConstraintGroup">
    <xs:complexContent>
        <xs:extension base="Constraint">
            <xs:sequence>
                <xs:element name="RelationshipConstraint"
                    type="RelationshipConstraint"
                    maxOccurs="unbounded"/>
            </xs:sequence>
        </xs:extension>
    </xs:complexContent>
</xs:complexType>
```

| Attribute/element | Description |
| --- | --- |
| relationshipConstraint | A relationship constraint defined within the group |

3.10 Object Manager

Object managers are the mechanism by which types and relationships insert custom behavior into the runtime environment. There are several roles that a manager can support for each type that it manages: it can participate in the installation of the type, it can provide a CLR representation of the type, it can be involved in policy decisions about how bindings between types are resolved and it can provide the implementation for complex constraints and flow.

All object managers roles exposed through the CLR as entry points into strongly named classes. Object managers are packaged and versioned in the same manner as other types in the sdm; they are distributed in system distribution units and their version and strong name is derived from the sdm file in which they are declared.

```
<xs:complexType name="Manager">
    <xs:sequence>
        <xs:element name="Description" type="Description"
            minOccurs="0"/>
    </xs:sequence>
    <xs:attribute name="Name" type="SimpleName"
        use="required"/>
    <xs:attribute name="AssemblyName" type="xs:string"
        use="required"/>
    <xs:attribute name="Version" type="FourPartVersionType"
        use="optional"/>
    <xs:attribute name="PublicKeyToken" type="PublicKeyTokenType"
        use="optional"/>
    <xs:attribute name="Culture" type="xs:string" use="optional"/>
    <xs:attribute name="Platform" type="xs:string" use="optional"/>
    <xs:attribute name="SourcePath" type="xs:string" use="optional"/>
</xs:complexType>
```

| Attribute/element | Description |
| --- | --- |
| Name | A unique name for this manager in the scope of the containing sdm file. |
| Description | A text description of the manager |
| AssemblyName | The assembly name |
| Version | The assembly version |
| PublicKeyToken | The public key token for the assembly |
| Culture | The culture of the assembly |
| Platform | The platform of the assembly |
| SourcePath | The path to the assembly within the SDU |

3.10.1 Roles

An object manager can support one or more roles for each type that it supports. These roles include:

a) Evaluating constraints for the type or relationship
b) Evaluating flow for the type or relationship
c) Construction/destruction/update support for a type
d) Exposing an object representation for the settings on the type or relationship
e) Performing discovery for the type or relationship.
f) Supporting design surface specific UI around a type or relationship

3.11 SDM Document Structure

An sdm document provides a strong identity, versioning and localization information for a set of relationships, objects and managers.

```
<xs:element name="Sdm">
    <xs:complexType>
        <xs:sequence>
            <xs:element name="Information" type="Information"
                minOccurs="0"/>
            <xs:element name="Import" type="Import"
                minOccurs="0" maxOccurs="unbounded"/>
            <xs:element name="DesignData" type="DesignData"
                minOccurs="0"/>
            <xs:element name="SettingDefinitions"
                type="SettingDefinitions" minOccurs="0"/>
            <xs:choice minOccurs="0" maxOccurs="unbounded">
                <xs:element name="AbstractEndpointDefinition"
                    type="AbstractEndpointDefinition"/>
                <xs:element name="AbstractSystemDefinition"
                    type="AbstractSystemDefinition"/>
                <xs:element name="AbstractResourceDefinition"
                    type="AbstractResourceDefinition"/>
                <xs:element name=
                    "AbstractCommunicationDefinition" type=
                    "AbstractCommunicationDefinition"/>
```

-continued

```
            <xs:element name="AbstractHostingDefinition"
                type="AbstractHostingDefinition"/>
            <xs:element name=
                "AbstractContainmentDefinition" type=
                "AbstractContainmentDefinition"/>
            <xs:element name=
                "AbstractDelegationDefinition" type=
                "AbstractDelegationDefinition"/>
            <xs:element name=
                "AbstractReferenceDefinition" type=
                "AbstractReferenceDefinition"/>
            <xs:element name="ReferenceDefinition"
                type="ReferenceDefinition"/>
            <xs:element name="HostingDefinition"
                type="HostingDefinition"/>
            <xs:element name="EndpointDefinition"
                type="EndpointDefinition"/>
            <xs:element name="ResourceDefinition"
                type="ResourceDefinition"/>
            <xs:element name="ServiceDefinition"
                type="ServiceDefinition"/>
            <xs:element name="ConstraintDefinition"
                type="ConstraintDefinition"/>
            <xs:element name="FlowDefinition"
                type="FlowDefinition"/>
            <xs:element name="Manager" type="Manager"/>
        </xs:choice>
    </xs:sequence>
    <xs:attributeGroup ref="NamespaceIdentity"/>
    <xs:attribute name="documentLanguage"
        type="Culture"/>
</xs:complexType>
    </xs:element>
```

3.11.1 Information

The information section of an SDM document contains human readable information to support identification and management of sdm documents.

```
<xs:complexType name="Information">
    <xs:annotation>
        <xs:documentation>Human readable information about the SDM
            Definition library.</xs:documentation>
    </xs:annotation>
    <xs:sequence>
        <xs:element name="FriendlyName" type="xs:string"
            minOccurs="0"/>
        <xs:element name="CompanyName" type="xs:string"
            minOccurs="0"/>
        <xs:element name="Copyright" type="xs:string"
            minOccurs="0"/>
        <xs:element name="Trademark" type="xs:string"
            minOccurs="0"/>
        <xs:element name="Description" type="Description"
            minOccurs="0"/>
        <xs:element name="Comments" type="xs:string"
            minOccurs="0"/>
    </xs:sequence>
</xs:complexType>
```

| Attribute/element | Description |
|---|---|
| FriendlyName | |
| CompanyName | |
| Copyright | |
| Trademark | |
| Description | |
| Comments | |

3.12 Change Request.

Figure 17:
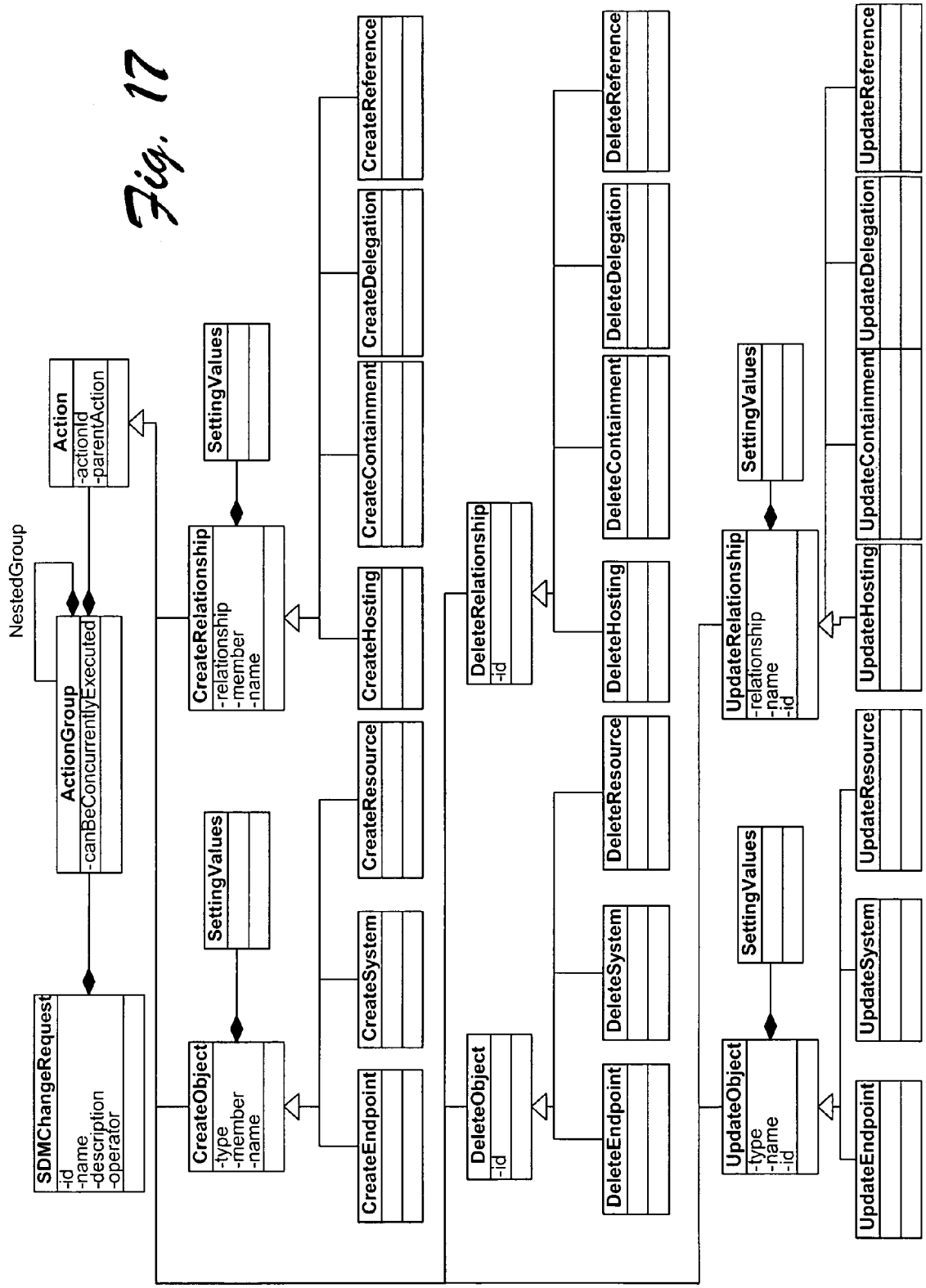
FIG. 17 illustrates an example of a change request.

FIG. 17 illustrates an example of a change request. A change request identifies a set of changes to the SDM runtime. All changes to the runtime are initiated using change requests either through API's that allow a request to be constructed or in an xml format.

The initial request contains a single group of actions. As the request is processed by the runtime more structure is added through nested grouping and more actions are added as a result of the expansion and flow process. A change request that has been through this evaluation process and is now ready for execution against the target machines is called a fully qualified change request. See section 3.13 for more information.

3.12.1 Consistency Rules

When actions are performed on the SDM instance space we validate that after the actions are complete all the instances in the SDM instance space are still in a consistent state. By consistent state we mean that all constraints that apply to the instance are still valid. For example, if we create an instance of a client that requires a connection to the server, when the sequence of actions used to create and connect the client is complete, the connection should exist between the client and a server.

The constraints used to evaluate model consistency can be evaluated either on a per action basis or on the conclusion of a set of actions. We call these two types of consistency operational consistency and transactional consistency.

If an object will be in an inconsistent after the transaction is complete we allow the user to explicitly mark that instance as offline. When an instance is offline we do not evaluate constraints that apply to the instance and the instance will not appear to exist from the perspective of other instances. This may mean that in turn all those instances should also be marked as offline. Offline is propagated from parent to child and from host to guest, so marking a system as offline will mark all its in owned instances as offline and all instances that are hosted on it offline.

3.13 Model Evaluation

In this section we describe behavior of the SDM model within the scope of the SDM runtime.

3.13.1 Definition Space

Figure 18:
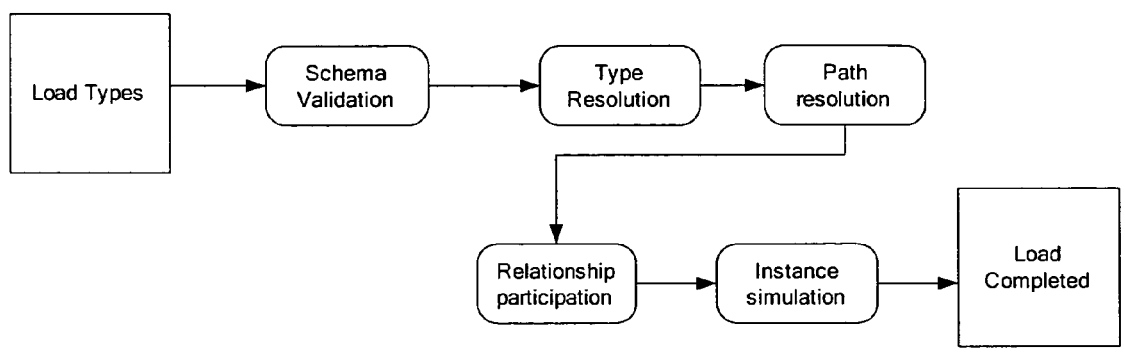
FIG. 18 illustrates an example process of loading new definitions into the runtime.

The definition space contains all the definitions that are known to the sdm runtime. The steps of FIG. 18 define an example process of loading new definitions into the runtime. This process is also shared by the compile process that occurs when the design surface validates an sdm document.

3.13.1.1 Load

An sdm document is presented to the runtime either as part of an sdu or as a stand alone document. We will attempt to load the file from the disk.

| Validation error | Description |
|---|---|
| Unknown file | We could not find the file in the specified location. |
| Access denied | We were denied access to the file. |

3.13.1.2 Schema Validation

The first step is to validate that sdm document matches the sdm schema. At this point we will return errors for all unknown elements, types that are missing required elements or attributes or types that contain invalid data.

| Validation error | Description |
| --- | --- |
| Invalid document | The document has invalid xml syntax - unclosed nodes, more than one top level node etc. |
| Unknown element | An unexpected element was found in the sdm document |
| Unknown Attribute | And unknown attributed was found in the sdm document |
| Invalid value | A value failed the schema validation (this does not include setting value validation) |
| Missing attribute | A required attributed was missing |
| Missing element | A required element was missing |
| Invalid attribute combination | A combination of attributes or elements was used that was invalid such as: –minOccurs != maxOccurs \| minOccurs = 0 with byValue |

We could return warnings for unknown elements and attributes and just ignore them.

3.13.1.3 Setting Value and Type Resolution

In the type resolution phase we resolve all references to types within the sdm file (anywhere a qualified name is used in the schema). First we validate that all type references that are within the scope of the document are valid. These are all type references that do not contain an alias. We then try to resolve all import statements. If we cannot resolve an import statement we create a namespace load error, if we can resolve and import statement we try to locate the type within the namespace. The namespace resolution process may generate other errors if we are forced to load the namespace from an sdm file.

| Type resolution error | Description |
| --- | --- |
| Unknown type | A type could not be found in local or aliased namespace. This will occur for settings, system, endpoint, resource, relationships, constraints and flow. |
| Unknown namespace | A namespace could not be found. The namespace has not been previously loaded |
| Version conflict | We could not locate a namespace with matching version information. |
| Culture conflict | We could not locate a namespace with matching culture information. |
| Invalid use of type | Use of invalid type in this situation eg. Settings type in a relationship member etc. |
| Invalid setting value | A setting value failed to pass its type's validation. |
| illegal setting value | A setting value was provided that violated an access modifiers on a setting declaration or a fixed value declared previously in a type or base type. |

3.13.1.4 Path Resolution

During the path resolution phase, we try to resolve all paths to members and settings that are defined in the document. Paths that refer to members or settings with unresolved types will not raise an error.

| Path resolution errors | Description |
| --- | --- |
| Unknown setting | A setting declaration was not found to match the path |
| Unknown member | A member declaration was not found to match a name in the path |
| Cardinality mismatch | A path to a setting value in flow and constraint statement included a member or relationship that had cardinality greater than one. |
| Type mismatch | The declared type of the variable and the type of the resolved setting or member did not match. |
| Use mismatch | The declared intent of the path - input or output - violated an access modifier on the setting declaration or a fixed modifier on a value. |
| No value | A required flow input path referenced a setting that has no default value and is not exposed so as to allow a user to provide a value. |

| Path resolution warnings | Description |
| --- | --- |
| Runtime path warning | A path that references an isReference member that references an abstract type may not be verifyable until runtime. (We cannot check that a member exists until the user creates the concrete type). |
| Flow warning | Flow warnings - we will raise a warning if a value is provided for a setting that is also a target of a flow defined at the same time or earlier. We will not raise a warning if the flow is defined after the setting value has been provided as long as the setting is not fixed. |

3.13.1.5 Relationship Participation

In the type space we check that a type declaration does not violate any of the constraints with respect to the participation of its members in relationships. To do this we evaluate all type and relationship constraints that have no associated settings constraints.

| Type Space Constraint errors | Description |
| --- | --- |
| Relationship type violation | A relationship member identifies a particular relationship and two members that are incompatible based on the types identified by the relationship. Eg a vdirToVsite hosting relationship is declared between a vdir and a file. |
| Relationship use violation | A relationship is declared between two members but the use of the relationship in this context is not allowed because the members are not accessible. For example declaring a delegation relationship between twoendpoints that are not on systems in a direct containment relationship |
| Relationship constraint violation | A relationship has been declared between a combination of types that it does not support based on constraints within the relationship. For example a relationship may be declared between vsites but it only supports certain types derived from vsite. |

| Type space constraint warnings | Description |
| --- | --- |
| Possible Cardinality mismatch | When counted up the maxOccurs for a member results in a set of relationships |

-continued

| | |
|---|---|
| | that would violate the cardinality of a relationship constraint. |

3.13.1.6 Instance Simulation

In the instance simulation we attempt to flow values and evaluate constraints in such a way that we can identify constraints that we know should fail but not flag constraints that may or may not fail based on user input. To do this we construct a model of the instance space and evaluate flow and constraints that based on this instance space. If the flow or constraint is know to result in an error then we raise an error, if it could possibly result in an error then we raise a warning.

We build an instance space change request using the minOccurs constraint on all byReference systems. When the minOccurs is 0 we create a single instance and mark it as optional. We then pass the change request through the same expansion and flow processes as we use for a standard change request

| Simluation warning | Description |
|---|---|
| Optional system | Because the system is optional, the runtime could not fully determine all errors that may result from this configuration. |

We then evaluate all flows that have fully defined input values. If the input values are not fixed and could be changed by a user then we mark the output of the flow as provisional. A provisional input will chain through any flow operations that consume it. If a flow does not have complete input values and a user could provide values then we mark all the outputs of the flow as undefined. Flow from optional systems also results in provisional values.

| Flow error | Description |
|---|---|
| Flow input undefined | A value was not provided for a required flow input value. |

Once we have flowed values we evaluate the constraints based on these values. Constraints that fail provisioning values will be raised as warnings; a warning will also be raised when a constraint could not be evaluated due to undefined values.

| Setting constraint error | Description |
|---|---|
| Settings input undefined | A value was not provided for a required constraint input value. |
| Settings violate constraint | One or more input settings to a constraint resulted in a constraint violation |

| Setting constraint warnings | Description |
|---|---|
| Settings could violate constraint | A combination of input settings based on defaults can violate the constraint. |
| Settings constraint not evaluated | A constraint could not be evaluated because it depends on settings provided at deployment or use time. |

3.13.2 Instance Space

The model evaluation process is initiated by the submission of a declarative change request. This request will contain a set of create, update or delete operations that target instances within the runtime.

Figure 19:
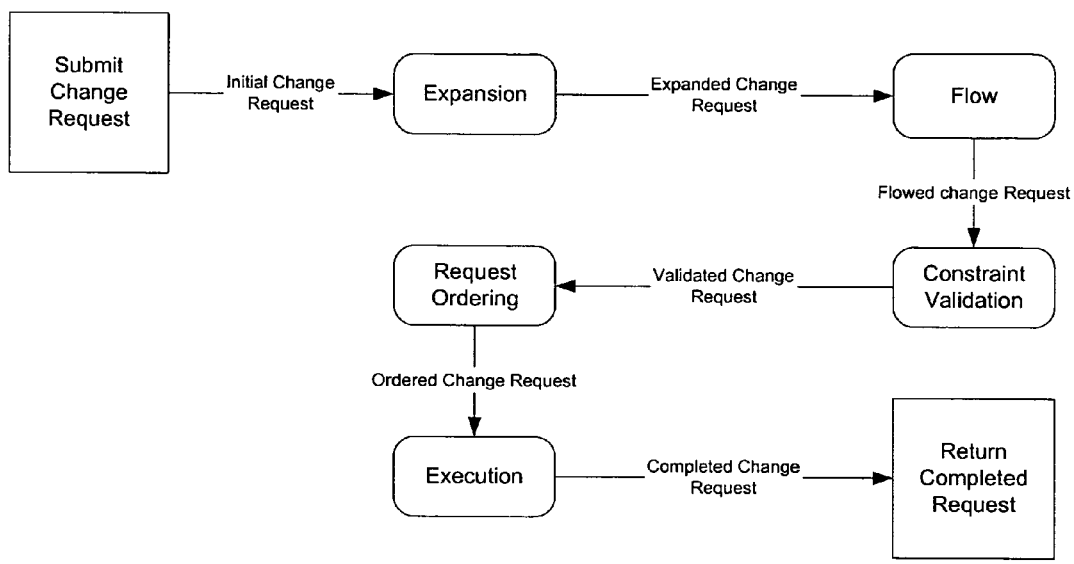
FIG. 19 illustrates an example of carrying out change requests.

We then pass the request through a series of pipeline stages before enacting the required changes on the target system as illustrated in FIG. 19.

The following sections outline the responsibilities of each expansion step.

3.13.2.1 Request Submission

In order to initiate a change to the system an operator or process should submit a change request. The change request contains a set of actions that the operator wants performed over the instances in the runtime; these actions fall into three groups: create actions, update actions and delete actions.

The request is then treated as an atomic set of actions that should either complete or fail as a group. This allows the constraint validation process to consider all actions in the request when evaluating whether the set of actions will result in a valid change to the model.

| Change request validation errors | Description |
|---|---|
| Invalid document Unknown element/attribute | An unknown element or attributed was found in the xml schema |

3.13.2.1.1 Type Resolution

In the type resolution phase we resolve all types and members that are referenced in the change request. The change request will assume that these are already loaded by the runtime; the runtime will need to initiate a load/compile action if they do not exist.

3.13.2.1.2 Path Resolution

During the path resolution phase we resolve references to existing instances and instances defined by create actions within the change request.

3.13.2.2 Expansion

Expansion is the process where we take a change request and populate all the remaining actions required to execute the request: in general these actions are construction and destruction actions for type and relationship instances. In theory the operator could provide details for all the actions required to construct or destroy an instance but we don't require this because it would make the change request authoring process very complex. Instead we try to automate as much of this process: the operator provides key information about the changes they want by identifying actions on byReference members; we then fill in the rest of the actions on nested byReference and byvalue members and relationships.

3.13.2.2.1 Value Member

During the expansion stage we identify all the non-reference type members. We know the cardinality of these members and we know all the required parameters, so for each member we add create requests to the change request for those members whose parent is being created. If the change request contains destruction operations, we add destruction operations for all their contained instances.

3.13.2.2.2 Reference Member Expansion (Discovery)

In general reference members require more information to construct than value members. Their cardinality is often undefined and they can have deployment time settings that require values in order for the instance to be constructed. So the process of expanding a byReference member can require more information about the instance than the runtime is in a position to provide. The process by which we obtain this information is called Discovery.

The process of discovery will populate reference type members as part of a construction or update action. Only reference members with object managers that support discovery will participate in this process.

When a new instance is discovered we first check that the instance does not already exist in the SDM database using instance specific key values. Once we know it is a new instance we then classify the instance according to the types of the members we are discovering. If the instance does not match a member or there is an ambiguous match then we leave the member reference blank and mark the instance as offline and incomplete.

3.13.2.2.3 Relationship Expansion

Once we know all the type instances that will be constructed we create relationship instances that bind the type instances together. If type instances are being destroyed, we remove all relationship instances that reference the type instances.

To create the relationships we turn to the member space to identify the configurations of the relationships that should exist between the instances. Where the type members have cardinality greater than one we have to infer the topology of the relationships. We will discuss how we do this in detail in section XX.

3.13.2.3 Flow

During the flow stage we evaluate flow across all the relationship instances. This stage may add update requests to the change request for instances that were affected by the altered parameter flow.

Flow is evaluated by determining the set of instances that have updated settings as a result of the change request. For each of these, any outgoing settings flows that depend on the modified settings are evaluated and the target nodes added to the set of changed instances. The process continues until the set is empty or the set contains a cycle.

| Error/warning | Description |
| --- | --- |
| Unterminated flow | |

3.13.2.4 Duplicate Detection

The process of duplicate detection matches expanded instances against instance that already exist in the sdm data store. For example we will detect if another application has installed a shared file. When we detect that an instance already exists we can one of several actions depending on the version of the existing instance:

a) we can fail the install
b) we can reference count the instance
c) we can upgrade the instance
d) we can install side-by-side 3.13.2.5 Constraint Evaluation During the constraint evaluation phase we check that all the constraints in the model will still be valid after the change request has been processed.

---

For v1 we may have to visit every node in the graph that has a constraint as determining the scope of constraints may be difficult (we may be able to tag the member space in such a way that we can prune the instance space)

---

3.13.2.6 Request Ordering

We now have a complete list of actions, so we can use the relationships between systems to determine a valid change ordering.

3.13.2.7 Execution

We distribute subsets of the orders set of actions that are machine specific. We should support cross machine synchronization of these machine specific sets.

3.13.2.8 Request Return

Change is carried out by breaking the change requests down into distributable parts based on the hosting relationships that are affected. One all the parts are completed (or failed) the results are collated in the runtime and a summary returned to the user.

3.13.3 Expansion in Depth

In this section we go into detail on the expansion process for types and relationships.

3.13.3.1 Reference Member Expansion (Discovery)

In the same way that the hosting relationship is responsible for constructing new instances of a type, we also use the hosting relationship to discover existing type instances. The hosting relationship is uniquely placed to do this as it alone is aware of the way a type instance is represented on a host.

When a reference member is marked for discovery we check to see if the hosting relationship supports discovery. If it does we pass the host instance to the relationship and ask it to return construction actions for the guest instances that it finds on the host.

We use verification to discover that instances no longer exist. This again uses the hosting relationship to verify the existence of a guest on a host. If the guest no longer exists then the hosting relationship adds a destruction action to the change request.

3.13.3.2 Non Reference Member Expansion

The runtime handles all non-reference member expansions by simply adding construction or destruction actions for each non-reference member of a type that has already been identified for construction or destruction within the change request.

3.13.3.3 Communication Relationship Expansion

If the operator has not specified an instance of a communication relationship where a communication relationship member exists between two type members, then we expand the communication relationship by assuming a fully connected mesh between the members

---

The connectivity constraint may be loosened if there are important topologies that we cannot capture, but loosening it complicates the deployment process. For example, if we allowed looser topologies we could provide a way to create and manage these wires, do path checking for any changes, and expose the topology to the operator creating the deployment.

---

Figure 20:
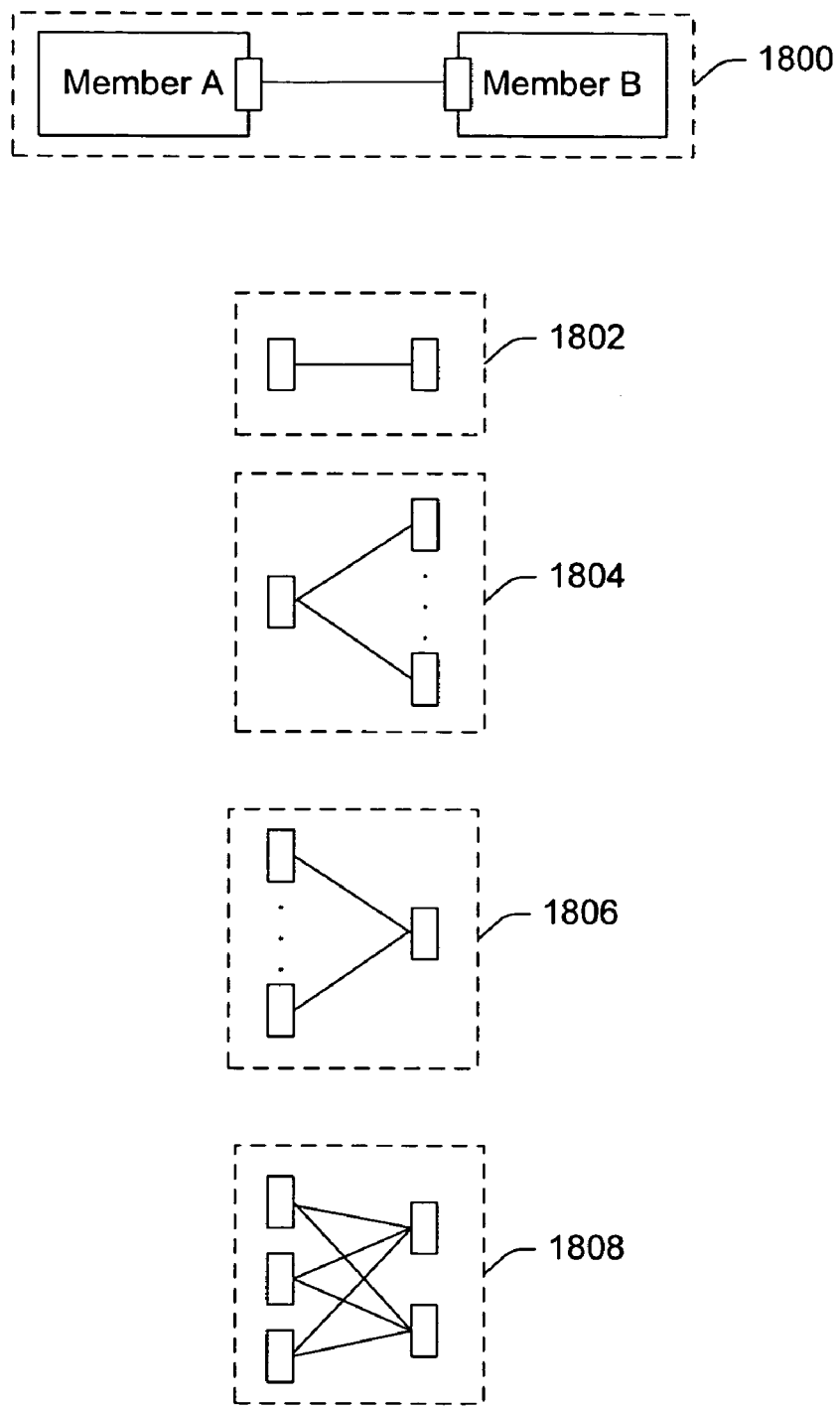
FIG. 20 illustrates examples of connected members.

What does this mean? If two members are connected in the member space, then all the instances of each member should be able to see each other. Given the following two members the instance space topologies which are constrained by the cardinality of the members, as shown in FIG. 20. Two example members are shown at 1800. At 1802, a simple point to point relationship between a maximum of two instances is illustrated. At 1804, a fan out of connections is illustrated. An example may be a client that can load balance requests across a set of servers. At 1806, a fan in of connections is illustrated. An example may be a group of clients sharing a single server. At 1808, a combination of the above cases where a set of clients shares a set of servers is illustrated.

Figure 21:
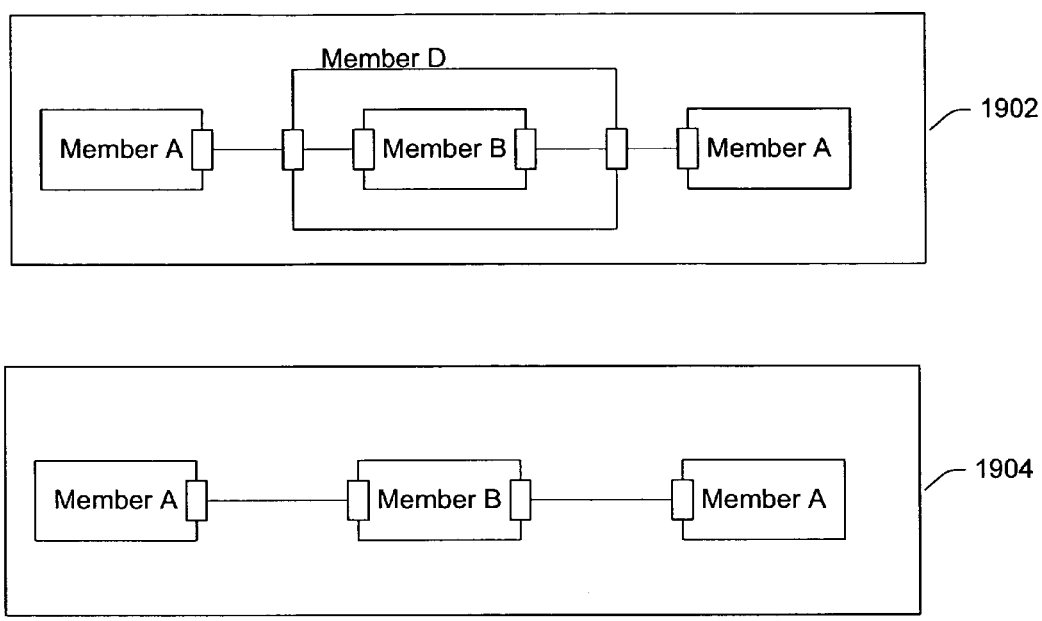
FIG. 21 illustrates example structures with regard to connections.

When we construct communication links, delegate endpoints become transparent so that we end up with connections that match all the communication relationships that would exist if the delegate endpoints were removed. FIG. 21 illustrates two structures 1902 and 1904 that are equivalent as far as the connections between instances of A, B and C are concerned.

3.13.3.4 Hosting Relationship Expansion

Where hosting relationships are ambiguous we require the either the operator or the manager of the hosting relationship to determine the correct topology.

If the hosting relationship supports expansion, then we pass the set of hosts and the guest to the relationship manger and ask the manager to return the correct construction action. If the manager does not support expansion then we return the change request to the operator so that they can provide more information.

3.13.3.5 Reference Relationship Expansion
3.13.3.6 Containment Relationship Expansion Containment relationships are never ambiguous so the runtime can always add the appropriate construction action to the change request.

3.13.3.7 Delegation Relationship Expansion

For expansion, delegation relationships follow the same rules as communication relationships.

3.13.4 Flow
3.13.5 Execution
3.14 SDM Instance Space

The follow section defines an object model for the instance space of the sdm runtime. The instance space is used to track changes to the configuration of the system that are modeled by the sdm.

Figure 22:
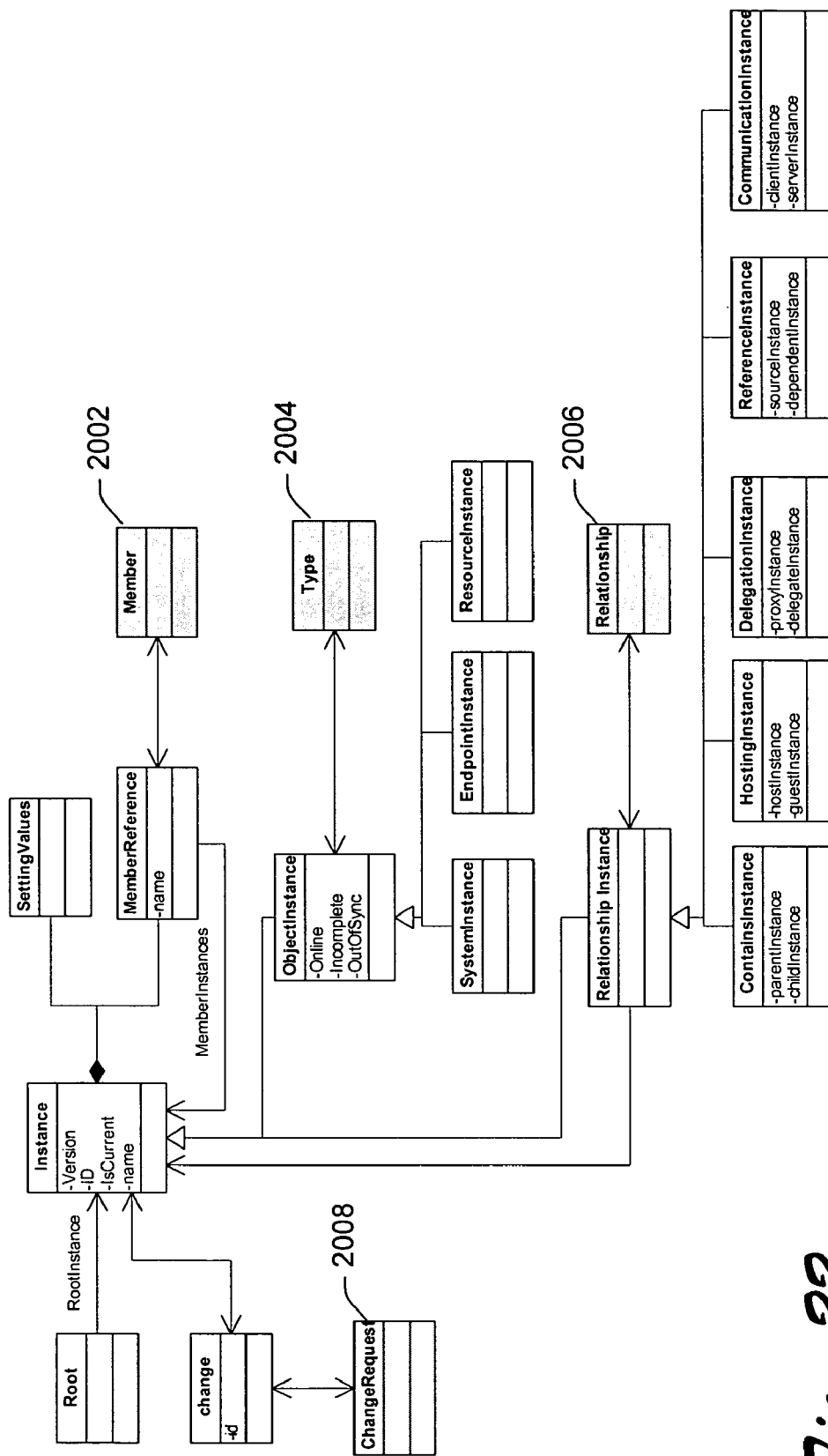
FIG. 22 illustrates an example UML diagram that provides an overview of the instance space.

FIG. 22 illustrates an example UML diagram that provides an overview of the instance space. The boxes 2002, 2004, 2006, and 2008 indicate types that defined in other sections of this document.

The instance space is structured around versioned changes initiated by change requests. Each instance can have a linear series of versions that represent atomic changes that were made to the running instance. Future versions can also exist in the runtime before they have been propagated to the running system.

For this version of the SDM model we only allow linear changes for a given instance. In the future we may allow version branches and introduce a version resolution model. This would allow more than one change to be outstanding against a particular instance.

Since we do allow linear versioning, we can load a series of change requests that build on previous changes. This supports prior validation of a sequence of actions that may be taken during a process such as a rolling upgrade.

3.14.1 SDM Instance

All instances derive from sdm instance. They share elements that define values for the settings schema and list of members that match the members on the instance's definition. They also share a set of attributes that define a unique identifier for the instance, a version number for the instance, a name for the instance and flag that indicates whether this version represents the running state of the system.

```
<xs:complexType name="sdmInstance">
    <xs:sequence>
        <xs:element name="settingValues" type="settingValues"
            minOccurs="0"/>
```

```
        <xs:element name="member" type="member" minOccurs="0"
            maxOccurs="unbounded"/>
    </xs:sequence>
    <xs:attribute name="id" type="instanceID" use="required"/>
    <xs:attribute name="version" type="xs:int" use="required"/>
    <xs:attribute name="isCurrent" type="xs:boolean"
        use="required"/>
    <xs:attribute name="name" type="xs:string" use="optional"/>
    <xs:attribute name="incomplete" type="xs:boolean"
        use="required"/>
</xs:complexType>
```

| Attribute/element | Description |
| --- | --- |
| settingsValues | A list of setting values that defines the desired state of the modeled system object. This list includes all the values defined by, the developer on the definition or the member, the operator when deploying the instance or via flow from related instances. |
| member | This is a list of members that represent the members on the definition. Each member identifies the instances assigned to the member. |
| id | An identifier for the instance that is unique at global scope (to support distributed runtimes) |
| version | The version number increments linearly with changes to the instance. |
| isCurrent | This is a flag that indicates whether this version represents the running state of the system. There can exist latter versions that represent updates that have not been propagated to the running system. |
| name | A unique name for the instance within the scope of its containing member (may not be unique from the perspective of delegated members) |

3.14.2 Member

A member is used to associate the member of an instance which a set of referenced instances. The members of an instance are defined by the instance's definition. The referenced instances are the instances that have created for the members or the instances to which the members are delegated. A member may represent an array in which case there may be more than one referenced instance.

```
<xs:complexType name="member">
    <xs:sequence>
        <xs:element name="instance" type="instanceRef" minOccurs=
            "0" maxOccurs="unbounded"/>
    </xs:sequence>
    <xs:attribute name="memberDeclaration" type="qualifiedName"
        use="optional"/>
    <xs:attribute name="name" type="xs:string" use="required"/>
</xs:complexType>
```

| Attribute/element | Description |
| --- | --- |
| instance | An instance referenced by this member |
| memberDeclaration | The declaration of this member on the associated definition |
| name | The name of the associated member on the definition |

3.14.3 Change

A change represents a change to the instance state. It associates a change request with the set of affected instances. It also identifies he status of the change (see section XXX) and the change response if the change has been executed.

```
<xs:complexType name="change">
    <xs:sequence>
        <xs:element name="instance" type="instanceVersionRef"
            minOccurs="0" maxOccurs="unbounded"/>
    </xs:sequence>
    <xs:attribute name="id" type="changeID" use="required"/>
    <xs:attribute name="status" type="changeStatus" use="required"/>
    <xs:attribute name="changeRequest" type="qualifiedName"
        use="optional"/>
    <xs:attribute name="changeResponse" type="qualifiedName"
        use="required"/>
</xs:complexType>
```

| Attribute/element | Description |
| --- | --- |
| instance | A list of instance versions that we created as a result of the associated change request |
| id | A unique identifier for this change (at least unique to the runtime) |
| status | An enumeration identifying the current status of this change |
| changeRequest | A link to the change request that was used to create this change |
| changeResponse | A link to the results return from the execution of the change |

3.14.3.1 Change Status

A change request can be in one of the following states:
notStarted—indicating that no execution has been attempted against a change request
inProgress—indicating that it is currently being executed.
complete—indicating that the change request was completed successfully
failed—indicating that the change request has failed and the change is in an incomplete state
rolledBack—indicateding that a failed change request has been successfully rolled back.

```
<xs:simpleType name="changeStatus">
    <xs:restriction base="xs:string">
        <xs:enumeration value="notStarted"/>
        <xs:enumeration value="inProgress"/>
        <xs:enumeration value="completed"/>
        <xs:enumeration value="failed"/>
        <xs:enumeration value="rolledBack"/>
    </xs:restriction>
</xs:simpleType>
```

3.14.4 Concrete Object Instance

A concrete object instance represents an instance the concrete type identified by the type attribute. Since there can be real world representation for the instance we need to track whether the instance is in sync with its real world counterpart. We also want to know whether the instance will be online as a result of this change. An online instance should be valid with respect to all its constraints. An offline instance is does not appear visible to the other participants of the communication relationships that it participates in. If the instance is incomplete then further change requests are required before the instance can be taken online

```
<xs:complexType name="ObjectInstance">
    <xs:complexContent>
        <xs:extension base="sdmInstance">
            <xs:attribute name="inSync" type="xs:boolean"
                use="required"/>
            <xs:attribute name="online" type="xs:boolean"
                use="required"/>
            <xs:attribute name="type" type="qualifiedName"
                use="required"/>
        </xs:extension>
    </xs:complexContent>
</xs:complexType>
```

| Attribute/element | Description |
| --- | --- |
| inSync | This indicates whether the settings on the instance match those on its real world counterpart. |
| online | This indicates whether the real world counterpart should be considered online and active. An instance cannot be put in the online state if any constraints are not satisfies. An offline instances will not be visible to other participants in the communication relationships that reference it. (flow will not be evaluated?) |
| incomplete | This flag indicates that required information is missing from this version of an instance. This situation may arise as a result of a discovery process that could not identify all information required by instance or as a result of a change request that did not supply all required information. |
| type | A reference to the type of the instance. |

3.14.5 Relationship Instances

A relationship instance represents an instance of the identified relationship type. Since relationships have no direct real-world representation we do need to keep information about whether the relationship is in sync or online. Also since relationships are relatively simple we do not expect them to be incomplete, though they can fail their constraints.

```
<xs:complexType name="relationshipInstance">
    <xs:complexContent>
        <xs:extension base="sdmInstance">
            <xs:attribute name="relationship" type="qualifiedName"
                use="required"/>
        </xs:extension>
    </xs:complexContent>
</xs:complexType>
```

| Attribute/element | Description |
| --- | --- |
| relationship | The relationship type associated with this instance. |

3.14.5.1 Containment Instance

This represents an instance of a containment relationship.

```
<xs:complexType name="containmentInstance">
    <xs:complexContent>
        <xs:extension base="relationshipInstance">
            <xs:attribute name="parentInstance" type=
```

-continued

```
        "instanceID" use="required"/>
        <xs:attribute name="childInstance" type="instanceID"
            use="required"/>
    </xs:extension>
</xs:complexContent>
</xs:complexType>
```

| Attribute/element | Description |
|---|---|
| parentInstance | Identifies the parent instance that participates in the relationship. |
| childInstance | Identifies the child instance that participates in the relationship. |

3.14.5.2 Communication Instance

This represents an instance of a communication relationship.

```
<xs:complexType name="communicationInstance">
    <xs:complexContent>
        <xs:extension base="relationshipInstance">
            <xs:attribute name="clientInstance" type="instanceID"
                use="required"/>
            <xs:attribute name="serverInstance" type="instanceID"
                use="required"/>
        </xs:extension>
    </xs:complexContent>
</xs:complexType>
```

| Attribute/element | Description |
|---|---|
| clientInstance | Identifies the client instance that participates in the relationship. |
| serverInstance | Identifies the server instance that participates in the relationship. |

3.14.5.3 Delegation Instance

This represents an instance of a delegation relationship.

```
<xs:complexType name="delegationInstance">
    <xs:complexContent>
        <xs:extension base="relationshipInstance">
            <xs:attribute name="proxyInstance" type="instanceID"
                use="required"/>
            <xs:attribute name="delegateInstance" type="instanceID"
                use="required"/>
        </xs:extension>
    </xs:complexContent>
</xs:complexType>
```

| Attribute/element | Description |
|---|---|
| proxyInstance | Identifies the proxy instance that participates in the relationship. |
| delegateInstance | Identifies the delegate instance that participates in the relationship. |

3.14.5.4 Hosting Instance

This represents an instance of a hosting relationship.

```
<xs:complexType name="hostingInstance">
    <xs:complexContent>
        <xs:extension base="relationshipInstance">
            <xs:attribute name="guestInstance" type="instanceID"
                use="required"/>
            <xs:attribute name="hostInstance" type="instanceID"
                use="required"/>
        </xs:extension>
    </xs:complexContent>
</xs:complexType>
```

| Attribute/element | Description |
|---|---|
| guestInstance | Identifies the guest instance that participates in the relationship. |
| hostInstance | Identifies the host instance that participates in the relationship. |

3.14.5.5 Reference Instance

This represents an instance of a reference relationship.

```
<xs:complexType name="referenceInstance">
    <xs:complexContent>
        <xs:extension base="relationshipInstance">
            <xs:attribute name="sourceInstance" type="instanceID"
                use="required"/>
            <xs:attribute name="dependentInstance" type=
                "instanceID" use="required"/>
        </xs:extension>
    </xs:complexContent>
</xs:complexType>
```

| Attribute/element | Description |
|---|---|
| sourceInstances | Identifies the source instance that participates in the relationship. |
| dependentInstance | Identifies the dependent instance that participates in the relationship. |

3.14.6 Instances

The Instances group represents the set of instance elements that can exist in an sdminstance file.

```
<xs:group name="instances">
    <xs:choice minOccurs="0" maxOccurs="unbounded">
        <xs:element name="SystemInstance" type=
            "concreteTypeInstance"/>
        <xs:element name="portInstance" type=
            "concreteTypeInstance"/>
        <xs:element name="resourceInstance" type=
            "concreteTypeInstance"/>
        <xs:element name="member" type="member"/>
        <xs:element name="containmentInstance" type=
            "containmentInstance"/>
        <xs:element name="communicationInstance" type=
            "communicationInstance"/>
        <xs:element name="hostingInstance" type="hostingInstance"/>
        <xs:element name="delegationInstance" type=
            "delegationInstance"/>
        <xs:element name="referenceInstance" type=
            "referenceInstance"/>
```

-continued

```
        <xs:element name="placementInstance" type=
        "placementInstance"/>
    </xs:choice>
</xs:group>
```

3.14.7 Instance References 3.14.7.1 Instance Ref

Instance ref is a simple reference to an instance. Will default to the is Current instance unless the reference is made in the context of a change request and the instance is affected by the change request.

```
<xs:complexType name="instanceRef">
    <xs:attribute name="instanceID" type="instanceID" use="required"/>
</xs:complexType>
```

3.14.7.2 Instance Version Ref

Instance version ref identifies a particular version of an instance.

```
<xs:complexType name="instanceVersionRef">
    <xs:attribute name="instanceID"   type="instanceID" use="required"/>
    <xs:attribute       name="version"         type="xs:int" use="required"/>
</xs:complexType>
```

3.15 Deployment Unit Structure

Requirements

Contains all the bits requires to install a set of SDM types

Can be signed and versioned

Easily constructed/packaged/shipped

Can refer to other SDUs either by reference or by inclusion

The deployment section of the SDM type definition refers directly to files in the SDU 3.16 Localization We need to decide what parts of the SDM model support localization and how we support localization through design and deployment of systems.

First Approach:

We leave localization completely up to individual types and types to manage. Localization is implicit through constraints. Localization is not a first type citizen. What this means:

a) SDUs can contain the implementation of a specific version of a type: there is one implementation of a specific version. This means that there cannot be implementations that differ based on localization alone. So each implementation should support a range of locales or the implementations should be of different types (using versioning for this purpose would be a crime!)

b) Localization is then either achieved by using resources as mixins to support specific versions or through using a set of types that identify implementations that support different versions.

c) Clients cannot differentiate/require localized versions of servers.

Second Approach:

Localization is a first type citizen of identity along with name and version. This means that localization should be taken into account anywhere where a reference is made to a type.

a) Clients can now differentiate localized versions of servers on any of the containment, hosting or communication relationships.

b) The deployment engine should be aware of localization and allow the operator to select between localized versions of types.

c) Either SDU's are identified by name, version and locale(s) or an SDU can contain mutiple implementations that differ only based on their locale(s) (the first implies a finer grained packaging of SDUs as non localized code should be placed in a separate sdu, the second implies that we can have multiple sdus with the same name, , , )

The second approach has the potential to get very complicated from a design/ui perspective if locale is widely used as a constraint. For example if endpoints are localized or if hosts localize their guests then finding a connection/placement just got a lot more complex. If the second approach is used with b) from the first approach as the suggested mechanism then the complexity may be easier to manage but somebody has to identify, package and ship the localized resources.

3.17 Versioning and Change Management 3.17.1 General Comments

We want to be able to version systems in place—ie apply a qfe to sql without changing the instance identity. This implies changing the type of the instance.

We want to allow versioning policy to control allowed version changes—eg a system type designer can choose how strict the versioning policy for the members of the system, or an operator might choose to unilaterally upgrade a member's version for security reasons.

We want to limit the propagation of versioning changes— eg if we change the type of a member we do not want to have to change the type of the system thus propagating type changes to the root.

Breaking changes will be indicated by changes in the first 2 parts of the version number, non breaking changes will be indicated by changes in the second two parts of the version number.

Example Computer Environment

Figure 23:
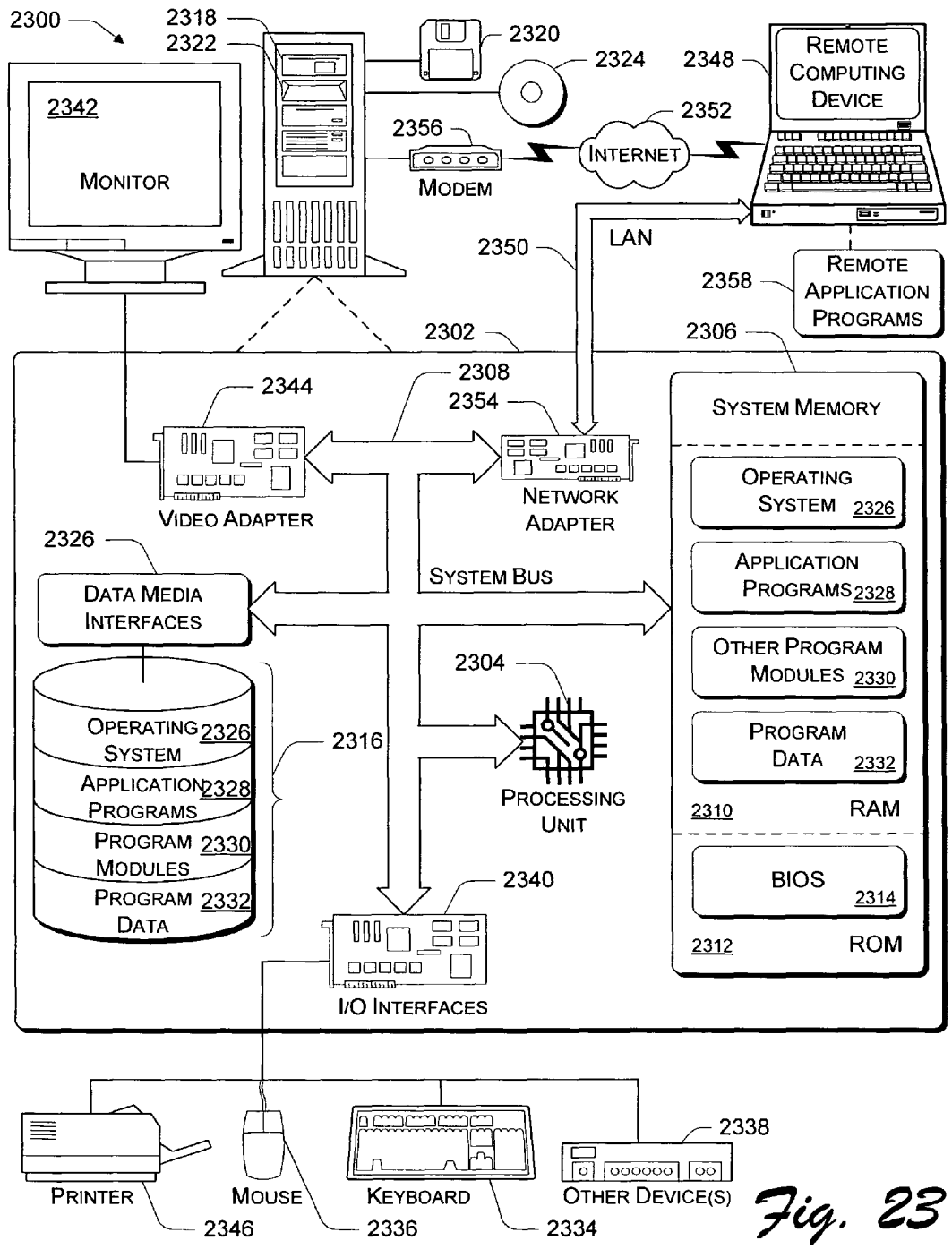
FIG. 23 illustrates a general computer environment that can be used to implement the techniques described herein.

FIG. 23 illustrates a general computer environment 2300, which can be used to implement the techniques described herein. The computer environment 2300 is only one example of a computing environment and is not intended to suggest any limitation as to the scope of use or functionality of the computer and network architectures. Neither should the computer environment 2300 be interpreted as having any dependency or requirement relating to any one or combination of components illustrated in the exemplary computer environment 2300.

Computer environment 2300 includes a general-purpose computing device in the form of a computer 2302. Computer 2302 can be, for example, a computing device 102 of FIG. 1, or implement development system 202 or be a controller 206 of FIG. 2, or be a target device 212 of FIG. 2, or be a controller 620 or target 622 of FIG. 6. The components of computer 2302 can include, but are not limited to, one or more processors or processing units 2304, a system memory 2306, and a system bus 2308 that couples various system components including the processor 2304 to the system memory 2306.

The system bus 2308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 2302 typically includes a variety of computer readable media. Such media can be any available media that is accessible by computer 2302 and includes both volatile and non-volatile media, removable and non-removable media.

The system memory 2306 includes computer readable media in the form of volatile memory, such as random access memory (RAM) 2310, and/or non-volatile memory, such as read only memory (ROM) 2312. A basic input/output system (BIOS) 2314, containing the basic routines that help to transfer information between elements within computer 2302, such as during start-up, is stored in ROM 2312. RAM 2310 typically contains data and/or program modules that are immediately accessible to and/or presently operated on by the processing unit 2304.

Computer 2302 may also include other removable/non-removable, volatile/non-volatile computer storage media. By way of example, FIG. 23 illustrates a hard disk drive 2316 for reading from and writing to a non-removable, non-volatile magnetic media (not shown), a magnetic disk drive 2318 for reading from and writing to a removable, non-volatile magnetic disk 2320 (e.g., a "floppy disk"), and an optical disk drive 2322 for reading from and/or writing to a removable, non-volatile optical disk 2324 such as a CD-ROM, DVD-ROM, or other optical media. The hard disk drive 2316, magnetic disk drive 2318, and optical disk drive 2322 are each connected to the system bus 2308 by one or more data media interfaces 2326. Alternatively, the hard disk drive 2316, magnetic disk drive 2318, and optical disk drive 2322 can be connected to the system bus 2308 by one or more interfaces (not shown).

The disk drives and their associated computer-readable media provide non-volatile storage of computer readable instructions, data structures, program modules, and other data for computer 2302. Although the example illustrates a hard disk 2316, a removable magnetic disk 2320, and a removable optical disk 2324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 2316, magnetic disk 2320, optical disk 2324, ROM 2312, and/or RAM 2310, including by way of example, an operating system 2326, one or more application programs 2328, other program modules 2330, and program data 2332. Each of such operating system 2326, one or more application programs 2328, other program modules 2330, and program data 2332 (or some combination thereof) may implement all or part of the resident components that support the distributed file system.

A user can enter commands and information into computer 2302 via input devices such as a keyboard 2334 and a pointing device 2336 (e.g., a "mouse"). Other input devices 2338 (not shown specifically) may include a microphone, joystick, game pad, satellite dish, serial port, scanner, and/or the like. These and other input devices are connected to the processing unit 2304 via input/output interfaces 2340 that are coupled to the system bus 2308, but may be connected by other interface and bus structures, such as a parallel port, game port, or a universal serial bus (USB).

A monitor 2342 or other type of display device can also be connected to the system bus 2308 via an interface, such as a video adapter 2344. In addition to the monitor 2342, other output peripheral devices can include components such as speakers (not shown) and a printer 2346 which can be connected to computer 2302 via the input/output interfaces 2340.

Computer 2302 can operate in a networked environment using logical connections to one or more remote computers, such as a remote computing device 2348. By way of example, the remote computing device 2348 can be a personal computer, portable computer, a server, a router, a network computer, a peer device or other common network node, and the like. The remote computing device 2348 is illustrated as a portable computer that can include many or all of the elements and features described herein relative to computer 2302.

Logical connections between computer 2302 and the remote computer 2348 are depicted as a local area network (LAN) 2350 and a general wide area network (WAN) 2352. Such networking environments are commonplace in offices, enterprise-wide computer networks, intranets, and the Internet.

When implemented in a LAN networking environment, the computer 2302 is connected to a local network 2350 via a network interface or adapter 2354. When implemented in a WAN networking environment, the computer 2302 typically includes a modem 2356 or other means for establishing communications over the wide network 2352. The modem 2356, which can be internal or external to computer 2302, can be connected to the system bus 2308 via the input/output interfaces 2340 or other appropriate mechanisms. It is to be appreciated that the illustrated network connections are exemplary and that other means of establishing communication link(s) between the computers 2302 and 2348 can be employed.

In a networked environment, such as that illustrated with computing environment 2300, program modules depicted relative to the computer 2302, or portions thereof, may be stored in a remote memory storage device. By way of example, remote application programs 2358 reside on a memory device of remote computer 2348. For purposes of illustration, application programs and other executable program components such as the operating system are illustrated herein as discrete blocks, although it is recognized that such programs and components reside at various times in different storage components of the computing device 2302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the exemplary appended claims is not limited to the specific features or acts described. Rather, the specific features and acts are disclosed as exemplary forms of implementing the claimed invention. Moreover, these claims are exemplary in terms of scope and subject matter. Many other combinations and sub-combinations of the features described herein may later be claimed in patent applications claiming priority to this application.

What is claimed is:

1. One or more computer readable storage media having stored thereon a plurality of instructions that implement a distributed computing system in a distributed computing environment based upon a schema, the schema comprising:
   at least one definition of a distributed computing system module to be implemented in the distributed computing environment, wherein the at least one definition of the distributed computing system module possesses an inheritance property such that a first definition, when derived from a second definition, inherits a setting constraint and a relationship constraint from the second definition;
   at least one relationship that identifies potential interactions between the modules of the distributed computing system such that the schema is used by a development tool to modify the definition and relationship and a deployment tool to implement the module in according to the definition and relationship;
   at least one requirement for the distributed computing environment used by the distributed computing system for a first validation to validate the distributed computing environment; and
   at least one requirement for the distributed computing system used by the distributed computing environment for a second validation to validate the distributed computing system.

2. The one or more computer readable storage media of claim 1 wherein the schema is further used by a management tool.

3. The one or more computer readable storage media of claim 1 wherein the schema allows a user of the development tool to identify desired operational intentions of the at least one distributed system module.

4. The one or more computer readable storage media of claim 1 wherein the at least one definition includes a resource definition, a component definition and an endpoint definition.

5. The one or more computer readable storage media of claim 1 wherein the at least one definition includes a resource definition that specifies runtime behavior contained within a distributed computing system module.

6. The one or more computer readable storage media of claim 1 wherein the at least one definition includes a component definition that describes a self-contained, independently deployable part of the distributed computing system.

7. The one or more computer readable storage media of claim 1 wherein the at least one definition includes an endpoint definition that describes communication endpoints exposed by the distributed computing system module.

8. The one or more computer readable storage media of claim 1 wherein the at least one relationship is the embodiment of at least one potential communication interaction between endpoint definitions of two or more distributed computing system modules, the relationship comprising one or more of:
   a containment relationship,
   a delegation relationship,
   a connections relationship,
   a hosting relationship, and
   a reference relationship.

9. The one or more computer readable storage media of claim 1 wherein the at least one relationship includes a containment relationship that describes the ability of a particular definition to contain members of other definitions.

10. The one or more computer readable storage media of claim 1 wherein the at least one relationship includes a delegation relationship that exposes members contained in a particular definition.

11. The one or more computer readable storage media of claim 1 wherein the at least one relationship includes a connections relationship that identifies available communication interactions between a plurality of definitions.

12. The one or more computer readable storage media of claim 1 wherein the at least one relationship includes a hosting relationship that describes dependencies between a plurality of definitions.

13. The one or more computer readable storage media of claim 1 wherein the at least one relationship includes a reference relationship that identifies ordering relationships between a plurality of definitions.

14. The one or more computer readable storage media of claim 1 further comprising an abstract portion associated with templates for distributed-applications and a concrete portion associated with particular implementations of distributed-applications.

15. The one or more computer readable storage media of claim 1 further comprising a plurality of relationships, wherein the schema provides for the communication of settings across the plurality of relationships.

16. The one or more computer readable storage media of claim 1 further comprising a plurality of relationships, wherein the schema provides for the communication of application runtime behavioral information across the plurality of relationships.

17. One or more computer readable storage media having stored thereon a plurality of instructions that implement a schema, the schema comprising:
   at least one distributed computing system module definition of a portion of an distributed computing system associated with a distributed-computing environment, wherein the at least one distributed computing system module definition possesses an inheritance property such that a first distributed computing system module definition, when derived from a second distributed computing system module definition, inherits a setting constraint and a relationship constraint from the second distributed computing system module definition;

at least one resource definition that specifies module runtime behavior associated with the distributed computing system; and at least one endpoint definition of communication information associated with the distributed computing system.

18. One or more computer readable storage media as recited in claim 17 wherein the schema further includes at least one relationship that identifies interactions between entities in the distributed-computing system.

19. One or more computer readable storage media as recited in claim 17 wherein the schema further includes a containment relationship that describes the ability of a particular definition to contain members of other definitions.

20. One or more computer readable storage media as recited in claim 17 wherein the schema further includes a communication relationship that identifies potential communication interactions between a plurality of definitions.

21. One or more computer readable storage media as recited in claim 17 wherein the schema is used by any of: a development tool, a deployment tool, or a management tool.

22. One or more computer readable storage media as recited in claim 17 wherein the schema models a target system on which the distributed computing system will be installed.

23. One or more computer readable storage media having stored thereon a plurality of instructions that when executed by a computer implement a design tool, the design tool comprising:
  a system definition model to enable defining abstractly the specifications of distributed-computing environments and distributed computing systems; and
  a schema to dictate how functional operations modules within the system definition model are to be specified, wherein the schema comprises:
    at least one requirement for the distributed-computing environments used by the distributed computing systems to validate the distributed-computing environments; and
    at least one requirement for the distributed computing systems used by the distributed-computing environments to validate the distributed computing systems.

24. The design tool of claim 23 wherein the design tool is a distributed-application development tool.

25. The design tool of claim 23 wherein the design tool is a distributed-application deployment tool.

26. The design tool of claim 23 wherein the design tool is a distributed-application management tool.

27. The design tool of claim 23 wherein the distributed-applications are scale-invariant.

28. A data structure stored on one or more computer-readable storage media that is instantiated in accordance with a schema, the schema being accessible by a plurality of tools, the plurality of tools comprising:
  an application development tool, whereby the application development tool defines a system comprised of communicating software and hardware components during a design phase;
  an application deployment tool for facilitating deployments to a plurality of host environments and a plurality of scales, whereby the application deployment tool facilitates utilizing a definition of the system developed by the application development tool to perform operations comprising:
    deploying the system;
    allocating software and hardware; and
    configuring the software and hardware; and
  an application management tool, the application management tool facilitating new management tools to perform operations comprising:
    driving resource allocation;
    managing configuration;
    upgrading; and
    automating processing;
  the schema comprising:
    at least one system definition of a component of a scale-invariant distributed-application;
    at least one resource definition of an application runtime behavior associated with the component;
    at least one endpoint definition of communication information associated with the component;
    at least one containment relationship specifying an ability of a particular definition to contain members of other definitions;
    at least one delegation relationship that exposes members contained in the particular definition;
    at least one communication relationship that specifies available communication interactions between a plurality of definitions;
    at least one hosting relationship that specifies dependencies between the plurality of definitions; and
    at least one reference relationship that specifies ordering relationships between the plurality of definitions.

29. A method comprising:
  creating a data structure in accordance with a schema, the schema defining at least one definition of entities in a distributed-computing system, at least one containment relationship specifying the ability of a particular definition to contain members of other definitions, at least one delegation relationship that exposes members contained in the particular definition, at least one communication relationship that specifies available communication interactions between a plurality of definitions, at least one hosting relationship that specifies dependencies between the plurality of definitions, at least one reference relationship that specifies ordering relationships between the plurality of definitions; and
  populating the data structure.

30. One or more computer readable storage media having stored thereon a plurality of instructions that, when executed by a processor, cause the processor to perform a method, the method comprising:
  loading a definition of entities in a distributed-computing system;
  loading a relationship that specifies potential links between the entities in the distributed-computing system; and
  loading a constraint that specifies a restriction used by one of the entities to constrain the relationship in which the one of the entities participates, or a restriction used by the relationship to constrain one or more of the entities linked by the relationship.

31. The computer readable storage media of claim 30 wherein the definition and the relationship are further used during management of the distributed-computing system.

32. The computer readable storage media of claim 30 wherein the definition includes a resource definition, a system definition and an endpoint definition.

33. The computer readable storage media of claim 30 wherein the relationship includes a containment relationship, a delegation relationship, a communication relationship, a hosting relationship and a reference relationship.

34. A method comprising:
loading a definition of entities of a distributed-computing system in a distributed-computing environment; and
loading a relationship that specifies potential links interactions between the entities of the distributed-computing system such that the definition and the relationship are used during development, validation, deployment and management of the distributed-computing system, wherein the validation comprises:
validating the distributed-computing system by the distributed-computing environment according to one or more requirements for the distributed-computing system; and
validating the distributed-computing environment by the distributed-computing system according to one or more requirements for the distributed-computing environment.

35. The method of claim 34 wherein the definition includes a resource definition, a system definition and an endpoint definition.

36. The method of claim 34 wherein the relationship includes a containment relationship, a delegation relationship, a communication relationship, a hosting relationship and a reference relationship.

* * * * *